(12) United States Patent
Shirai

(10) Patent No.: US 12,124,200 B2
(45) Date of Patent: Oct. 22, 2024

(54) RECORDING-MATERIAL-TRANSPORTING APPARATUS AND IMAGE FORMING SYSTEM WITH OPPOSITELY ORIENTED IMAGE READERS

(71) Applicant: FUJIFILM Business Innovation Corp., Tokyo (JP)

(72) Inventor: Masakazu Shirai, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 0 days.

(21) Appl. No.: 17/942,723

(22) Filed: Sep. 12, 2022

(65) Prior Publication Data

US 2023/0305469 A1 Sep. 28, 2023

(30) Foreign Application Priority Data

Mar. 28, 2022 (JP) ................................. 2022-052655

(51) Int. Cl.
*G03G 15/00* (2006.01)
*H04N 1/00* (2006.01)
(Continued)

(52) U.S. Cl.
CPC ..... *G03G 15/5062* (2013.01); *H04N 1/00588* (2013.01); *H04N 1/0464* (2013.01);
(Continued)

(58) Field of Classification Search
CPC .......................... H04N 1/00588; H04N 1/0464
(Continued)

(56) References Cited

U.S. PATENT DOCUMENTS

| 2008/0063313 | A1 | 3/2008 | Nishina |
| 2015/0222771 | A1* | 8/2015 | Mori ................... H04N 1/00588 |
| | | | 358/498 |
| 2017/0050812 | A1* | 2/2017 | Mukai ................ H04N 1/00602 |

FOREIGN PATENT DOCUMENTS

| CN | 113721433 A * 11/2021 | ......... G03G 15/5062 |
| JP | 2005-354714 A 12/2005 | |

(Continued)

*Primary Examiner* — Quana Grainger
(74) *Attorney, Agent, or Firm* — Oliff PLC

(57) ABSTRACT

A recording-material-transporting apparatus includes: a transport unit that transports a recording material and causes the recording material to pass through an upstream location and a downstream location that is positioned downstream of the upstream location in a recording-material-transporting direction in which the recording material is transported; an upstream reader including a light receiver that receives light reflected by the recording material, the upstream reader reading an image that is formed on a portion of the recording material positioned at the upstream location and that is formed on one surface of the recording material; and a downstream reader including a light receiver that receives light reflected by the recording material, the downstream reader reading an image that is formed on a portion of the recording material positioned at the downstream location and that is formed on other surface of the recording material. The light receiver of the upstream reader is positioned downstream of the upstream location in the recording-material-transporting direction, and/or the light receiver of the downstream reader is positioned upstream of the downstream location in the recording-material-transporting direction.

18 Claims, 29 Drawing Sheets

(51) Int. Cl.
 *H04N 1/04* (2006.01)
 *B65H 5/06* (2006.01)
(52) U.S. Cl.
 CPC ............ *B65H 5/06* (2013.01); *B65H 2801/06* (2013.01); *H04N 1/00602* (2013.01); *H04N 1/00615* (2013.01)
(58) Field of Classification Search
 USPC .......................................................... 399/45
 See application file for complete search history.

(56) References Cited

FOREIGN PATENT DOCUMENTS

| | | | | |
|---|---|---|---|---|
| JP | 2008-067240 A | | 3/2008 | |
| JP | 2013042547 A | * | 2/2013 | ............. B65H 5/062 |
| JP | 2020088641 A | * | 6/2020 | .......... B41J 11/0095 |

* cited by examiner

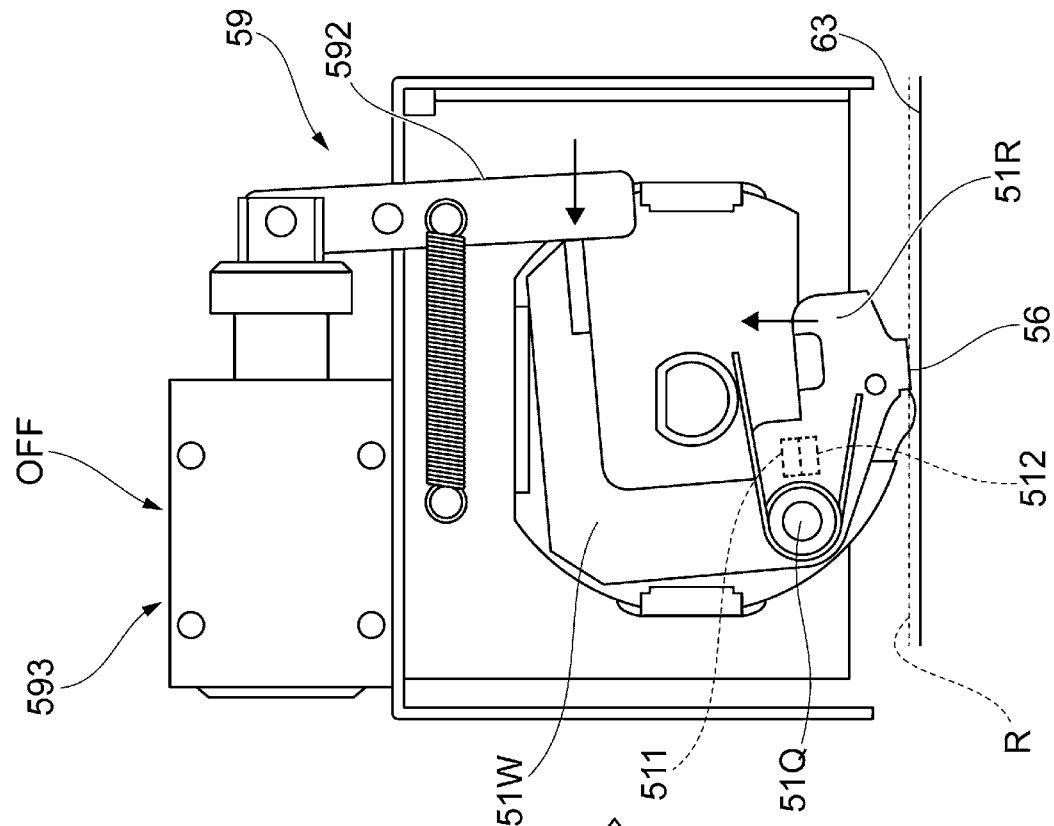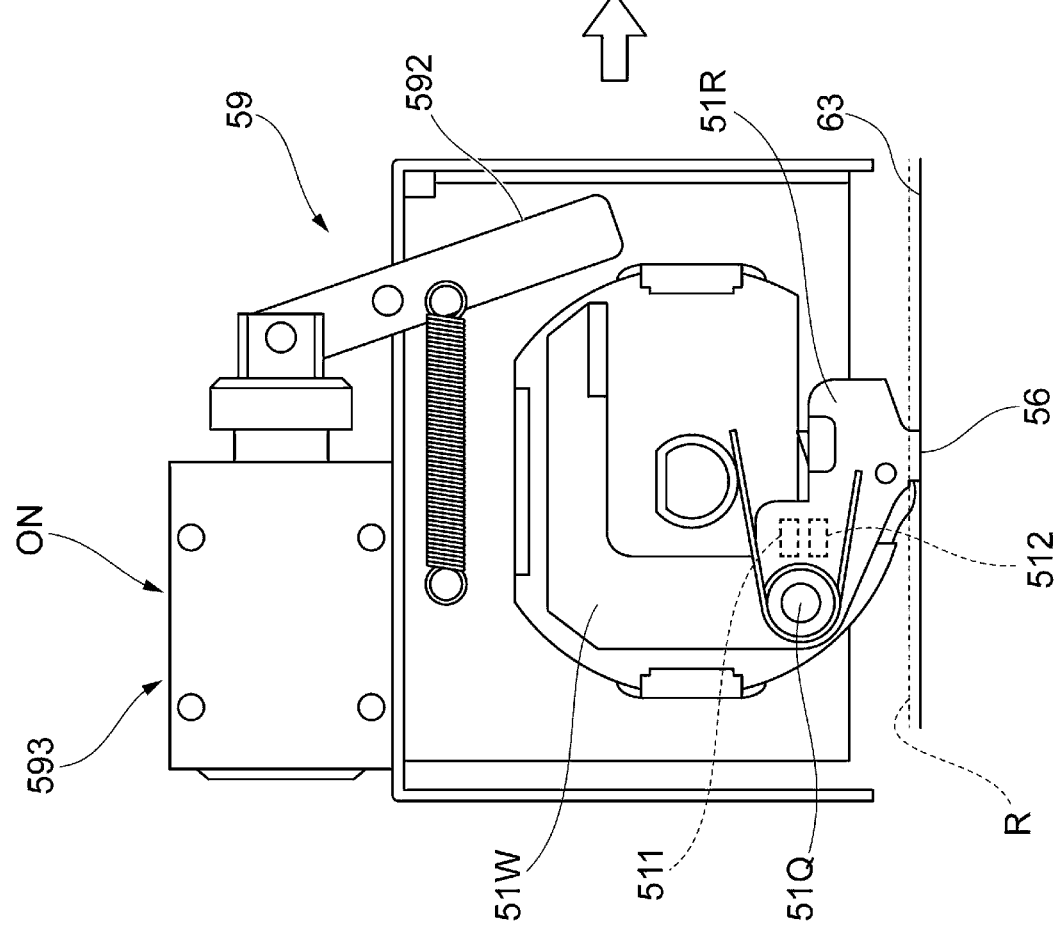

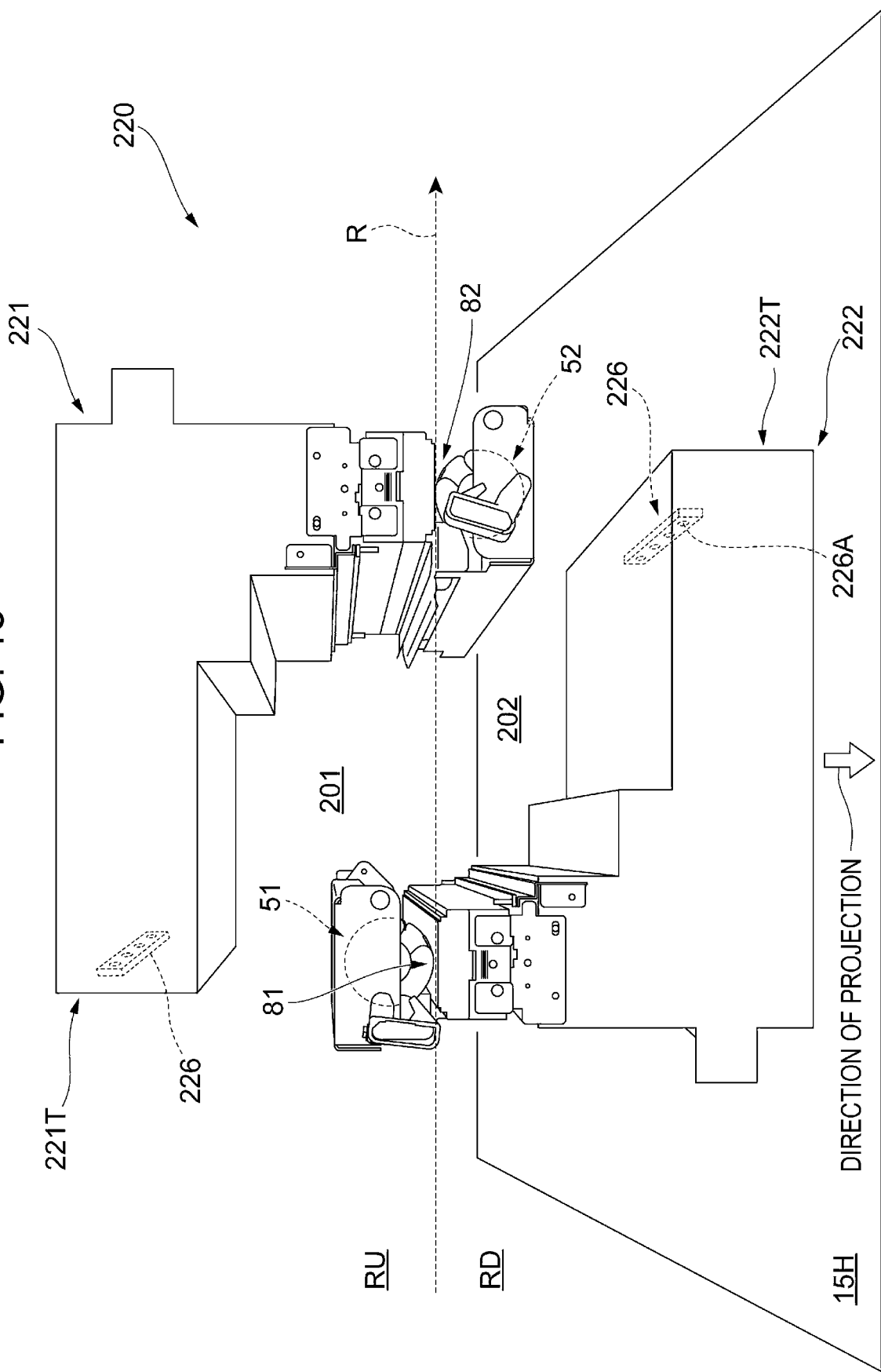

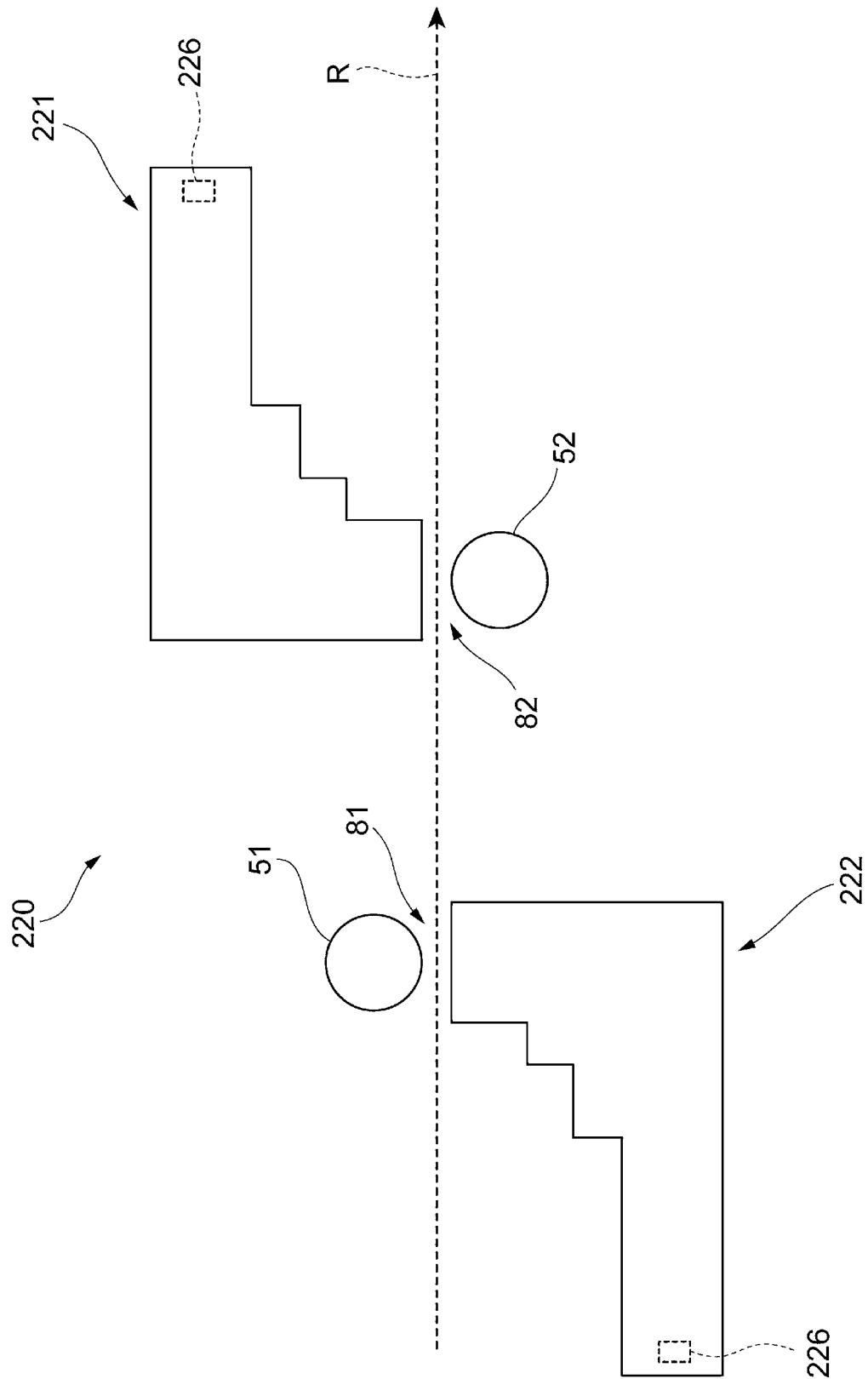

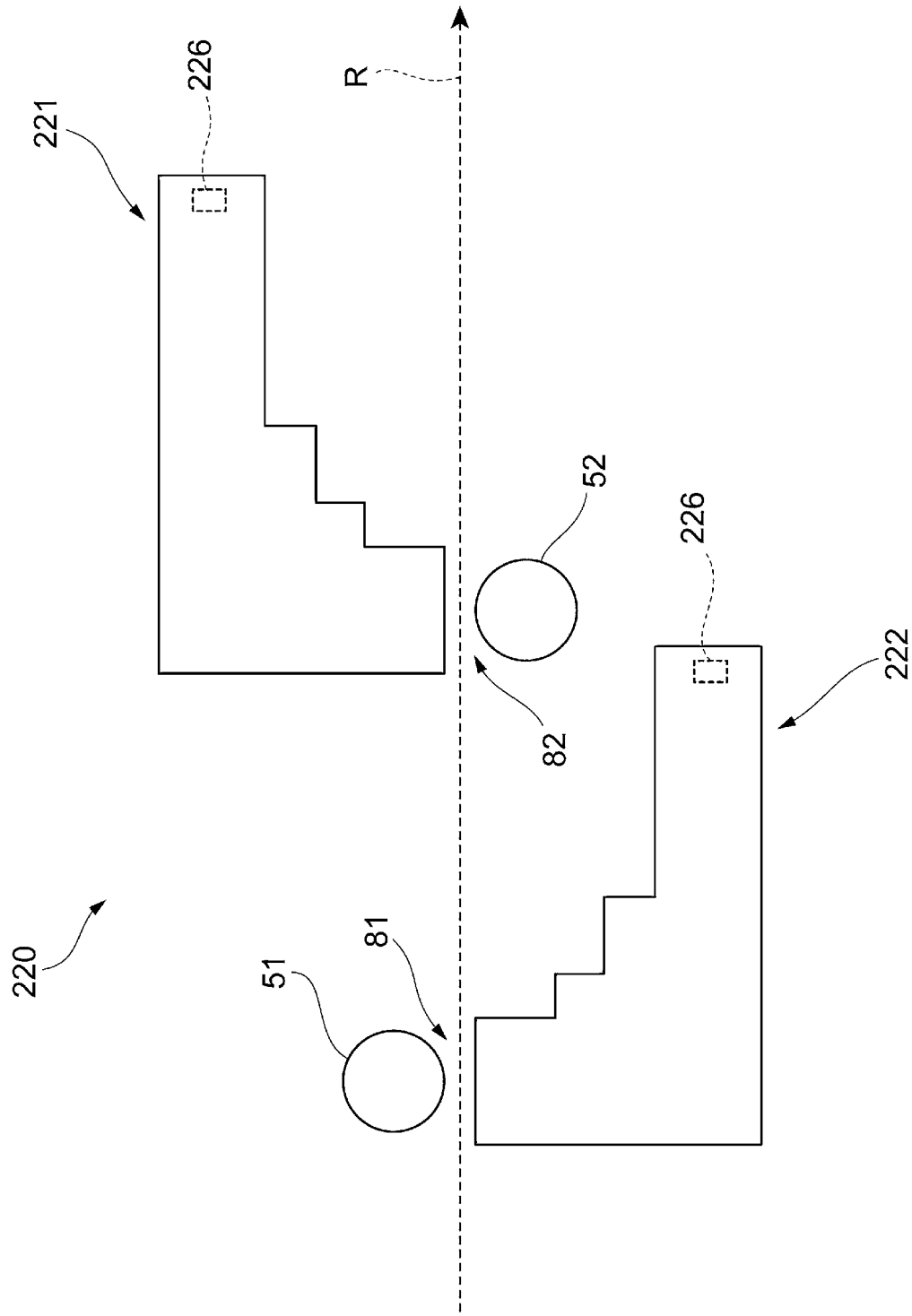

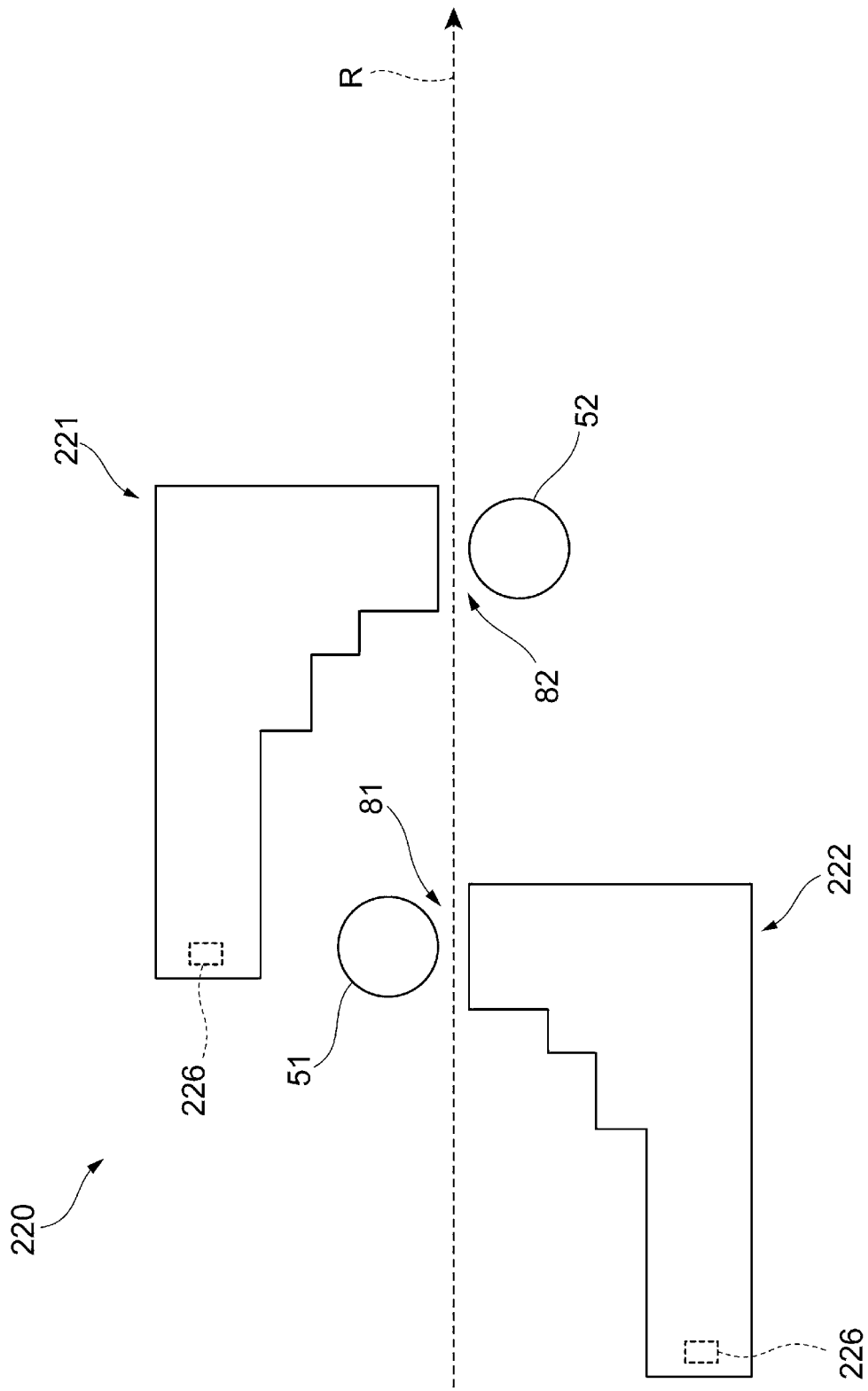

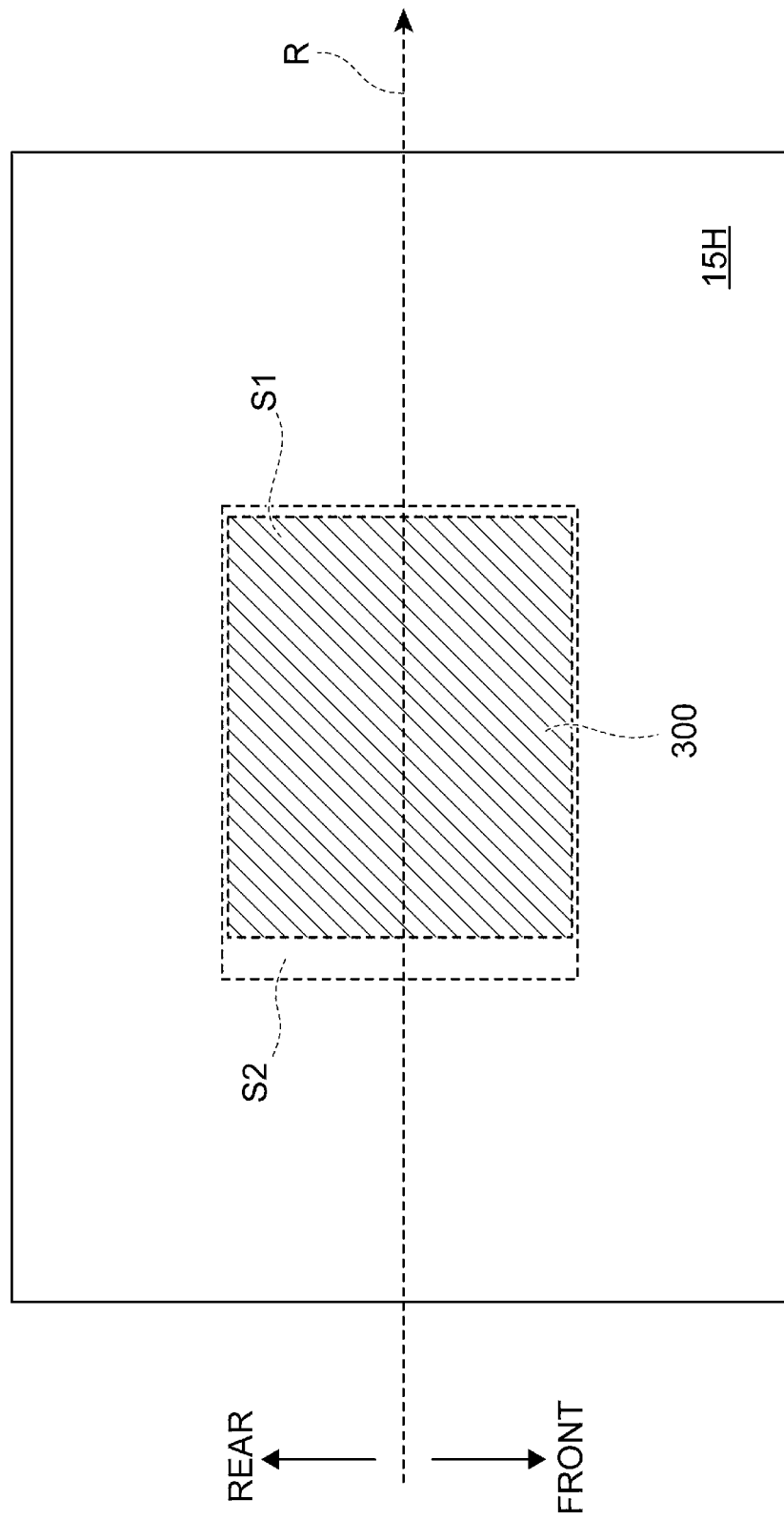

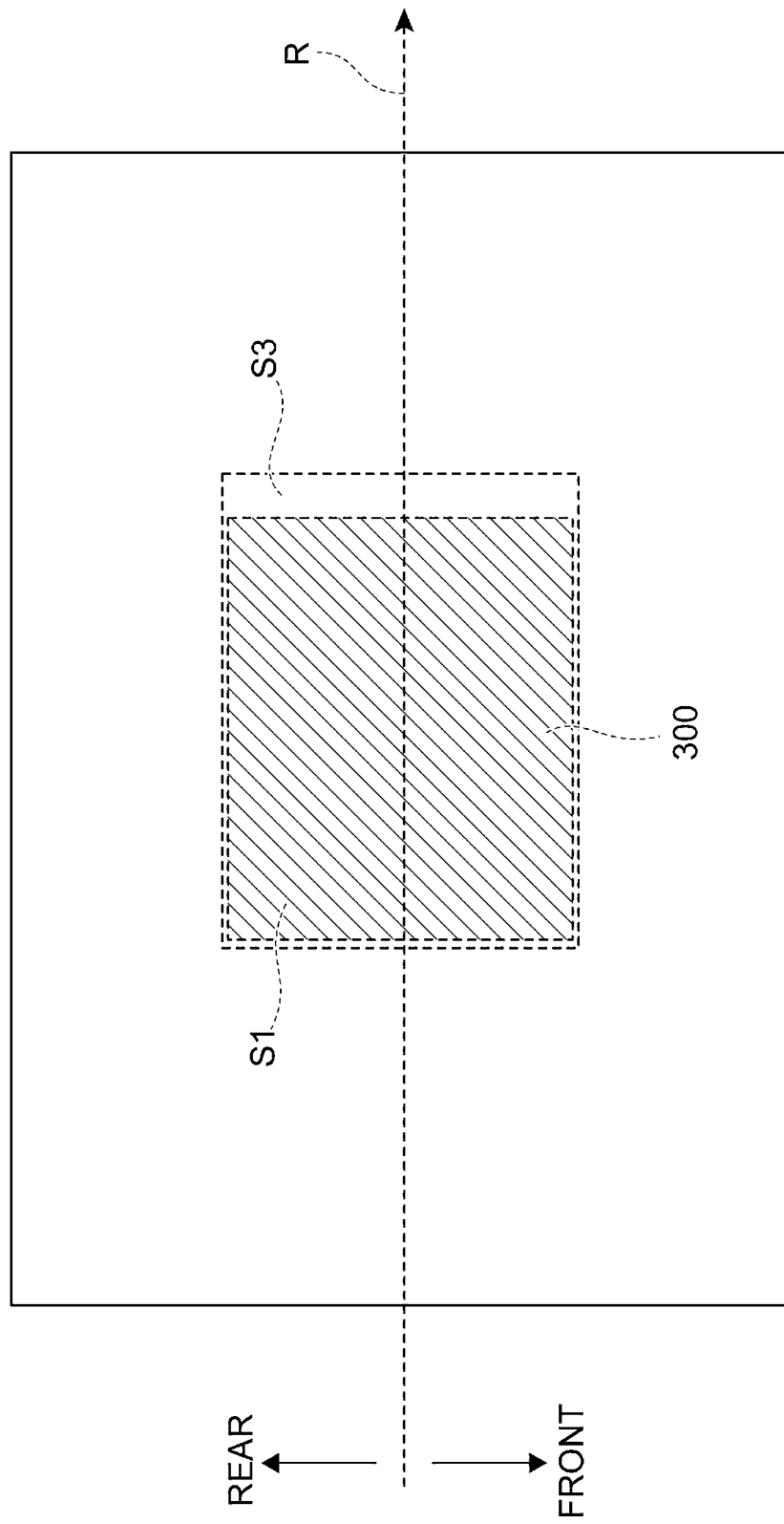

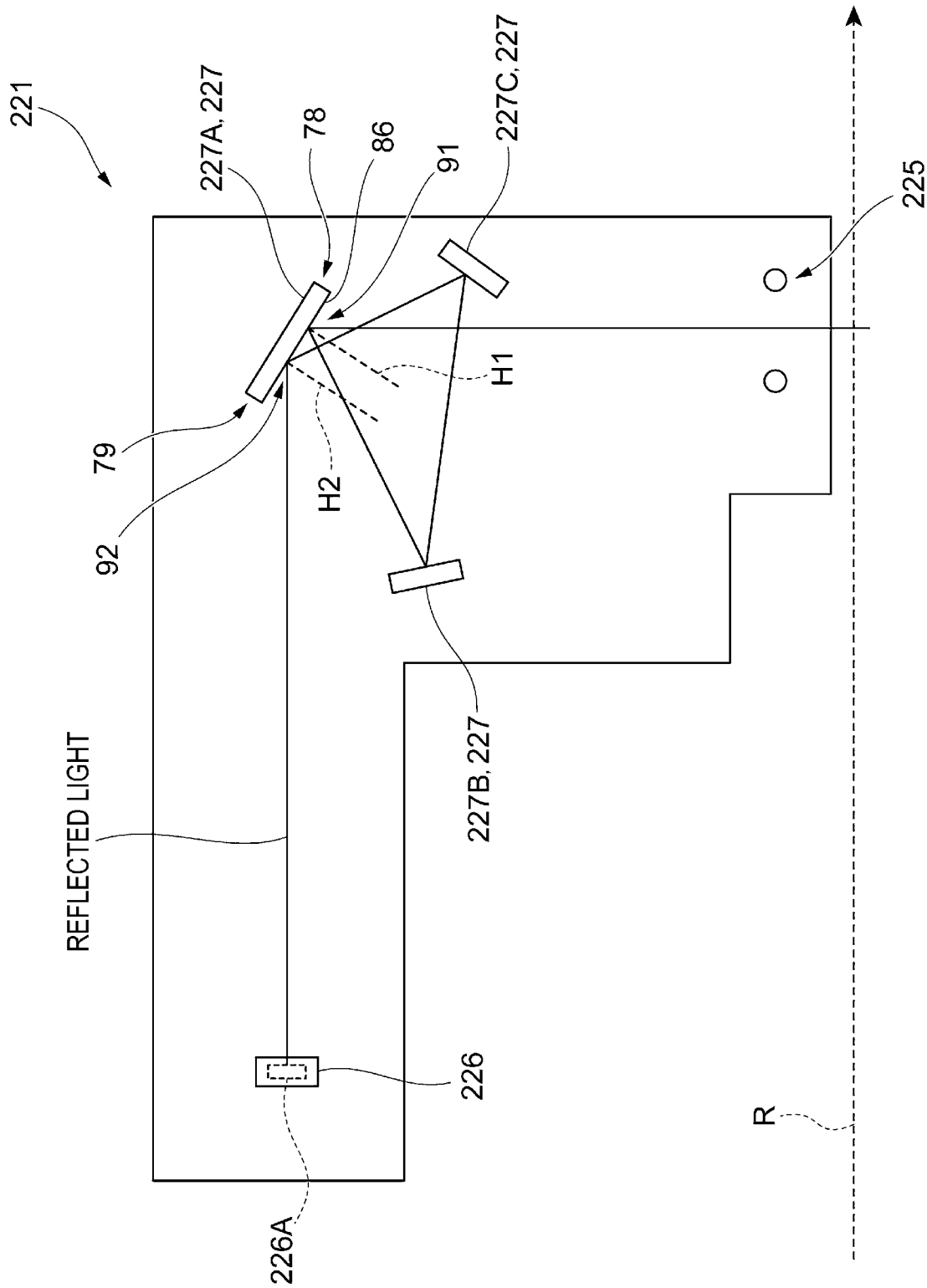

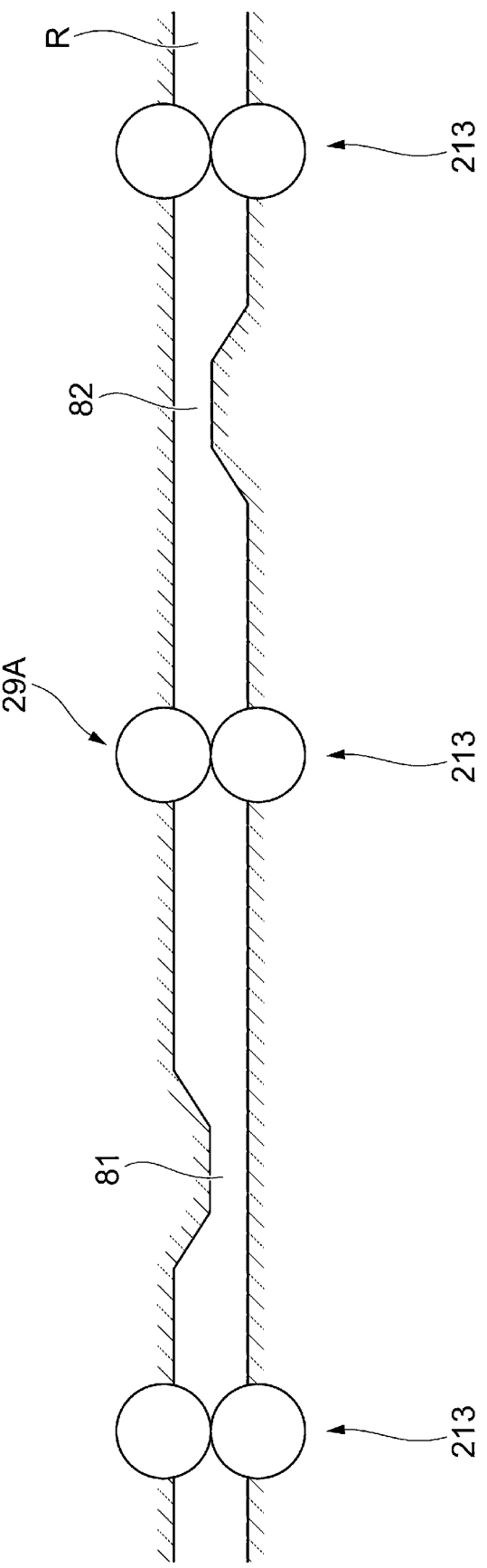

RECORDING-MATERIAL-TRANSPORTING APPARATUS AND IMAGE FORMING SYSTEM WITH OPPOSITELY ORIENTED IMAGE READERS

CROSS-REFERENCE TO RELATED APPLICATIONS

This application is based on and claims priority under 35 USC 119 from Japanese Patent Application No. 2022-052655 filed Mar. 28, 2022.

BACKGROUND

(i) Technical Field

The present disclosure relates to a recording-material-transporting apparatus and an image forming system.

(ii) Related Art

Japanese Unexamined Patent Application Publication No. 2005-354714 describes an image reading apparatus including a document transport path and a first reading unit. A document is transported from a paper feed tray to an output tray along the document transport path. The first reading unit reads the document from below at a first position while the document is being transported along the document transport path.

Japanese Unexamined Patent Application Publication No. 2008-67240 describes an image reading apparatus including a contact glass on which a document is placed, an illumination system that illuminates the document, a first running body, a second running body, an imaging lens that reduces and focuses a document image, and a line sensor.

SUMMARY

In an apparatus including plural image readers that read an image formed on a recording material, the volume of the space occupied by the image readers is greater than that in a structure in which a single image reader is provided. Accordingly, the apparatus tends to have a large size.

Aspects of non-limiting embodiments of the present disclosure relate to a small apparatus including plural image readers.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a recording-material-transporting apparatus including: a transport unit that transports a recording material and causes the recording material to pass through an upstream location and a downstream location that is positioned downstream of the upstream location in a recording-material-transporting direction in which the recording material is transported; an upstream reader including a light receiver that receives light reflected by the recording material, the upstream reader reading an image that is formed on a portion of the recording material positioned at the upstream location and that is formed on one surface of the recording material; and a downstream reader including a light receiver that receives light reflected by the recording material, the downstream reader reading an image that is formed on a portion of the recording material positioned at the downstream location and that is formed on other surface of the recording material, wherein the light receiver of the upstream reader is positioned downstream of the upstream location in the recording-material-transporting direction, and/or the light receiver of the downstream reader is positioned upstream of the downstream location in the recording-material-transporting direction.

BRIEF DESCRIPTION OF THE DRAWINGS

An exemplary embodiment of the present disclosure will be described in detail based on the following figures, wherein:

FIGS. 8A and 8B illustrate an operation of an advancing-and-retracting mechanism;

FIG. 15 illustrates an upper image reading unit and a lower image reading unit viewed from the front of the inspection device;

FIG. 16 illustrates another exemplary arrangement of the upper image reading unit and the lower image reading unit;

FIG. 17 illustrates another exemplary arrangement of the upper image reading unit and the lower image reading unit;

FIG. 18 illustrates another exemplary arrangement of the upper image reading unit and the lower image reading unit;

FIG. 19 is a top view of a plane;

FIG. 20 is another top view of the plane;

FIG. 21 illustrates the internal structure of the upper image reading unit;

FIG. 29 illustrates another exemplary structure of the sheet transport path.

DETAILED DESCRIPTION

An exemplary embodiment of the present disclosure will now be described in detail with reference to the drawings.

Figure 1:
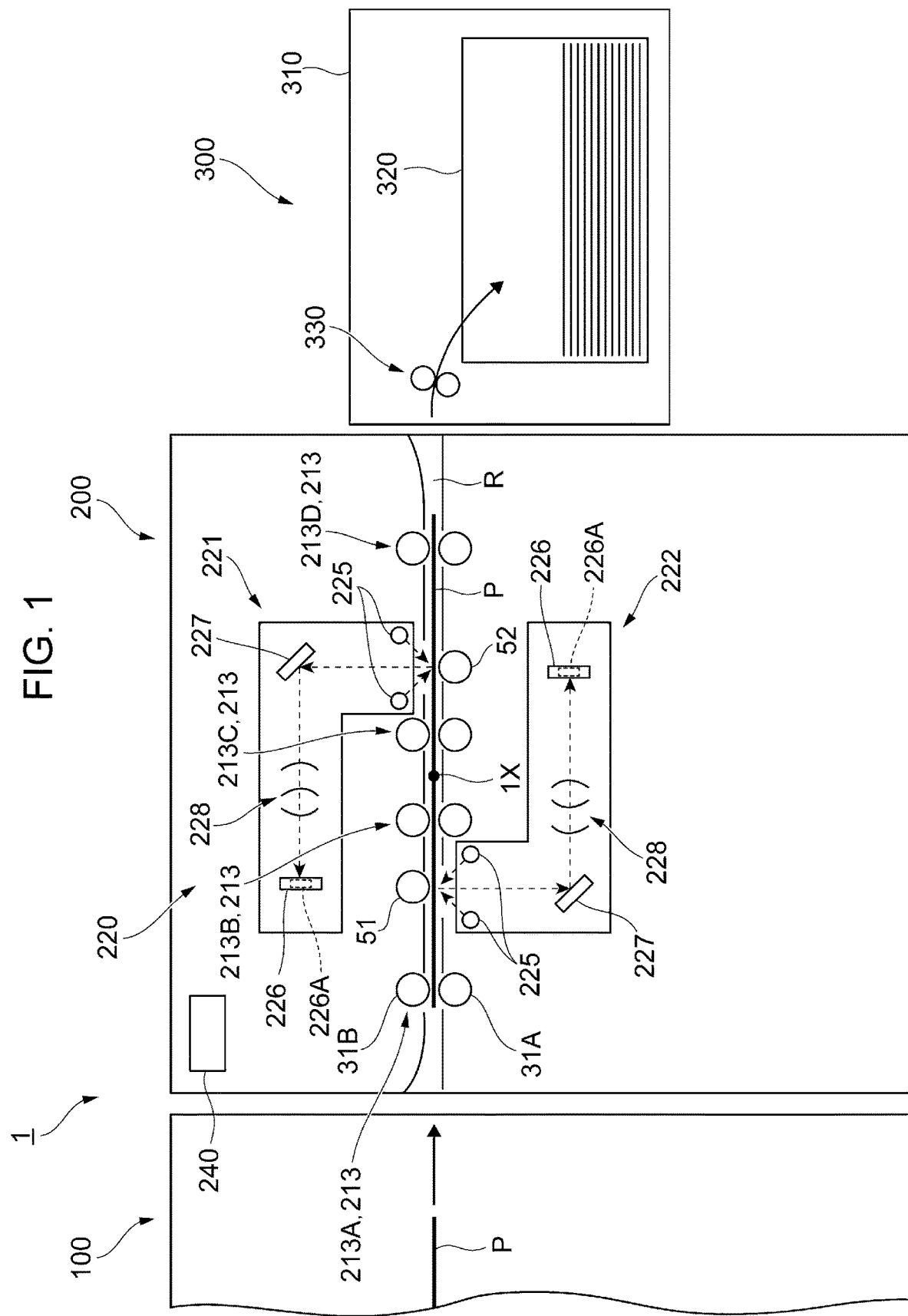
FIG. 1 illustrates the overall structure of an image forming system.

FIG. 1 illustrates the overall structure of an image forming system 1 according to the present exemplary embodiment.

The image forming system 1 according to the present exemplary embodiment includes an image forming apparatus 100, an inspection device 200, and a paper-sheet storage device 300. The image forming apparatus 100 forms an image on a paper sheet P, which is an example of a recording material. The inspection device 200 inspects the image formed on the paper sheet P by the image forming apparatus 100. The paper-sheet storage device 300 stores the paper sheet P output from the inspection device 200.

The image forming system 1 has a function of inspecting the image formed on the paper sheet P, and therefore may be regarded also as an image inspecting system.

The inspection device 200 has a function of transporting the paper sheet P, which is an example of a recording material, and therefore may be regarded also as a recording-material-transporting apparatus. The inspection device 200 also has a function of reading the image formed on the paper sheet P, and therefore may be regarded also as an image reading apparatus.

The image forming apparatus 100, which functions as an image forming member, acquires image data based on which an image is formed from a personal computer (PC), which is not illustrated.

The image forming apparatus 100 forms an image on the paper sheet P based on the acquired image data by using a material, such as toner.

The mechanism for forming an image on the paper sheet P is not particularly limited. An image may be formed on the paper sheet P by, for example, an electrophotographic method or an inkjet method.

The inspection device 200 includes a sheet transport path R, which is an example of a transport path along which the paper sheet P output from the image forming apparatus 100 is transported.

The inspection device 200 also includes plural transport roller units 213, which are examples of a transport unit that transports the paper sheet P along the sheet transport path R. In the present exemplary embodiment, the paper sheet P is transport downstream by the transport roller units 213.

In the present exemplary embodiment, the transport roller units 213 include an upstream transport roller unit 213A located most upstream in a transporting direction in which the paper sheet P is transported, and a downstream transport roller unit 213D located most downstream in the transporting direction of the paper sheet P.

The transport roller units 213 also include a first intermediate transport roller unit 213B and a second intermediate transport roller unit 213C that are disposed between the upstream transport roller unit 213A and the downstream transport roller unit 213D. The second intermediate transport roller unit 213C is disposed downstream of the first intermediate transport roller unit 213B.

Each of the transport roller units 213 includes a driving roller 31A that performs a rotational driving operation and a driven roller 31B that is pressed against the driving roller 31A and that rotates upon receiving a driving force from the driving roller 31A.

The driven roller 31B receives the driving force from the driving roller 31A through a contact portion at which the driving roller 31A and the driven roller 31B are in contact with each other. When the driving roller 31A rotates, the driven roller 31B receives the driving force from the driving roller 31A and rotates.

The inspection device 200 includes an image reading unit 220, which is an example of an image reader that reads an image formed on the paper sheet P.

In the present exemplary embodiment, an upper image reading unit 221 and a lower image reading unit 222 are provided as the image reading unit 220.

The upper image reading unit 221 is disposed above the sheet transport path R. The upper image reading unit 221 reads an image formed on an upper surface of the paper sheet P, which is an example of one surface of the two surfaces of the paper sheet P.

The lower image reading unit 222 is disposed below the sheet transport path R. The lower image reading unit 222 reads an image formed on a lower surface of the paper sheet P, which is an example of other surface of the two surfaces of the paper sheet P.

The inspection device 200 also includes a controller 240. The controller 240 controls each component of the inspection device 200.

Each of the upper image reading unit 221 and the lower image reading unit 222 includes light sources 225 that emit light toward the paper sheet P, a light receiver 226 that receives light reflected by the paper sheet P, and light reflecting members 227 that reflect the light reflected by the paper sheet P toward the light receiver 226.

The light reflecting members 227 are composed of mirrors and have light reflecting surfaces. In the present exemplary embodiment, plural light reflecting members 227 are provided.

The light receiver 226 includes plural light receiving elements 226A composed of, for example, photodiodes. The light reflected by the paper sheet P is received by the light receiving elements 226A.

The light receiving elements 226A are aligned in one direction. More specifically, the light receiving elements 226A are arranged in a direction orthogonal to the plane of FIG. 1.

In other words, the light receiving elements 226A are arranged in a direction orthogonal to the transporting direction in which the paper sheet P is transported in the inspection device 200 and orthogonal to the thickness direction of the paper sheet P that is transported.

Each of the upper image reading unit 221 and the lower image reading unit 222 also includes an imaging optical system 228 that includes lenses and focuses the light reflected by the light reflecting members 227 on the light receiver 226.

In the present exemplary embodiment, each of the upper image reading unit 221 and the lower image reading unit 222 is an image reading unit including a reduction optical system.

In the present exemplary embodiment, an upper rotating member 51, which is rotatable, is disposed opposite the lower image reading unit 222 with the sheet transport path R provided therebetween. A lower rotating member 52, which is rotatable, is disposed opposite the upper image reading unit 221 with the sheet transport path R provided therebetween.

The controller 240 includes, for example, a central processing unit (CPU), which is an example of a processor that executes a calculation process; a non-volatile read only memory (ROM) or a hard disk drive (HDD) in which a control program is stored; and a random access memory (RAM) that temporarily stores data.

In the present exemplary embodiment, the controller 240 controls each component of the inspection device 200 by executing the control program stored in, for example, the ROM.

The paper-sheet storage device 300 includes a housing 310. The paper-sheet storage device 300 also includes a sheet stacking section 320.

In the present exemplary embodiment, the sheet stacking section 320 is disposed in the housing 310. Paper sheets P that are successively output from the inspection device 200 are stacked on the sheet stacking section 320.

The paper-sheet storage device 300 also includes a feed roller 330 that feeds the paper sheets P output from the inspection device 200 toward the sheet stacking section 320.

Figure 2:
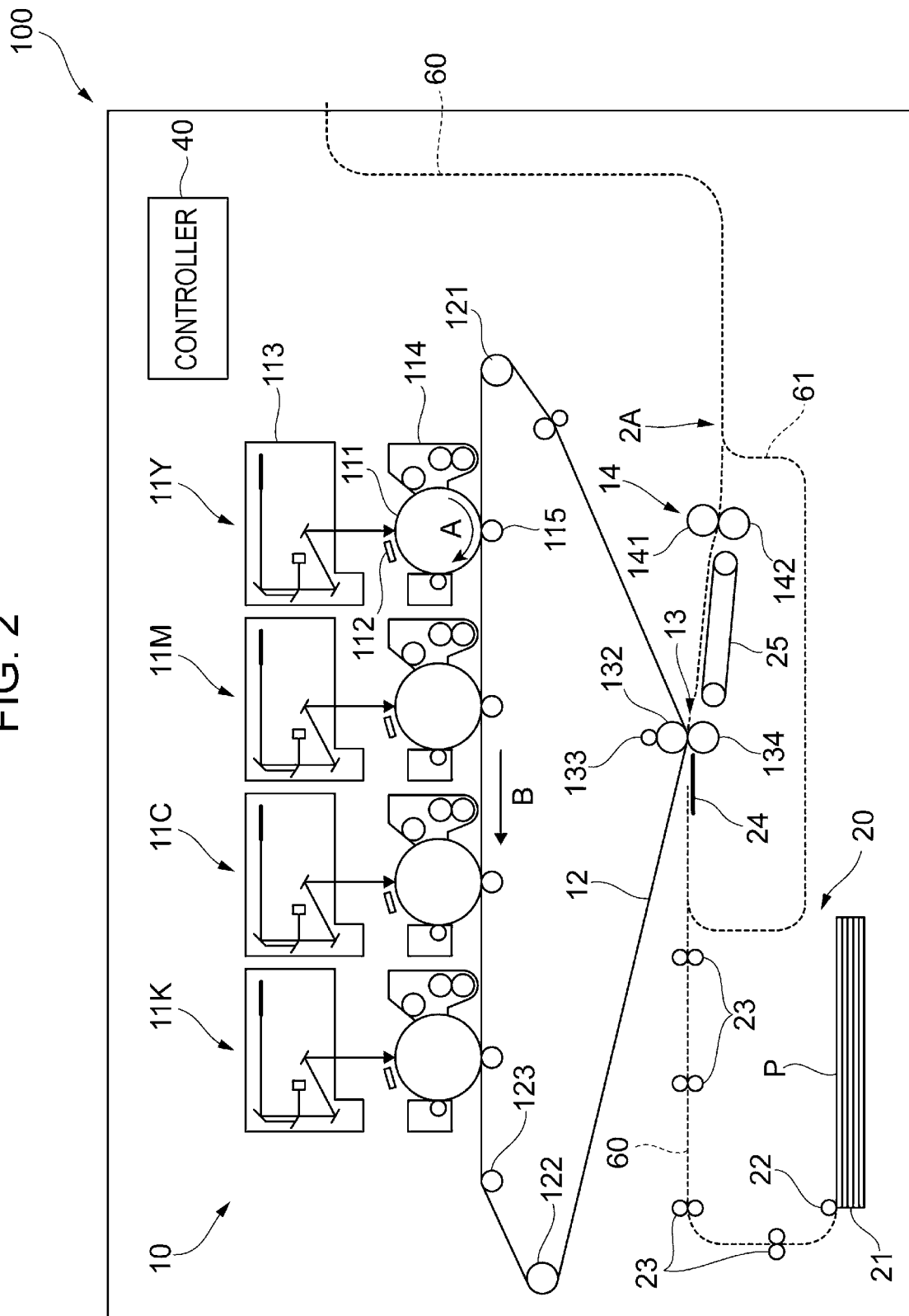
FIG. 2 illustrates an image forming apparatus.

FIG. 2 illustrates the image forming apparatus 100.

FIG. 2 illustrates an example of the image forming apparatus 100, and the structure of the image forming apparatus 100 is not limited to that illustrated in FIG. 2. The image forming apparatus 100 illustrated in FIG. 2 forms an image by an electrophotographic method. However, the image forming apparatus 100 may instead be an apparatus that forms an image by, for example, an inkjet method.

Alternatively, the image forming apparatus 100 may be an apparatus that forms an image by a method other than the electrophotographic method or the inkjet method.

The image forming apparatus 100 includes an image forming section 10, a sheet transport section 20, and a controller 40.

The image forming section 10 includes image forming units 11 (11Y, 11M, 11C, and 11K), an intermediate transfer belt 12, a second transfer unit 13, and a fixing device 14.

In the present exemplary embodiment, four image forming units 11Y, 11M, 11C, and 11K are provided as the image forming units 11. The image forming units 11Y, 11M, 11C, and 11K correspond to toners of four colors, which are yellow (Y), magenta (M), cyan (C), and black (K).

The four image forming units 11Y, 11M, 11C, and 11K are arranged in a direction in which the intermediate transfer belt 12 moves, and form toner images by the electrophotographic method.

Each of the four image forming units 11Y, 11M, 11C, and 11K includes a photoconductor drum 111, a charging unit 112, an exposure unit 113, a developing unit 114, and a first transfer unit 115.

Each of the four image forming units 11Y, 11M, 11C, and 11K forms a toner image of a corresponding color, which is one of Y, M, C, and K, and transfers the formed toner image to the intermediate transfer belt 12. Accordingly, the toner images of respective colors, which are Y, M, C, and K, are superposed to form a toner image on the intermediate transfer belt 12.

The photoconductor drum 111 rotates at a predetermined speed in the direction of arrow A in FIG. 2. The charging unit 112 charges the peripheral surface of the photoconductor drum 111 to a predetermined potential. The exposure unit 113 emits light toward the charged peripheral surface of the photoconductor drum 111, and thereby forms an electrostatic latent image on the peripheral surface of the photoconductor drum 111.

The developing unit 114 forms a toner image by causing toner to adhere to the electrostatic latent image formed on the peripheral surface of the photoconductor drum 111. The first transfer unit 115 transfers the toner image formed on the peripheral surface of the photoconductor drum 111 to the intermediate transfer belt 12.

A voltage of a polarity opposite to the polarity to which the toner is charged is applied to the first transfer unit 115. Accordingly, the toner image formed on the peripheral surface of the photoconductor drum 111 is electrostatically attracted to the intermediate transfer belt 12. As a result, toner images of respective colors are superposed to form a single toner image on the intermediate transfer belt 12.

The intermediate transfer belt 12 is supported by plural roller-shaped members. The intermediate transfer belt 12 is a belt-shaped member that circulates in the direction of arrow B in FIG. 2.

In the present exemplary embodiment, the roll-shaped members include a driving roller 121 that is driven by a motor (not illustrated) and drives the intermediate transfer belt 12; a tension roller 122 that applies a tension to the intermediate transfer belt 12; an idle roller 123 that supports the intermediate transfer belt 12; and a backup roller 132.

The sheet transport section 20 includes a sheet storing unit 21 in which a stack of paper sheets P is stored and a pickup roller 22 that feeds and transports the paper sheets P stored in the sheet storing unit 21.

The sheet transport section 20 also includes transport roller units 23 and a guide 24. The transport roller units 23 transport each paper sheet P fed by the pickup roller 22 along a sheet transport path 60. The guide 24 guides the paper sheet P transported by the transport roller units 23 to the second transfer unit 13.

The sheet transport section 20 also includes a transport belt 25 that transports the paper sheet P subjected to a second transfer process to the fixing device 14.

The second transfer unit 13 includes a second transfer roller 134 disposed in contact with an outer surface of the intermediate transfer belt 12 and a backup roller 132 that is disposed inside the intermediate transfer belt 12 and that serves as a counter electrode for the second transfer roller 134.

In addition, in the present exemplary embodiment, a power supply roller 133 made of a metal is provided to apply a second transfer bias to the backup roller 132.

In the second transfer unit 13, the toner image formed on the intermediate transfer belt 12 is transferred to the paper sheet P that is transported to the second transfer unit 13.

The fixing device 14 is disposed downstream of the second transfer unit 13 in the transporting direction of the paper sheet P. The fixing device 14 includes a fixing roller 141 having a heat source (not illustrated) and a pressing roller 142 that faces the fixing roller 141 and presses the fixing roller 141.

In the present exemplary embodiment, the paper sheet P that has passed through the second transfer unit 13 is transported to the position between the fixing roller 141 and the pressing roller 142, and the unfixed toner image on the paper sheet P is melted and fixed to the paper sheet P. Thus, an image composed of the toner image is formed on the paper sheet P.

The image forming apparatus 100 according to the present exemplary embodiment is capable of forming images on both surfaces of the paper sheet P, and includes a reversing transport path 61 used when images are formed on both surfaces of the paper sheet P.

The reversing transport path 61 branches from the sheet transport path 60 at a location downstream of the fixing device 14. Assuming that a connecting portion 2A at which the reversing transport path 61 is connected to the sheet transport path 60 serves as a start point, the reversing transport path 61 extends leftward in FIG. 2 from the start point and merges with the sheet transport path 60 at a location upstream of the second transfer unit 13.

When images are to be formed on both surfaces of the paper sheet P, the paper sheet P having an image formed on one surface thereof is once transported downstream beyond the connecting portion 2A. Then, the transporting direction of the paper sheet P is reversed. Accordingly, the edge that has been serving as the trailing edge in the transporting direction of the paper sheet P serves as the leading edge, and the paper sheet P is fed into the reversing transport path 61.

The paper sheet P is transported along the reversing transport path 61 and supplied to the second transfer unit 13 again.

Accordingly, the second transfer unit 13 transfers a toner image to the other surface of the paper sheet P. After that, the paper sheet P moves toward the fixing device 14, and the fixing device 14 fixes the toner image to the paper sheet P. According to this process, images are formed on both surfaces of the paper sheet P.

The formation of images on both surfaces of the paper sheet P is not limited to this. For example, an image forming section may be provided for each of one and the other surfaces of the paper sheet P, and the image forming sections provided for the respective surfaces may be used to form images on both surfaces of the paper sheet P.

Figure 3:
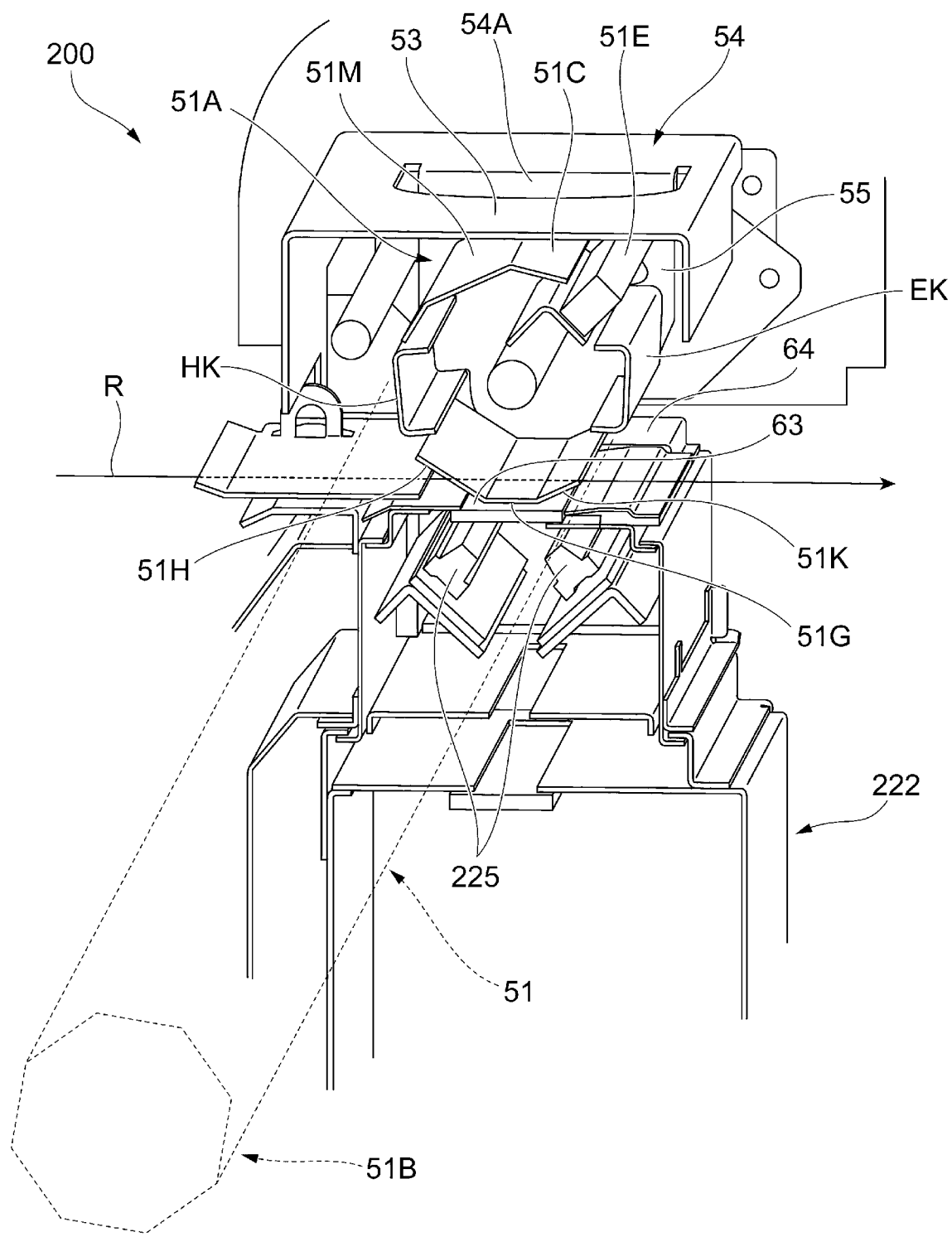
FIG. 3 is a vertical sectional view of a part of an inspection device in which an upper rotating member is installed.

FIG. 3 is a vertical sectional view of a part of the inspection device 200 in which the upper rotating member 51 is installed.

More specifically, FIG. 3 is a sectional view of the inspection device 200 taken along a plane that is orthogonal to an axial direction of the upper rotating member 51 and that is close to a first end portion 51A of the upper rotating member 51.

In the present exemplary embodiment, the upper rotating member 51 includes the first end portion 51A and a second end portion 51B located at different positions in the axial direction. FIG. 3 illustrates a cross section of the inspection device 200 taken along a vertical plane that is close to the first end portion 51A.

Although the upper rotating member 51 will be described below with reference to FIGS. 3 and 4, the lower rotating member 52 has a structure similar to that of the upper rotating member 51.

In the present exemplary embodiment, the lower image reading unit 222 is disposed on one side, which is a lower side, of the sheet transport path R. The lower image reading unit 222 reads an image formed on one surface of the paper sheet P transported along the sheet transport path R.

The lower image reading unit 222 includes a light transmitting portion 63 that is disposed at the one side, which is the lower side, of the sheet transport path R and that transmits light reflected by the paper sheet P. The light transmitting portion 63 is made of, for example, glass. The light transmitting portion 63 may be made of a material other than glass as long as the material is capable of transmitting light.

The lower image reading unit 222 also includes a positioning member 64 disposed around the light transmitting portion 63. In the present exemplary embodiment, the positioning member 64 supports the light transmitting portion 63.

In the present exemplary embodiment, the upper rotating member 51 is disposed opposite the lower image reading unit 222 with the sheet transport path R provided therebetween.

The upper rotating member 51 has a polygonal shape and includes plural flat surfaces 51C arranged in the circumferential direction of the upper rotating member 51 on an outer surface of the upper rotating member 51.

In the present exemplary embodiment, a white reference plate HK, which is an example of a calibration member and is white in color, is provided on one or more of the flat surfaces 51C. In the present exemplary embodiment, a color calibration plate EK, which is another example of a calibration member, is provided on another one or more of the flat surfaces 51C.

The white reference plate HK and the color calibration plate EK are elongated and extend in the axial direction of the upper rotating member 51. The color calibration plate EK includes, for example, plural color patches in different colors that are arranged in the axial direction of the upper rotating member 51.

In the present exemplary embodiment, the white reference plate HK and the color calibration plate EK are positioned to face the lower image reading unit 222 while the paper sheet P is not being transported. Then, the lower image reading unit 222 performs a reading process on the white reference plate HK and the color calibration plate EK.

In the present exemplary embodiment, the result of the reading process performed by the lower image reading unit 222 is used to calibrate the lower image reading unit 222.

More specifically, for example, the result of the above-described reading process is used to generate correction parameters for correcting image data obtained as a result of an image reading process performed by the lower image reading unit 222 or to change reading conditions under which the lower image reading unit 222 performs the image reading process.

In addition, in the present exemplary embodiment, a cleaning member 51E that cleans the light transmitting portion 63 is provided on another one or more of the flat surfaces 51C of the upper rotating member 51.

In addition, in the present exemplary embodiment, a sheet guide 51G that guides the paper sheet P that is transported is provided on the outer surface of the upper rotating member 51. The sheet guide 51G is constituted by one of the flat surfaces 51C provided on the outer surface of the upper rotating member 51.

In the present exemplary embodiment, when the lower image reading unit 222 performs the image reading process, the sheet guide 51G is disposed to face the lower image reading unit 222. More specifically, the sheet guide 51G is disposed to face the light transmitting portion 63.

In addition, when the lower image reading unit 222 performs the image reading process, the sheet guide 51G is disposed parallel to the light transmitting portion 63.

In the present exemplary embodiment, when the lower image reading unit 222 performs the image reading process, the paper sheet P passes between the sheet guide 51G and the light transmitting portion 63.

At this time, the sheet guide 51G guides the paper sheet P. In the present exemplary embodiment, the lower image reading unit 222 reads an image formed on the paper sheet P while the paper sheet P passes between the sheet guide 51G and the light transmitting portion 63.

In addition, in the present exemplary embodiment, the upper rotating member 51 includes an upstream guide 51H and a downstream guide 51K. The upstream guide 51H and the downstream guide 51K are also constituted by respective ones of the flat surfaces 51C of the upper rotating member 51.

When the sheet guide 51G is positioned to face the light transmitting portion 63, the upstream guide 51H is positioned upstream of the sheet guide 51G. In addition, when the sheet guide 51G is positioned to face the light transmitting portion 63, the upstream guide 51H is inclined with respect to the transporting direction of the paper sheet P.

When the sheet guide 51G is positioned to face the light transmitting portion 63, the upstream guide 51H is disposed to extend downstream in the transporting direction of the paper sheet P and toward the light transmitting portion 63.

When the sheet guide 51G is positioned to face the light transmitting portion 63, the downstream guide 51K is positioned downstream of the sheet guide 51G. In addition, when the sheet guide 51G is positioned to face the light transmitting portion 63, the downstream guide 51K is inclined with respect to the transporting direction of the paper sheet P.

When the sheet guide 51G is positioned to face the light transmitting portion 63, the downstream guide 51K is disposed to extend downstream in the transporting direction of the paper sheet P and away from the light transmitting portion 63.

In the present exemplary embodiment, the sheet guide 51G, the upstream guide 51H, and the downstream guide 51K are formed by bending a single metal plate. In the present exemplary embodiment, the sheet guide 51G, the upstream guide 51H, and the downstream guide 51K are integrated together.

In addition, in the present exemplary embodiment, a facing portion 51M is constituted by another one or more of the flat surfaces 51C of the upper rotating member 51. In the present exemplary embodiment, the facing portion 51M is disposed to face the light transmitting portion 63 when the paper sheet P is caused to pass between the light transmitting portion 63 and the upper rotating member 51 while the lower image reading unit 222 does not perform the image reading process.

In the present exemplary embodiment, the distance between the facing portion 51M and the light transmitting portion 63 in a state in which the facing portion 51M is positioned to face the light transmitting portion 63 is greater than the distance between the sheet guide 51G and the light transmitting portion 63 in a state in which the sheet guide 51G is positioned to face the light transmitting portion 63.

In the present exemplary embodiment, a retracting portion 53 that is retractable from the sheet transport path R is provided. The retracting portion 53 is disposed above the sheet transport path R. In the present exemplary embodiment, the retracting portion 53 is upwardly movable. The retracting portion 53 extends in the axial direction of the upper rotating member 51.

The retracting portion 53 is constituted by a portion of a metal housing 54 formed by bending a metal plate. In the present exemplary embodiment, the housing 54 supports the upper rotating member 51 in a rotatable manner.

In the present exemplary embodiment, the upper rotating member 51 is supported by a rotating member support 55. In the present exemplary embodiment, the rotating member support 55 is constituted by a portion of the housing 54.

The rotating member support 55 is plate-shaped and disposed to extend in the up-down direction in FIG. 3. The rotating member support 55 projects toward the sheet transport path R from a location separated from the sheet transport path R.

In the present exemplary embodiment, the first end portion 51A of the upper rotating member 51 is supported on the retracting portion 53 by the rotating member support 55.

In addition, in the present exemplary embodiment, the rotating member support 55 contacts the positioning member 64 disposed around the light transmitting portion 63. In other words, in the present exemplary embodiment, the rotating member support 55 that supports the upper rotating member 51 contacts the lower image reading unit 222.

In addition, in the present exemplary embodiment, the retracting portion 53 and the rotating member support 55 are integrated together. More specifically, in the present exemplary embodiment, the retracting portion 53 and the rotating member support 55 are formed of a metal plate, and the rotating member support 55 is formed by bending the metal plate.

In the present exemplary embodiment, the retracting portion 53 is connected to the rotating member support 55 at a bent portion 54A formed by bending a metal plate at an intermediate position.

The retracting portion 53 and the rotating member support 55 are formed of a single metal plate. Thus, the retracting portion 53 and the rotating member support 55 are integrated together.

Figure 4:
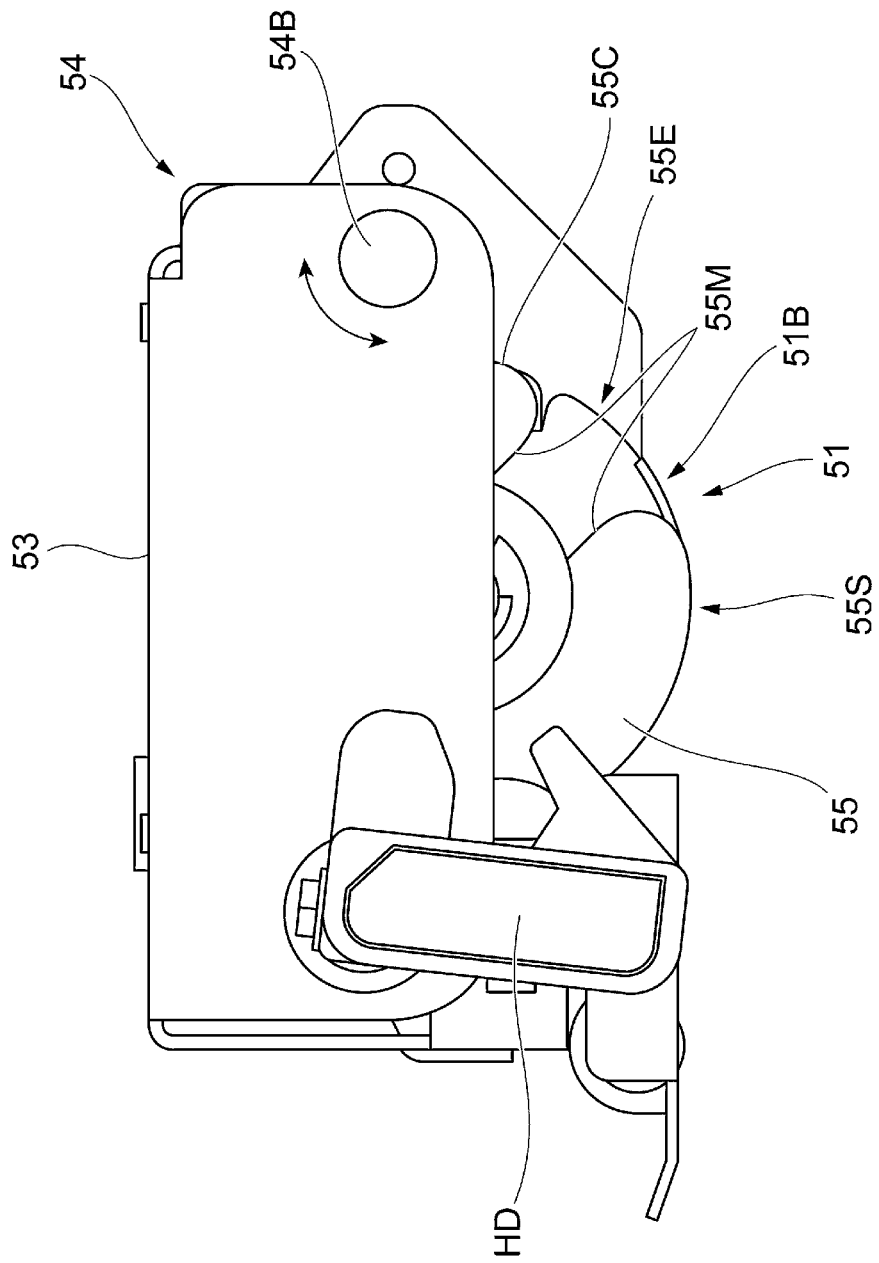
FIG. 4 is a front view of the upper rotating member and a housing viewed from the front of the inspection device.

FIG. 4 is a front view of the upper rotating member 51 and the housing 54 viewed from the front of the inspection device 200.

In the present exemplary embodiment, another rotating member support 55 for supporting the upper rotating member 51 is provided at the front of the inspection device 200. In the present exemplary embodiment, the rotating member support 55 illustrated in FIG. 4 supports the second end portion 51B of the upper rotating member 51.

In the present exemplary embodiment, the rotating member supports 55 are provided at the front and rear of the inspection device 200, and both ends of the upper rotating member 51 in the axial direction thereof are supported by the rotating member supports 55.

In addition, in the present exemplary embodiment, the housing 54 is rotatable about a rotating shaft 54B that extends in the depth direction of the inspection device 200. When the housing 54 is rotated clockwise about the rotating shaft 54B in FIG. 4, the retracting portion 53 is retracted from the sheet transport path R (see FIG. 3).

More specifically, in the present exemplary embodiment, when the retracting portion 53 is to be retracted, a user operates a handle HD to move the handle HD upward.

When the retracting portion 53 is retracted, the upper rotating member 51 is also retracted from the sheet transport path R.

In the present exemplary embodiment, each rotating member support 55 is disposed above the sheet transport path R (see FIG. 3).

In addition, each rotating member support 55 projects toward the lower image reading unit 222 (see FIG. 3) disposed below the sheet transport path R.

In addition, as illustrated in FIG. 4, each rotating member support 55 has a groove 55M that accommodates a portion of the upper rotating member 51. The groove 55M extends from an outer peripheral edge 55C of the rotating member support 55 toward an inner region of the rotating member support 55.

The outer peripheral edge 55C of the rotating member support 55 has an entrance 55E of the groove 55M. The entrance 55E is provided at a location separated from an end portion 55S of the rotating member support 55 in a direction in which the rotating member support 55 projects.

Accordingly, in the present exemplary embodiment, each rotating member support 55 contacts the lower image reading unit 222 (see FIG. 3) only at one position, that is, at the end portion 55S of the rotating member support 55.

Figure 5:
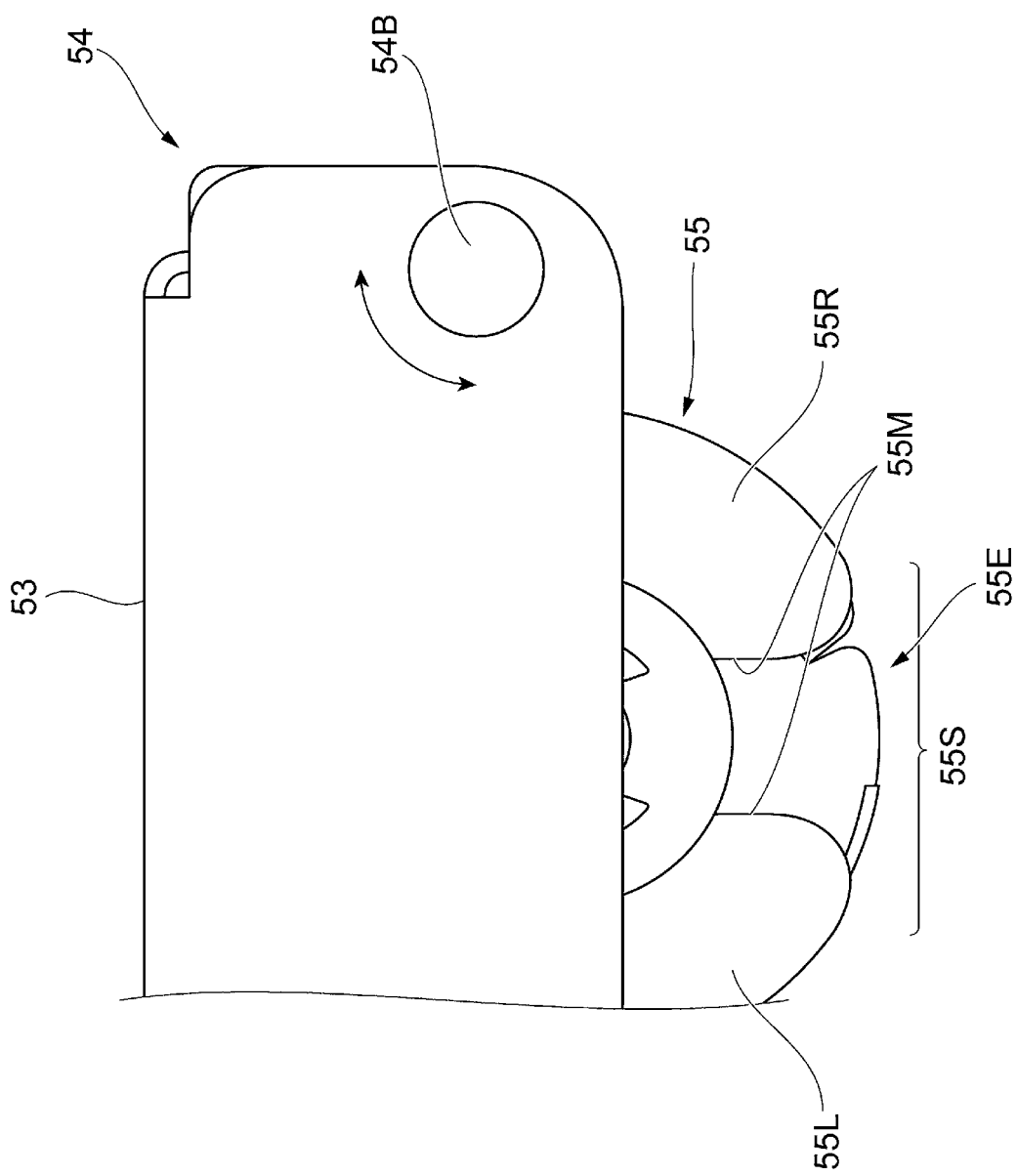
FIG. 5 illustrates another exemplary structure of a rotating member support.

Assume that, as in FIG. 5 illustrating another exemplary structure of each rotating member support 55, the entrance 55E of the groove 55M is provided at the end portion 55S of the rotating member support 55.

In this case, due to a dimensional tolerance of the rotating member support 55, for example, one portion 55L provided on one side of the groove 55M may contact the lower image reading unit 222 (see FIG. 3), or another portion 55R provided on the other side of the groove 55M may contact the lower image reading unit 222.

In this case, the rotating member support 55 is unstably supported by the lower image reading unit 222, and the accuracy with which the upper rotating member 51 is positioned with respect to the lower image reading unit 222 is reduced.

In contrast, when the entrance 55E of the groove 55M is at a location separated from the end portion 55S of the rotating member support 55 as in the present exemplary embodiment, the rotating member support 55 contacts the lower image reading unit 222 only at one position, that is, at the end portion 55S.

In this case, the reduction in the accuracy with which the upper rotating member 51 is positioned with respect to the lower image reading unit 222 may be suppressed.

In the present exemplary embodiment, the upper rotating member 51 supported by the rotating member supports 55 (see FIG. 4) is disposed such that the upper rotating member 51 is not in contact with the lower image reading unit 222.

In the present exemplary embodiment, the rotating member supports 55 contact the lower image reading unit 222. However, the upper rotating member 51 is disposed such that the upper rotating member 51 is not in contact with the lower image reading unit 222.

In the present exemplary embodiment, the rotating member supports 55 are brought into contact with the lower image reading unit 222 to position the upper rotating member 51 with respect to the lower image reading unit 222.

Figure 6:
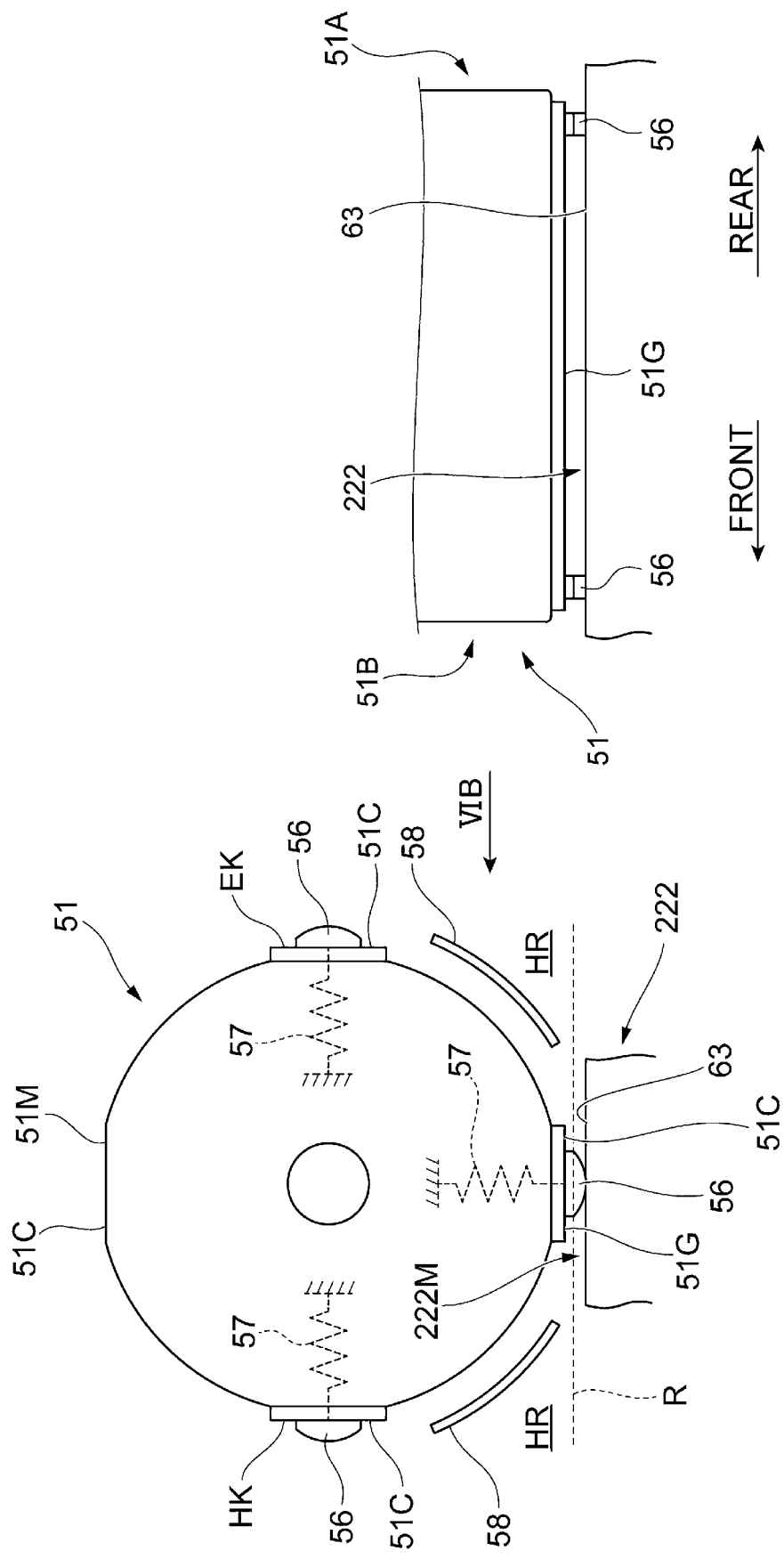
FIGS. 6A and 6B illustrate an upper rotating member having another exemplary structure.

FIGS. 6A and 6B illustrate another exemplary structure of the upper rotating member 51. FIG. 6A illustrates the upper rotating member 51 viewed along the extension of a central axis of the upper rotating member 51. FIG. 6B illustrates the upper rotating member 51 viewed in the direction of arrow VIB in FIG. 6A.

In the exemplary structure illustrated in FIGS. 6A and 6B, portions of upper rotating member 51 contact the lower image reading unit 222.

More specifically, in the exemplary structure illustrated in FIGS. 6A and 6B, the upper rotating member 51 includes contact portions 56 that contact the lower image reading unit 222. The contact portions 56, which are portions of the upper rotating member 51, contact the lower image reading unit 222.

Although not illustrated, similarly to the above-described structure, also in this exemplary structure, the first end portion 51A and the second end portion 51B of the upper rotating member 51 in the axial direction are supported by the respective rotating member supports 55. In addition, similarly to the above-described structure, the rotating member supports 55 are supported by the retracting portion 53 connected to the rotating member supports 55.

The upper rotating member 51 illustrated in FIGS. 6A and 6B is supported by the rotating member supports 55 (not illustrated) that do not contact the lower image reading unit 222. The upper rotating member 51 illustrated in FIGS. 6A and 6B is configured such that the rotating member supports 55 do not contact the lower image reading unit 222 but the contact portions 56, which are portions of the upper rotating member 51, contact the lower image reading unit 222.

In the exemplary structure illustrated in FIGS. 6A and 6B, the upper rotating member 51 includes plural contact portions 56 that contact the lower image reading unit 222.

In this exemplary structure, the contact portions 56 contact the light transmitting portion 63. However, the contact portions 56 are not limited to this, and may instead contact the positioning member 64 (see FIG. 3).

As illustrated in FIG. 6A, the contact portions 56 are disposed at different positions in the circumferential direction of the upper rotating member 51.

In addition, as illustrated in FIG. 6B, the contact portions 56 are also disposed at different positions in the axial direction of the upper rotating member 51.

More specifically, the contact portions 56 are provided on the first end portion 51A and the second end portion 51B in the longitudinal direction of the upper rotating member 51.

Similarly to the above-described structure, as illustrated in FIG. 6A, the upper rotating member 51 includes the sheet guide 51G that guides the paper sheet P transported along the sheet transport path R. In the present exemplary embodiment, when the sheet guide 51G is positioned to face the sheet transport path R, the corresponding contact portions 56 contact the lower image reading unit 222.

In the present exemplary embodiment, among the flat surfaces 51C of the upper rotating member 51, the flat surface 51C that serves as the sheet guide 51G has the contact portions 56 at one and the other ends thereof in the longitudinal direction.

In the present exemplary embodiment, when the flat surface 51C that functions as the sheet guide 51G is positioned to face the sheet transport path R, the contact portions 56 provided on this flat surface 51C contact the lower image reading unit 222.

Although not illustrated, similarly to the above-described structure, also in the exemplary structure illustrated in FIGS. 6A and 6B, the upstream guide 51H (see FIG. 3) is provided upstream of the sheet guide 51G, and the downstream guide 51K is provided downstream of the sheet guide 51G.

In addition, in the exemplary structure illustrated in FIGS. 6A and 6B, similarly to the above-described structure, the white reference plate HK and the color calibration plate EK, which are examples of calibration members used to calibrate the lower image reading unit 222, are attached to the upper rotating member 51, as illustrated in FIG. 6A.

In the present exemplary embodiment, when the white reference plate HK is positioned to face the sheet transport path R, corresponding ones of the contact portions 56 of the upper rotating member 51 contact the lower image reading unit 222.

In addition, in the present exemplary embodiment, when the color calibration plate EK is positioned to face the sheet transport path R, corresponding ones of the contact portions 56 of the upper rotating member 51 contact the lower image reading unit 222.

In this exemplary structure, among the flat surfaces 51C of the upper rotating member 51, the flat surfaces 51C on which the white reference plate HK and the color calibration plate EK are provided have the corresponding contact portions 56 provided thereon.

Accordingly, in this exemplary structure, when the white reference plate HK is positioned to face the sheet transport path R, or when the color calibration plate EK is positioned to face the sheet transport path R, the corresponding contact portions 56 of the upper rotating member 51 contact the lower image reading unit 222.

In addition, in this exemplary structure, as illustrated in FIG. 6A, the upper rotating member 51 is provided with urging members 57 that urge the respective contact portions 56 of the upper rotating member 51 toward the lower image reading unit 222.

The urging members 57 are composed of elastic bodies, such as springs.

In the present exemplary embodiment, the urging members 57 urge the respective contact portions 56 of the upper rotating member 51 toward the light transmitting portion 63 so that the contact portions 56 are pressed against the light transmitting portion 63.

In addition, in this exemplary structure, the sheet guide 51G moves together with the corresponding contact portions 56 that are urged and moved by the corresponding urging member 57.

Therefore, in this exemplary structure, the sheet guide 51G is positioned with respect to the light transmitting portion 63 when the corresponding contact portions 56 are pressed against the light transmitting portion 63 and positioned with respect to the light transmitting portion 63.

More specifically, in this exemplary structure, the sheet guide 51G and the two contact portions 56 provided on the flat surface 51C that serves as the sheet guide 51G are integrated together as a unit. When the two contact portions 56 are pressed against and positioned with respect to the light transmitting portion 63, the sheet guide 51G is also positioned with respect to the light transmitting portion 63.

In this exemplary structure, the white reference plate HK and the color calibration plate EK also move together with the corresponding contact portions 56 that are urged and moved by the respective urging members 57.

In this exemplary structure, the white reference plate HK and the two contact portions 56 provided on the white reference plate HK are integrated together as a unit. When the two contact portions 56 are pressed against and positioned with respect to the light transmitting portion 63, the white reference plate HK is also positioned with respect to the light transmitting portion 63.

In this exemplary structure, the color calibration plate EK and the two contact portions 56 provided on the color calibration plate EK are integrated together as a unit. When the two contact portions 56 are pressed against the light transmitting portion 63 and positioned, the color calibration plate EK is also positioned with respect to the light transmitting portion 63.

In the exemplary structure illustrated in FIG. 6A, restricting portions 58 are provided to restrict movements of the contact portions 56 of the upper rotating member 51.

The restricting portions 58 restrict the contact portions 56 urged and moved by the urging members 57 from moving in a direction other than a direction toward the lower image reading unit 222.

The lower image reading unit 222 includes a facing portion 222M that faces the upper rotating member 51. The restricting portions 58 restrict the contact portions 56 from moving in a direction other than a direction toward the facing portion 222M.

More specifically, the restricting portions 58 are disposed at locations other than the location at which the facing portion 222M of the lower image reading unit 222 is disposed, and extend along the outer peripheral surface of the upper rotating member 51.

In the present exemplary embodiment, the contact portions 56 of the upper rotating member 51 are in contact with the restricting portions 58 when the contact portions 56 are at locations other than the location at which the contact portions 56 face the facing portion 222M.

Accordingly, the contact portions 56 are restricted from moving toward regions HR on sides of the restricting portions 58 opposite to the sides on which the rotating member 51 is disposed.

Various components may be disposed in the regions HR. Since the restricting portions 58 are provided, the contact portions 56 may be prevented from interfering with these components.

In addition, in this exemplary structure, the contact portions 56 are caused to advance and retract by the restricting portions 58.

When the contact portions 56 are positioned to face the restricting portions 58, the contact portions 56 are pressed by the restricting portions 58 and retracted toward the upper rotating member 51. When the contact portions 56 are at positions other than the positions at which the contact portions 56 face the restricting portions 58, the contact portions 56 are advanced toward the light transmitting portion 63 provided on the facing portion 222M.

Figure 7:
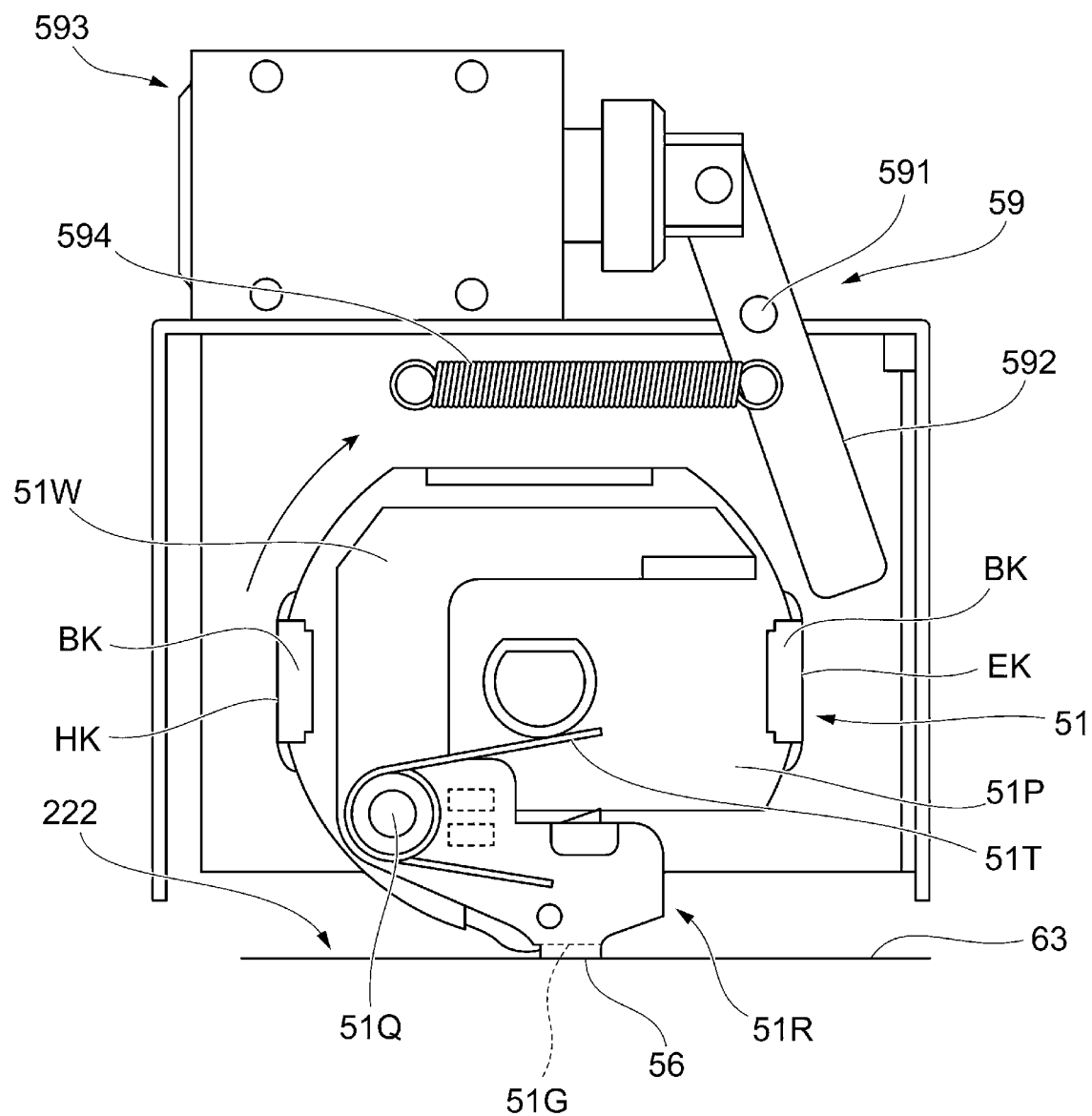
FIG. 7 illustrates an upper rotating member having another exemplary structure.

FIG. 7 illustrates another exemplary structure of the upper rotating member 51.

In this exemplary structure, the upper rotating member 51 includes an upper rotating member body 51P and a moving part 51R that is supported by the upper rotating member body 51P and that rotates about a rotating shaft 51Q.

In this exemplary structure, the upper rotating member 51 includes the contact portion 56 provided on the moving part 51R. In addition, in this exemplary structure, the sheet guide 51G is provided on the moving part 51R. In FIG. 7, the sheet guide 51G is positioned behind the contact portion 56 in the direction orthogonal to the plane of FIG. 7.

The rotating shaft 51Q is disposed downstream of the contact portion 56 provided on the moving part 51R in the direction in which the upper rotating member 51 rotates.

In addition, in this exemplary structure, the upper rotating member 51 is provided with a torsion spring 51T, which is an example of an urging unit that urges the moving part 51R toward the lower image reading unit 222.

In addition, in this exemplary structure, a cooperating part 51W that is rotatable about the rotating shaft 51Q and that moves together with the moving part 51R is provided.

In addition, in this exemplary structure, an advancing-and-retracting mechanism 59 that causes the contact portion 56 to advance and retract with respect to the lower image reading unit 222 is provided.

In addition, in this exemplary structure, the white reference plate HK and the color calibration plate EK are supported on the upper rotating member body 51P by metal plates BK. In the present exemplary embodiment, the metal plates BK are fixed to the upper rotating member body 51P by welding.

In this exemplary structure, when the sheet guide 51G is disposed to face the light transmitting portion 63, the moving part 51R is urged toward the light transmitting portion 63 by the torsion spring 51T. Accordingly, the contact portion 56 provided on the moving part 51R is pressed against the light transmitting portion 63.

In this case, similar to the above-described structure, the contact portion 56 is positioned with respect to the light transmitting portion 63, and the sheet guide 51G is positioned with respect to the light transmitting portion 63.

In this exemplary structure, the moving part 51R is provided only for the sheet guide 51G. However, the structure is not limited to this, and each of the white reference plate HK and the color calibration plate EK may also be provided with the moving part 51R.

In this exemplary structure, when the paper sheet P is jammed and stopped in the region between the sheet guide 51G and the light transmitting portion 63, the advancing-and-retracting mechanism 59 is driven automatically or in response to an instruction from the user.

Accordingly, as illustrated in FIGS. 8A and 8B, which illustrate the operation of the advancing-and-retracting mechanism 59, the sheet guide 51G (not illustrated in FIGS. 8A and 8B) and the contact portion 56 move away from the light transmitting portion 63 to facilitate removal of the paper sheet P.

More specifically, when the advancing-and-retracting mechanism 59 is driven, as illustrated in FIGS. 8A and 8B, the cooperating part 51W rotates counterclockwise about the rotating shaft 51Q, and accordingly the moving part 51R also rotates counterclockwise about the rotating shaft 51Q.

More specifically, the cooperating part 51W includes a pressing portion 512 that presses a pressing portion 511 provided on the moving part 51R from below. In the present exemplary embodiment, when the cooperating part 51W rotates counterclockwise about the rotating shaft 51Q, the pressing portion 511 of the moving part 51R is pressed by the pressing portion 512 from below. Accordingly, the moving part 51R rotates counterclockwise about the rotating shaft 51Q.

As a result, as illustrated in FIG. 8B, the sheet guide 51G (not illustrated in FIGS. 8A and 8B) and the contact portion 56 corresponding to the sheet guide 51G move away from the light transmitting portion 63 to facilitate removal of the paper sheet P.

As illustrated in FIG. 7, the advancing-and-retracting mechanism 59 includes a pivoting member 592 that rotates about a rotating shaft 591; a solenoid 593 connected to one end of the pivoting member 592 in the longitudinal direction; and a coil spring 594, which is an example of an urging member connected to the pivoting member 592 at a position close to the other end in the longitudinal direction.

The coil spring 594 is connected to the pivoting member 592 at a position close to the second end portion in the longitudinal direction, and urges the pivoting member 592 so that the second end portion of the pivoting member 592 moves toward the cooperating part 51W.

In the present exemplary embodiment, to rotate the moving part 51R counterclockwise about the rotating shaft 51Q, the solenoid 593 is turned off, as illustrated in FIG. 8B. Accordingly, the second end portion of the pivoting member 592 in the longitudinal direction moves toward the cooperating part 51W. Thus, an end portion of the cooperating part 51W is urged leftward and upward in FIG. 8B, and this end portion of the cooperating part 51W is moved leftward and upward in FIG. 8B.

In this case, the cooperating part 51W rotates counterclockwise about the rotating shaft 51Q, and accordingly the moving part 51R also rotates counterclockwise about the rotating shaft 51Q.

In this case, as described above, the sheet guide 51G and the contact portion 56 corresponding to the sheet guide 51G move away from the light transmitting portion 63.

A changing mechanism that changes the positions of the contact portions 56 illustrated in FIGS. 6A and 6B and FIG. 7 by causing the contact portions 56 to advance and retract may also be provided.

When the changing mechanism is provided, the sheet guide 51G, the white reference plate HK, and the color calibration plate EK are arranged not to move together with the contact portions 56. When the changing mechanism is provided, the contact portions 56 are caused to advance and retract with respect to the light transmitting portion 63 while the sheet guide 51G, the white reference plate HK, and the color calibration plate EK are fixed to the upper rotating member body 51P of the upper rotating member 51.

Accordingly, the distance between the light transmitting portion 63 and each of the sheet guide 51G, the white reference plate HK, and the color calibration plate EK may be changed.

The changing mechanism that changes the positions of the contact portions 56 may have a structure based on known technology. For example, the changing mechanism may be composed of elements including a motor, a solenoid, a sensor, a clutch, and a gear.

Figure 9:
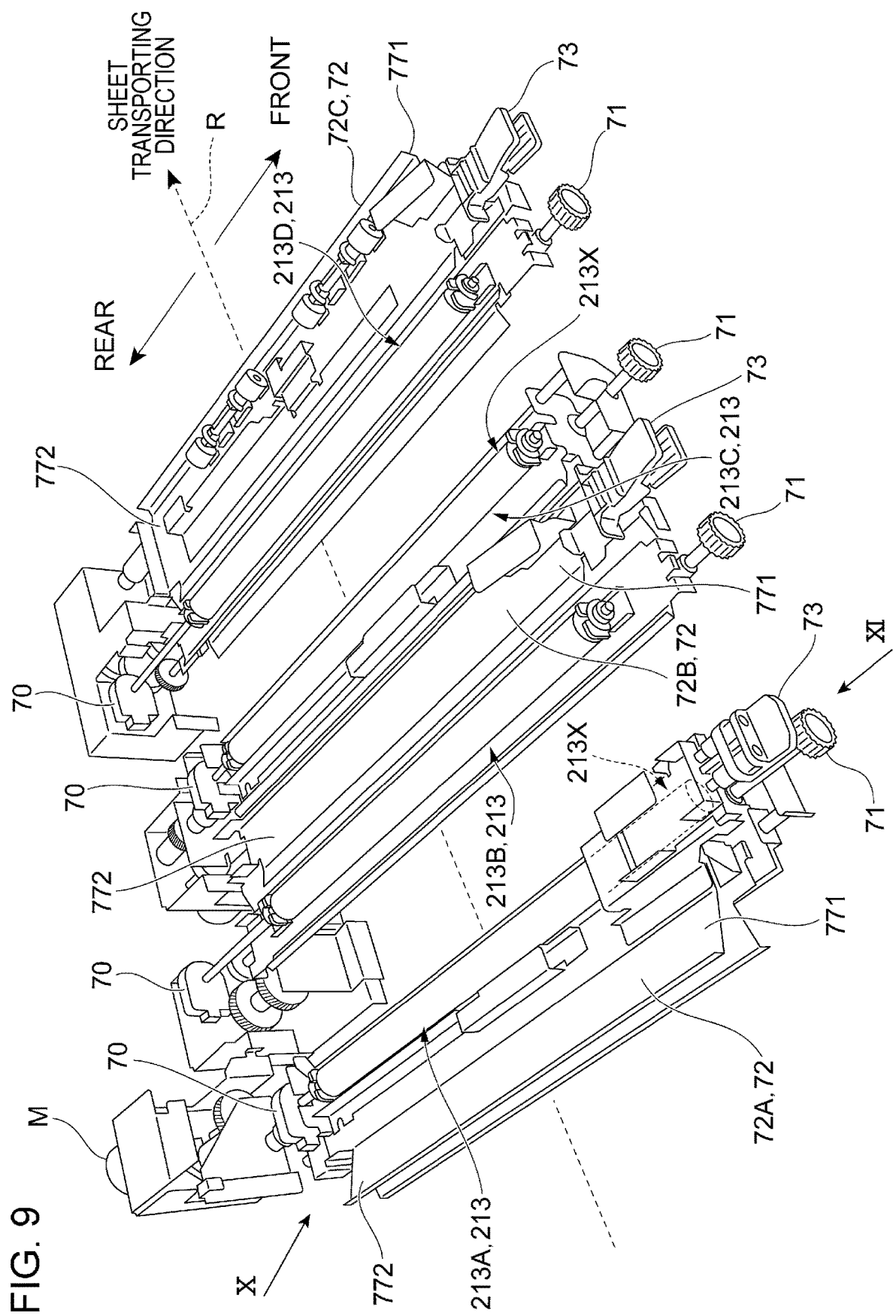
FIG. 9 illustrates an upstream transport roller unit, a first intermediate transport roller unit, a second intermediate transport roller unit, a downstream transport roller unit, and other components viewed from above and from the front of the inspection device.

FIG. 9 illustrate the upstream transport roller unit 213A, the first intermediate transport roller unit 213B, the second intermediate transport roller unit 213C, the downstream transport roller unit 213D, and other components viewed from above and from the front of the inspection device 200.

Figure 10:
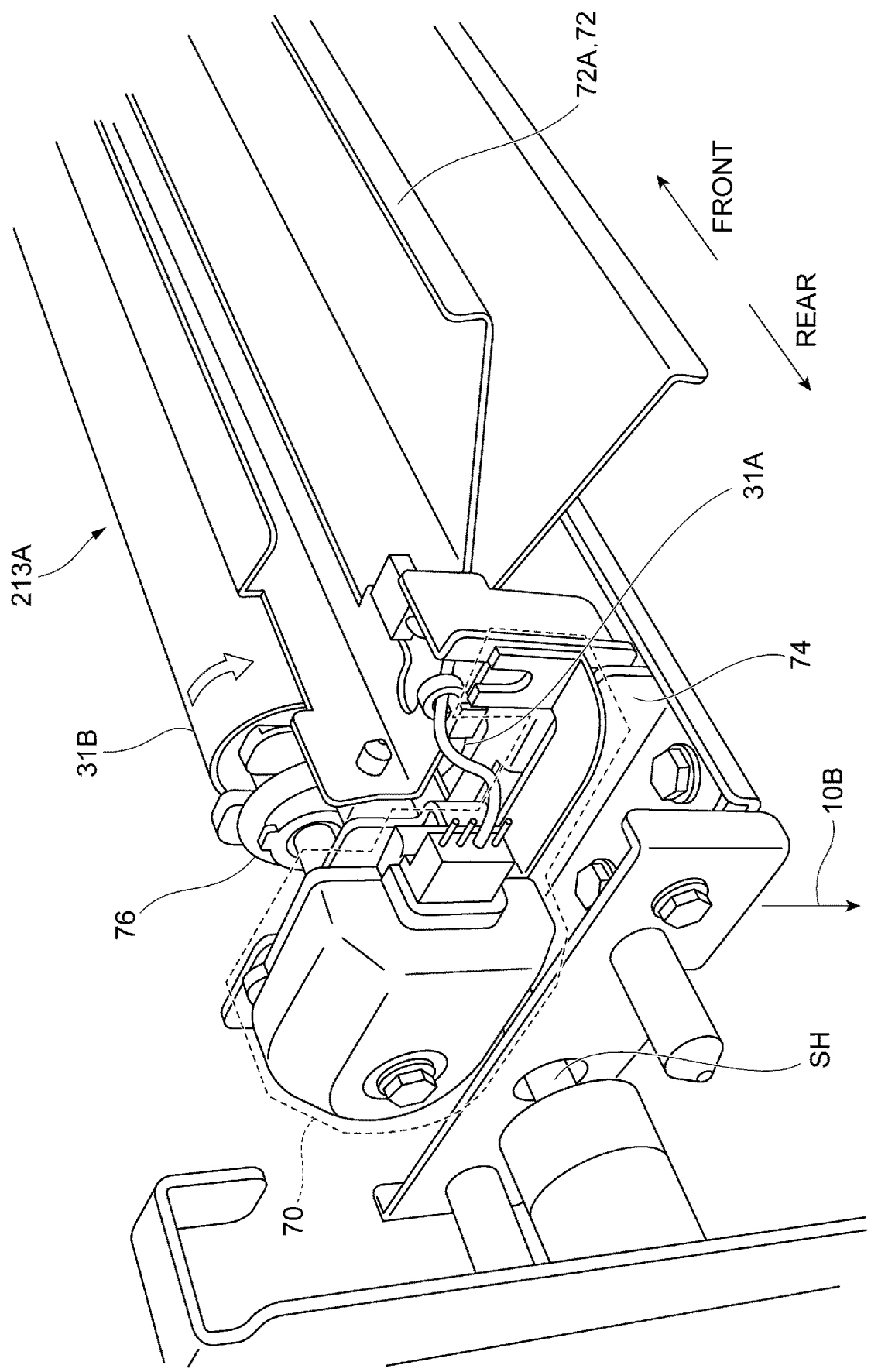
FIG. 10 illustrates the upstream transport roller unit and other components viewed in the direction of arrow X in FIG. 9.
Figure 11:
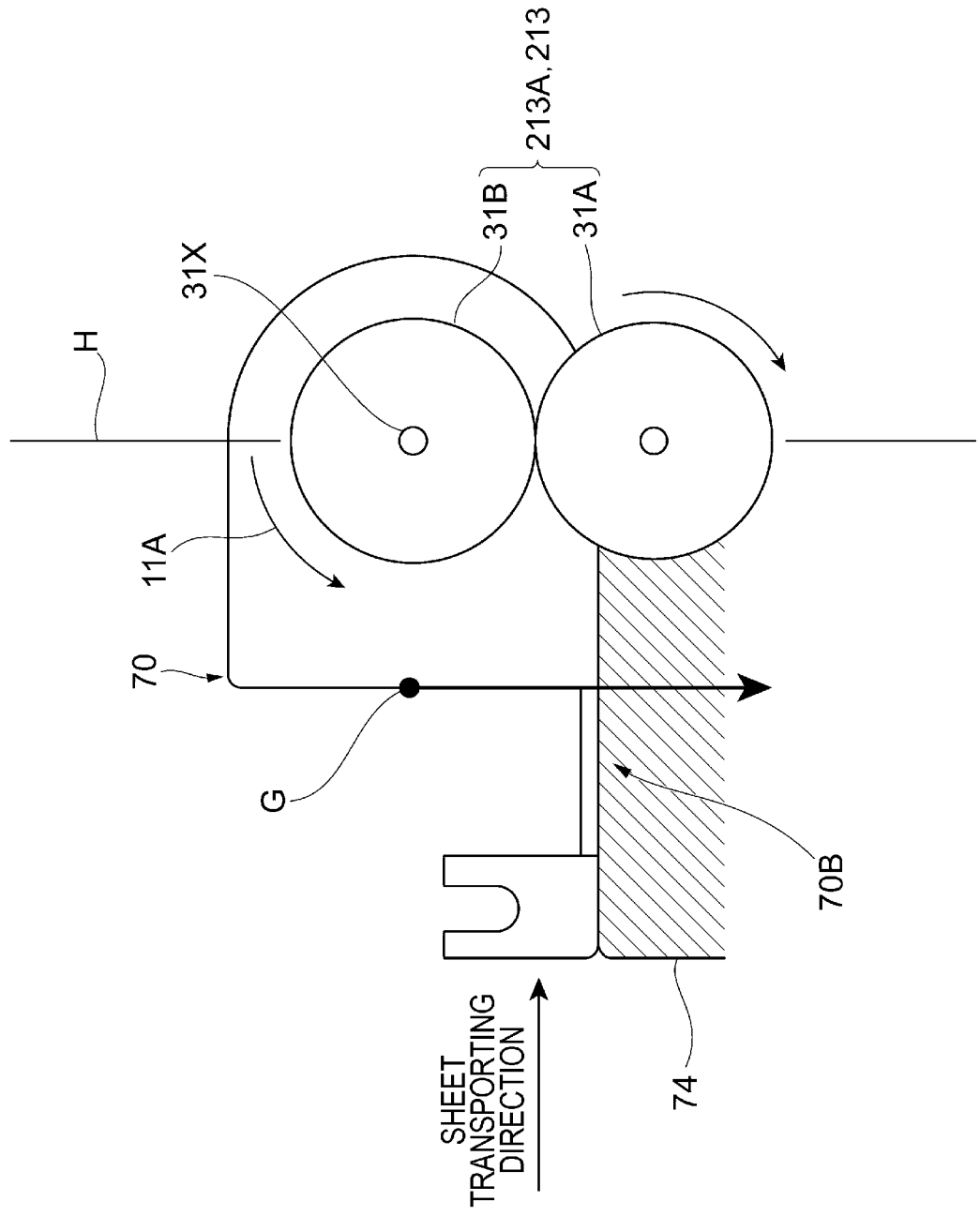
FIG. 11 illustrates the upstream transport roller unit and other components viewed in the direction of arrow XI in FIG. 9.

FIG. 10 illustrates the upstream transport roller unit 213A and other components viewed in the direction of arrow X in FIG. 9. FIG. 11 illustrates the upstream transport roller unit 213A and other components viewed in the direction of arrow XI in FIG. 9.

In the present exemplary embodiment, as illustrated in FIG. 9, the transport roller units 213 include the upstream transport roller unit 213A, the first intermediate transport roller unit 213B, the second intermediate transport roller unit 213C, and the downstream transport roller unit 213D.

In the present exemplary embodiment, each transport roller unit 213 is provided with a number-of-rotation information acquisition unit 70 that acquires information regarding the number of rotations of the transport roller unit 213.

In addition, in the present exemplary embodiment, each of the upstream transport roller unit 213A, the first intermediate transport roller unit 213B, the second intermediate transport roller unit 213C, and the downstream transport roller unit 213D is provided with an operation receiving unit 71 that is rotatable and that is operated by the user.

In the present exemplary embodiment, when one of the operation receiving units 71 is rotated, the transport roller unit 213 corresponding to the rotated operation receiving unit 71 is also rotated. Accordingly, in the present exemplary embodiment, the paper sheet P that is jammed and stopped at each transport roller unit 213 may be fed downstream or upstream from the transport roller unit 213.

In other words, in the present exemplary embodiment, the paper sheet P that is stopped may be manually fed downstream or upstream from the transport roller unit 213.

In the present exemplary embodiment, plural guide members 72 that guide the paper sheet P transported along the sheet transport path R are disposed above the sheet transport path R.

In the present exemplary embodiment, the guide members 72 include an upstream guide member 72A, an intermediate guide member 72B, and a downstream guide member 72C.

In the present exemplary embodiment, the upstream guide member 72A, the intermediate guide member 72B, and the downstream guide member 72C provided as the guide members 72 are arranged in that order from the upstream side toward the downstream side in the transporting direction of the paper sheet P.

Each guide member 72 is upwardly movable in FIG. 9 and retractable from the sheet transport path R.

More specifically, in the present exemplary embodiment, each guide member 72 is provided with a handle 73. When the user holds the handle 73 and moves the handle 73 upward, the guide member 72 is retracted from the sheet transport path R.

Each guide member 72 includes a first end portion 771 and a second end portion 772 located at different positions in a direction orthogonal to the transporting direction of the paper sheet P. When the user holds the handle 73 and moves the handle 73 upward, the first end portion 771 of the guide member 72 moves away from the sheet transport path R.

In the present exemplary embodiment, the second end portion 772 of each guide member 72 is fixed to the body of the inspection device 200. In the present exemplary embodiment, when the user holds the handle 73 and moves the guide member 72 upward, the guide member 72 rotates about the second end portion 772. Accordingly, the first end portion 771 of the guide member 72 moves away from the sheet transport path R.

As illustrated in FIG. 10, the upstream transport roller unit 213A, which is an example of a transport unit, includes the driving roller 31A and the driven roller 31B. The driving roller 31A is an example of a driving rotating member that performs a rotational driving operation. The driven roller 31B is an example of a driven rotating member that rotates upon receiving a driving force from the driving roller 31A.

Each of the transport roller units 213 other than the upstream transport roller unit 213A also includes the driving roller 31A and the driven roller 31B that rotates upon receiving a driving force from the driving roller 31A.

In the present exemplary embodiment, the paper sheet P transported from the upstream side is fed to a position between the driving roller 31A and the driven roller 31B and is transported further downstream by the driving roller 31A that performs the rotational driving operation and the driven roller 31B.

In the present exemplary embodiment, the driving roller 31A is driven by a drive motor M (see FIG. 9). In the present exemplary embodiment, the driving force is transmitted from the drive motor M to the driving roller 31A through a transmission shaft SH illustrated in FIG. 10. Thus, the driving roller 31A is rotated.

In addition, in the present exemplary embodiment, as illustrated in FIG. 10, each number-of-rotation information acquisition unit 70 is disposed in a rear section of the inspection device 200.

As illustrated in FIG. 9, the upstream transport roller unit 213A, the first intermediate transport roller unit 213B, the second intermediate transport roller unit 213C, and the downstream transport roller unit 213D are provided with the respective number-of-rotation information acquisition units 70. Each number-of-rotation information acquisition unit 70 is composed of an encoder.

In the present exemplary embodiment, as illustrated in FIG. 10, each number-of-rotation information acquisition unit 70 is connected to the corresponding driven roller 31B and acquires information regarding the number of rotations of the driven roller 31B.

In addition, in the present exemplary embodiment, movement of each number-of-rotation information acquisition unit 70 is restricted by a restricting portion 74. In the present exemplary embodiment, the number-of-rotation information acquisition unit 70 is pressed against the restricting portion 74 so that the movement of the number-of-rotation information acquisition unit 70 is restricted.

In the present exemplary embodiment, the number-of-rotation information acquisition unit 70 is pressed against the restricting portion 74 so that the number-of-rotation information acquisition unit 70 is not easily moved. When the number-of-rotation information acquisition unit 70 is not easily moved, the accuracy of the information regarding the number of rotations acquired by the number-of-rotation information acquisition unit 70 is increased.

In the present exemplary embodiment, the number-of-rotation information acquisition unit 70 is placed on the restricting portion 74. The number-of-rotation information acquisition unit 70 is pressed against the restricting portion 74 by the gravitational force applied to the number-of-rotation information acquisition unit 70.

In the present exemplary embodiment, as illustrated in FIG. 11, the restricting portion 74 is disposed below the center of gravity G of the number-of-rotation information acquisition unit 70. In other words, in the present exemplary embodiment, the restricting portion 74 is positioned on a vertical line that passes through the center of gravity G of the number-of-rotation information acquisition unit 70.

In addition, in the present exemplary embodiment, referring to FIG. 11, the center of gravity G of the number-of-rotation information acquisition unit 70 is positioned at a location separated from a plane H that extends vertically and that extends along and passes through an axial center 31X of the driven roller 31B.

In addition, in the present exemplary embodiment, the restricting portion 74 is positioned below the center of gravity G positioned at a location separated from the plane H.

In the present exemplary embodiment, the number-of-rotation information acquisition unit 70 is placed on the restricting portion 74, and is pressed from above against the restricting portion 74 positioned below the number-of-rotation information acquisition unit 70.

In addition, in the present exemplary embodiment, the driving force transmitted from the driving roller 31A is used to press the number-of-rotation information acquisition unit 70 against the restricting portion 74.

More specifically, in the present exemplary embodiment, the driving force transmitted from the driving roller 31A to the number-of-rotation information acquisition unit 70 through the driven roller 31B is used to press the number-of-rotation information acquisition unit 70 against the restricting portion 74.

In the present exemplary embodiment, as illustrated in FIG. 11, the driven roller 31B that rotates applies driving force for rotating the number-of-rotation information acquisition unit 70 in the direction of arrow 11A to the number-of-rotation information acquisition unit 70. In the present exemplary embodiment, the driving force for rotating the number-of-rotation information acquisition unit 70 is used to further press the number-of-rotation information acquisition unit 70 against the restricting portion 74.

In the present exemplary embodiment, the gravitational force applied to the number-of-rotation information acquisition unit 70 and the above-described driving force transmitted to the number-of-rotation information acquisition unit 70 are both used to press the number-of-rotation information acquisition unit 70 against the restricting portion 74.

It is not necessary that the number-of-rotation information acquisition unit 70 be pressed against the restricting portion 74 by using both the gravity and the driving force, and only one of the gravity and the driving force may be used.

In the present exemplary embodiment, the number-of-rotation information acquisition unit 70 is urged in one direction shown by arrow 10B in FIG. 10 and pressed against the restricting portion 74.

In addition, in the present exemplary embodiment, the number-of-rotation information acquisition unit 70 is movable in a direction opposite to the one direction.

More specifically, in the present exemplary embodiment, the number-of-rotation information acquisition unit 70 is configured so that the number-of-rotation information acquisition unit 70 is upwardly movable in FIG. 10.

Accordingly, in the present exemplary embodiment, when a thick paper sheet P is transported, the driven roller 31B moves away from the driving roller 31A. Thus, even when a thick paper sheet P is transported, the paper sheet P may be transported by the driving roller 31A and the driven roller 31B.

In the present exemplary embodiment, as illustrated in FIG. 10, the driven roller 31B is pressed by a pressing member 76. The pressing member 76 is composed of a spring, and the driven roller 31B is movable upward in FIG. 10 in the present exemplary embodiment.

Thus, in the present exemplary embodiment, as described above, even when a thick paper sheet P is transported, the paper sheet P may be transported by the driving roller 31A and the driven roller 31B.

As illustrated in FIG. 11, the number-of-rotation information acquisition unit 70 includes a downstream portion 70B positioned in a downstream region in the direction in which the driven roller 31B rotates. In the present exemplary embodiment, the downstream portion 70B of the number-of-rotation information acquisition unit 70 is pressed against the restricting portion 74.

The downstream portion 70B of the number-of-rotation information acquisition unit 70 is positioned in a lower section of the number-of-rotation information acquisition unit 70. In the present exemplary embodiment, the restricting portion 74 is positioned below the downstream portion 70B positioned in the lower section of the number-of-rotation information acquisition unit 70, and the downstream portion 70B is pressed against the restricting portion 74.

In the present exemplary embodiment, the driven roller 31B is disposed above the driving roller 31A. In addition, in the present exemplary embodiment, as illustrated in FIG. 11, the center of gravity G of the number-of-rotation information acquisition unit 70 is positioned at a location that is separated from the plane H and that is upstream of the plane H in the transporting direction of the paper sheet P.

In addition, in the present exemplary embodiment, as described above, the restricting portion 74 is positioned below the number-of-rotation information acquisition unit 70.

In this case, as described above, the gravitational force applied to the number-of-rotation information acquisition unit 70 and the above-described driving force transmitted to the number-of-rotation information acquisition unit 70 are both used to press the number-of-rotation information acquisition unit 70 against the restricting portion 74.

Figure 12:
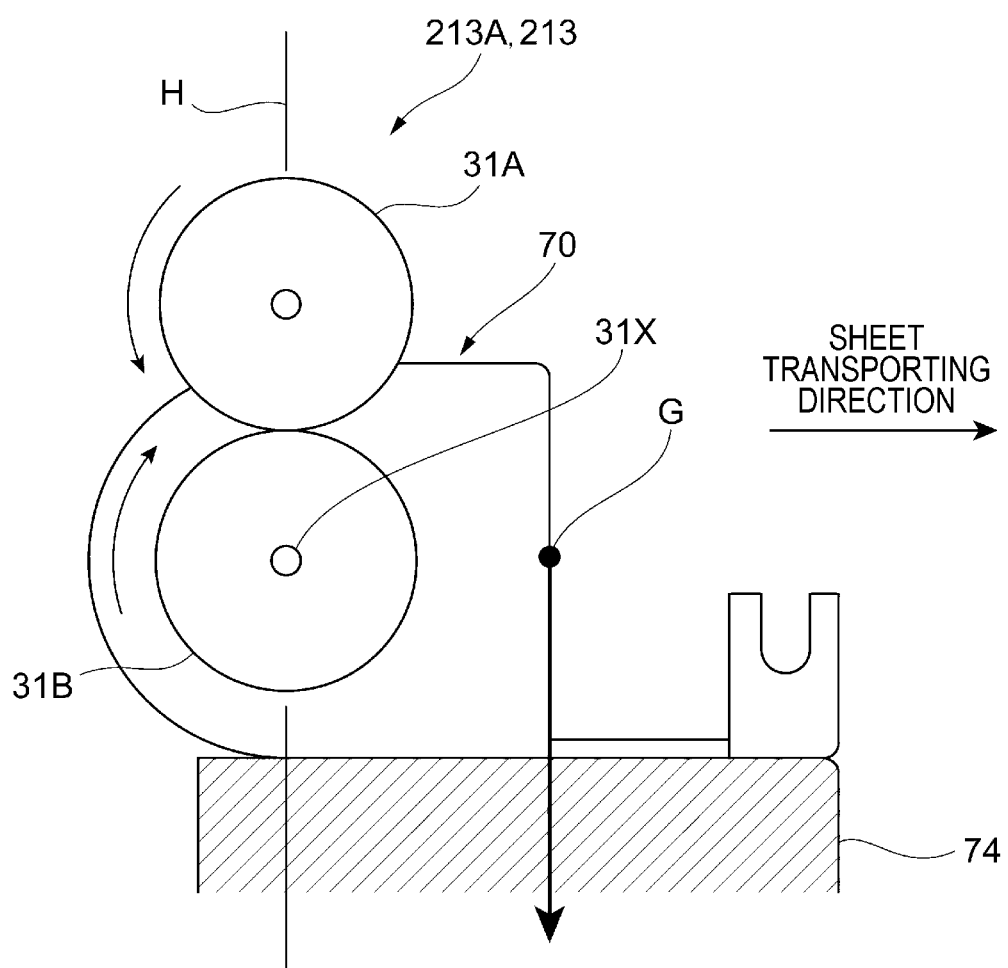
FIG. 12 illustrates another exemplary structure.

FIG. 12 illustrates another exemplary structure.

Similarly to FIG. 11, FIG. 12 illustrates the upstream transport roller unit 213A and the number-of-rotation information acquisition unit 70 viewed from the front of the inspection device 200.

In the exemplary structure illustrated in FIG. 12, the driven roller 31B is positioned below the driving roller 31A.

Also in this exemplary structure, the center of gravity G of the number-of-rotation information acquisition unit 70 is positioned at a location separated from the plane H passing through the axial center 31X of the driven roller 31B.

In addition, in this exemplary structure, the center of gravity G of the number-of-rotation information acquisition unit 70 is positioned downstream of the plane H in the transporting direction of the paper sheet P. In addition, also in this exemplary structure, the restricting portion 74 is positioned below the center of gravity G of the number-of-rotation information acquisition unit 70.

Also in this exemplary structure, similar to the above-described structure, the gravitational force applied to the number-of-rotation information acquisition unit 70 and the driving force transmitted to the number-of-rotation information acquisition unit 70 are both used to press the number-of-rotation information acquisition unit 70 against the restricting portion 74.

The driven roller 31B is not necessarily positioned above the driving roller 31A, and may be positioned below the driving roller 31A as illustrated in FIG. 12.

In this case, as illustrated in FIG. 12, the center of gravity G of the number-of-rotation information acquisition unit 70 may be positioned downstream of the plane H. Thus, the number-of-rotation information acquisition unit 70 may be pressed against the restricting portion 74 by using both the gravity and the driving force.

Figure 13:
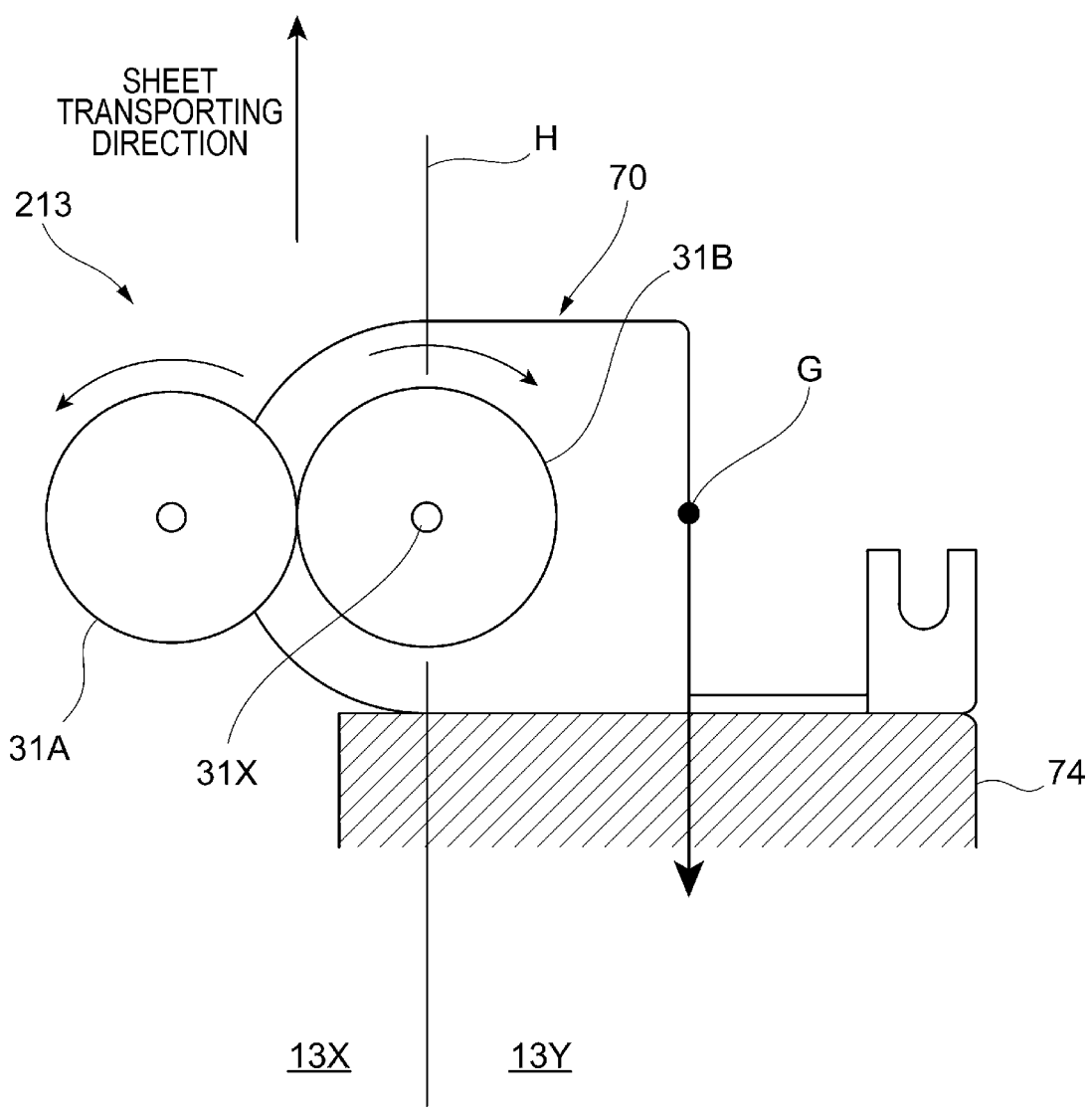
FIG. 13 illustrates another exemplary structure.

FIG. 13 illustrates another exemplary structure.

In this exemplary structure, the driving roller 31A and the driven roller 31B are at different positions in a horizontal direction. In addition, in this exemplary structure, the transport roller unit 213 transports the paper sheet P upward.

In a device, such as the inspection device 200, having a function of transporting the paper sheet P, the paper sheet P may be transported in the up-down direction. In such a case, as illustrated in FIG. 13, for example, the driving roller 31A and the driven roller 31B are at different positions in a horizontal direction.

The arrangement in which the driving roller 31A and the driven roller 31B are at different positions in a horizontal direction is not limited to an arrangement in which the driving roller 31A and the driven roller 31B are on a single straight line that extends in the horizontal direction.

Even when one of the driving roller 31A and the driven roller 31B is at a location separated from the single straight line, the driving roller 31A and the driven roller 31B may be regarded as being at different positions in a horizontal direction as long as the driving roller 31A and the driven roller 31B are displaced from each other in the horizontal direction.

In the exemplary structure illustrated in FIG. 13, the driving roller 31A is positioned in a region 13X, which is one of two regions facing each other with the plane H therebetween, the plane H passing through the axial center 31X of the driven roller 31B. The center of gravity G of the number-of-rotation information acquisition unit 70 is positioned in a region 13Y, which is the other of the two regions.

Also in this exemplary structure, the restricting portion 74 is positioned below the number-of-rotation information acquisition unit 70. More specifically, the restricting portion 74 is positioned below the center of gravity G of the number-of-rotation information acquisition unit 70.

Also in this exemplary structure, similar to the above-described structure, the gravitational force applied to the number-of-rotation information acquisition unit 70 and the driving force transmitted to the number-of-rotation information acquisition unit 70 are both used to press the number-of-rotation information acquisition unit 70 against the restricting portion 74.

When the driven roller 31B and the driving roller 31A are arranged next to each other in a horizontal direction as illustrated in FIG. 13, the center of gravity G of the number-of-rotation information acquisition unit 70 is positioned on a side of the plane H opposite to the side on which the driving roller 31A is provided.

Accordingly, also in this case, the number-of-rotation information acquisition unit 70 may be pressed against the restricting portion 74 by using both the gravity and the driving force.

Figure 14:
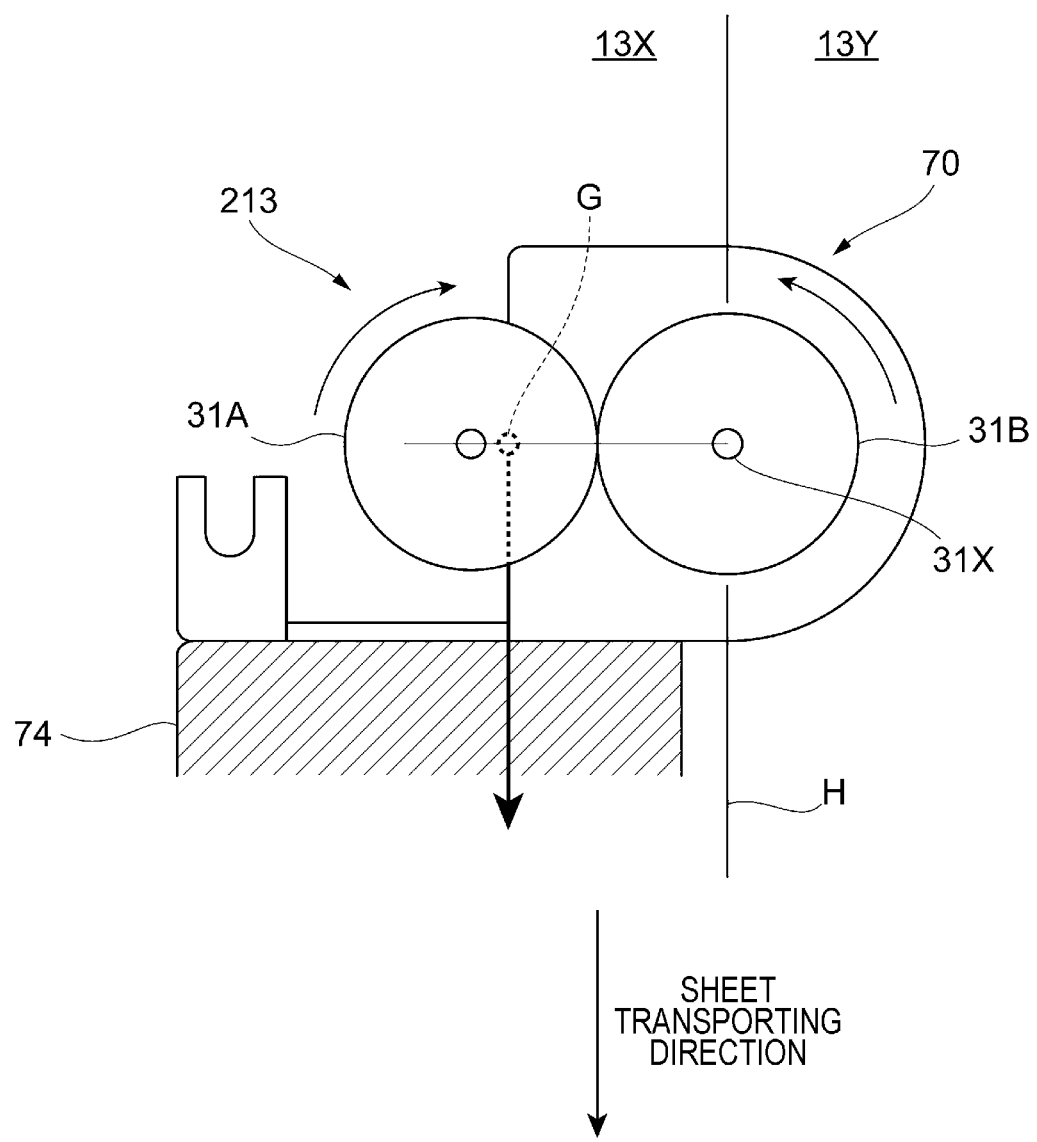
FIG. 14 illustrates another exemplary structure.

FIG. 14 illustrates another exemplary structure.

Also in this exemplary structure, similarly to the above-described structure, the driving roller 31A and the driven roller 31B are at different positions in a horizontal direction. In addition, in this exemplary structure, the transport roller unit 213 transports the paper sheet P downward.

Also in this exemplary structure, the driving roller 31A is positioned in the region 13X, which is one of two regions facing each other the plane H therebetween, the plane H passing through the axial center 31X of the driven roller 31B. In addition, in this exemplary structure, the center of gravity G of the number-of-rotation information acquisition unit 70 is positioned in the region 13X of the two regions.

Also in this exemplary structure, similar to the above-described structure, the gravitational force applied to the number-of-rotation information acquisition unit 70 and the driving force transmitted to the number-of-rotation information acquisition unit 70 are both used to press the number-of-rotation information acquisition unit 70 against the restricting portion 74.

When the driven roller 31B and the driving roller 31A are arranged next to each other in a horizontal direction and transport the paper sheet P downward, as illustrated in FIG. 14, the center of gravity G of the number-of-rotation information acquisition unit 70 is positioned on the same side of the plane H as the side on which the driving roller 31A is provided.

Accordingly, also in this case, the number-of-rotation information acquisition unit 70 may be pressed against the restricting portion 74 by using both the gravity and the driving force.

FIG. 15 illustrates the upper image reading unit 221 and the lower image reading unit 222 viewed from the front of the inspection device 200.

In the present exemplary embodiment, as described above, the paper sheet P is transported by the transport roller units 213 (see FIG. 9) that serve as transport units.

The paper sheet P that is transported successively passes through an upstream location 81 and a downstream location 82 illustrated in FIG. 15. The downstream location 82 is positioned downstream of the upstream location 81 in the transporting direction of the paper sheet P.

In the present exemplary embodiment, the upstream location 81 is a location at which the light transmitting portion 63 of the lower image reading unit 222 (see FIG. 3) is disposed, and the downstream location 82 is a location at which the light transmitting portion 63 of the upper image reading unit 221 (not illustrated) is disposed.

In the present exemplary embodiment, the lower image reading unit 222 performs the image reading process at the upstream location 81, and the upper image reading unit 221 performs the image reading process at the downstream location 82. However, the arrangement of the image reading unit 220 is not limited to this.

The structures above and below the sheet transport path R may be inverted so that the upper image reading unit 221 performs the image reading process at the upstream location 81 and the lower image reading unit 222 performs the image reading process at the downstream location 82.

The lower image reading unit 222, which is an example of an upstream image reading unit, includes the light receiver 226 that receives light reflected by the paper sheet P, as described above. The light receiver 226 includes the light receiving elements 226A arranged in a direction orthogonal to the transporting direction of the paper sheet P.

The lower image reading unit 222 reads an image that is formed on a portion of the paper sheet P positioned at the upstream location 81 and that is formed on one surface of the paper sheet P.

The upper image reading unit 221, which is an example of a downstream image reading unit, also includes the light receiver 226 that receives light reflected by the paper sheet P.

The upper image reading unit 221 reads an image that is formed on a portion of the paper sheet P positioned at the downstream location 82 and that is formed on the other surface of the paper sheet P.

In the present exemplary embodiment, the light receiver 226 of the lower image reading unit 222 is positioned downstream of the upstream location 81 in the transporting direction of the paper sheet P.

In addition, the light receiver 226 of the upper image reading unit 221 is positioned upstream of the downstream location 82 in the transporting direction of the paper sheet P.

Referring to FIG. 16, which illustrates another exemplary arrangement of the upper image reading unit 221 and the lower image reading unit 222, assume, for example, that the light receiver 226 of the lower image reading unit 222 is positioned upstream of the upstream location 81 in the transporting direction of the paper sheet P and that the light receiver 226 of the upper image reading unit 221 is positioned downstream of the downstream location 82 in the transporting direction of the paper sheet P.

In this case, the volume of the space occupied by the image reading unit 220 including the upper image reading unit 221 and the lower image reading unit 222 is substantially increased, and the size of the inspection device 200 is increased accordingly.

In contrast, in the present exemplary embodiment, as illustrated in FIG. 15, the light receiver 226 of the lower image reading unit 222 is positioned downstream of the upstream location 81 in the transporting direction of the paper sheet P, and the light receiver 226 of the upper image reading unit 221 is positioned upstream of the downstream location 82 in the transporting direction of the paper sheet P.

In this case, the volume of the space substantially occupied by the image reading unit 220 is reduced.

Alternatively, for example, the arrangement may be as in FIG. 17, which illustrates another exemplary arrangement of the upper image reading unit 221 and the lower image reading unit 222.

In the arrangement illustrated in FIG. 17, the light receiver 226 of the lower image reading unit 222 is positioned downstream of the upstream location 81 in the transporting direction of the paper sheet P, and the light receiver 226 of the upper image reading unit 221 is positioned downstream of the downstream location 82 in the transporting direction of the paper sheet P.

Also in this case, compared to the exemplary structure illustrated in FIG. 16, the volume of the space substantially occupied by the image reading unit 220 is reduced.

Alternatively, for example, the arrangement may be as in FIG. 18, which illustrates another exemplary arrangement of the upper image reading unit 221 and the lower image reading unit 222.

In the exemplary structure illustrated in FIG. 18, the light receiver 226 of the upper image reading unit 221 is positioned upstream of the downstream location 82 in the transporting direction of the paper sheet P, and the light receiver 226 of the lower image reading unit 222 is positioned upstream of the upstream location 81 in the transporting direction of the paper sheet P.

Also in this case, compared to the exemplary structure illustrated in FIG. 16, the volume of the space substantially occupied by the image reading unit 220 is reduced.

FIG. 15 will be referred to again in the following description.

In the present exemplary embodiment, as illustrated in FIG. 15, the light receiver 226 of the lower image reading unit 222 is positioned downstream of the light receiver 226 of the upper image reading unit 221 in the transporting direction of the paper sheet P.

In addition, in the present exemplary embodiment, the light receiver 226 of the upper image reading unit 221 is positioned upstream of the light receiver 226 of the lower image reading unit 222 in the transporting direction of the paper sheet P.

In addition, in the present exemplary embodiment, an end portion 222T of the lower image reading unit 222 that is positioned most downstream in the transporting direction of the paper sheet P is positioned downstream of the downstream location 82 in the transporting direction of the paper sheet P.

In addition, in the present exemplary embodiment, an end portion 221T of the upper image reading unit 221 that is positioned most upstream in the transporting direction of the paper sheet P is positioned upstream of the upstream location 81 in the transporting direction of the paper sheet P.

In addition, in the present exemplary embodiment, the upper rotating member 51 is provided at the upstream location 81. The upper rotating member 51 is disposed opposite the lower image reading unit 222 with the sheet transport path R provided therebetween.

The upper rotating member 51 is provided in a gap (hereinafter referred to as an "upper gap 201") that is formed between the lower image reading unit 222 and the upper image reading unit 221 and positioned above the sheet transport path R.

An arrangement in which the upper rotating member 51 is positioned in the upper gap 201 includes an arrangement in which a portion of the upper rotating member 51 is positioned in the upper gap 201.

In addition, in the present exemplary embodiment, the lower rotating member 52 is provided at the downstream location 82. The lower rotating member 52 is disposed opposite the upper image reading unit 221 with the sheet transport path R provided therebetween.

The lower rotating member 52 is provided in a gap (hereinafter referred to as a "lower gap 202") that is formed between the upper image reading unit 221 and the lower image reading unit 222 and positioned below the sheet transport path R.

The arrangement in which the lower rotating member 52 is positioned in the lower gap 202 includes an arrangement in which a portion of the lower rotating member 52 is positioned in the lower gap 202.

In addition, in the present exemplary embodiment, the lower image reading unit 222 and the upper image reading unit 221 are arranged such that when the lower image reading unit 222 and the upper image reading unit 221 are both projected onto an imaginary plane 15H that extends along the sheet transport path R, the lower image reading unit 222 and the upper image reading unit 221 overlap.

The imaginary plane 15H is a plane that extends along the sheet transport path R and along the paper sheet P when the paper sheet P is positioned in the sheet transport path R.

FIGS. 19 and 20 are top views of the plane 15H. In other words, FIG. 19 illustrates the plane 15H viewed from the upstream side in the direction of projection.

In the present exemplary embodiment, as illustrated in FIG. 19, an area S1 of a section 300 in which the lower image reading unit 222 and the upper image reading unit 221 overlap on the plane 15H is greater than or equal to 80% of a projection area S2 of the lower image reading unit 222 when the lower image reading unit 222 is projected onto the plane 15H.

In addition, in the present exemplary embodiment, as illustrated in FIG. 20, the area S1 of the section 300 in which the lower image reading unit 222 and the upper image reading unit 221 overlap on the plane 15H is greater than or equal to 80% of a projection area S3 of the upper image reading unit 221 when the upper image reading unit 221 is projected onto the plane 15H.

The area S1 of the section 300 in which the lower image reading unit 222 and the upper image reading unit 221 overlap is not necessarily greater than or equal to 80% of the above-described areas.

For example, the area S1 of the section 300 in which the lower image reading unit 222 and the upper image reading unit 221 overlap may be greater than or equal to 50% of the projection area S2 of the lower image reading unit 222 projected on the plane 15H, and greater than or equal to 50% of the projection area S3 of the upper image reading unit 221 projected on the plane 15H.

Thus, the lower image reading unit 222 and the upper image reading unit 221 are arranged to overlap.

FIG. 21 illustrates the internal structure of the upper image reading unit 221. The structure of the lower image reading unit 222 is similar to that of the upper image reading unit 221. Therefore, description of the lower image reading unit 222 will be omitted.

In the present exemplary embodiment, as described above, the upper image reading unit 221 includes the light sources 225. The light sources 225 emit light toward a portion of the paper sheet P positioned at the downstream location 82 (see FIG. 15).

The upper image reading unit 221 also includes the light receiver 226 that receives light reflected by the portion of the paper sheet P positioned at the downstream location 82.

The upper image reading unit 221 also includes the light reflecting members 227 that reflect the light reflected by the paper sheet P toward the light receiver 226.

In the present exemplary embodiment, the light reflecting members 227 include a first light reflecting member 227A, a second light reflecting member 227B, and a third light reflecting member 227C.

In the present exemplary embodiment, the first light reflecting member 227A, the second light reflecting member 227B, and the third light reflecting member 227C provided as the light reflecting members 227 are arranged in that order in a traveling direction in which the reflected light travels.

In the present exemplary embodiment, at least one of the light reflecting members 227 reflects the reflected light plural times. More specifically, in the present exemplary embodiment, the first light reflecting member 227A reflects the reflected light twice.

In the present exemplary embodiment, it is assumed that the first light reflecting member 227A reflects the reflected light plural times. However, the light reflecting member 227 that reflects the reflected light plural times may be another light reflecting member 227, such as the second light reflecting member 227B or the third light reflecting member 227C.

In the present exemplary embodiment, the first light reflecting member 227A reflects the reflected light the first time at a first reflection position 91 on the first light reflecting member 227A. The first light reflecting member 227A reflects the reflected light the second time at a second reflection position 92 on the first light reflecting member 227A.

In the present exemplary embodiment, the first reflection position 91 at which the first light reflecting member 227A reflects the reflected light the first time differs from the second reflection position 92 at which the first light reflecting member 227A reflects the reflected light the second time.

When one of the light reflecting members 227 reflects the reflected light plural times as in the present exemplary embodiment, the size of the upper image reading unit 221 may be reduced compared to when each light reflecting member 227 reflects the reflected light only once.

Figure 22A:
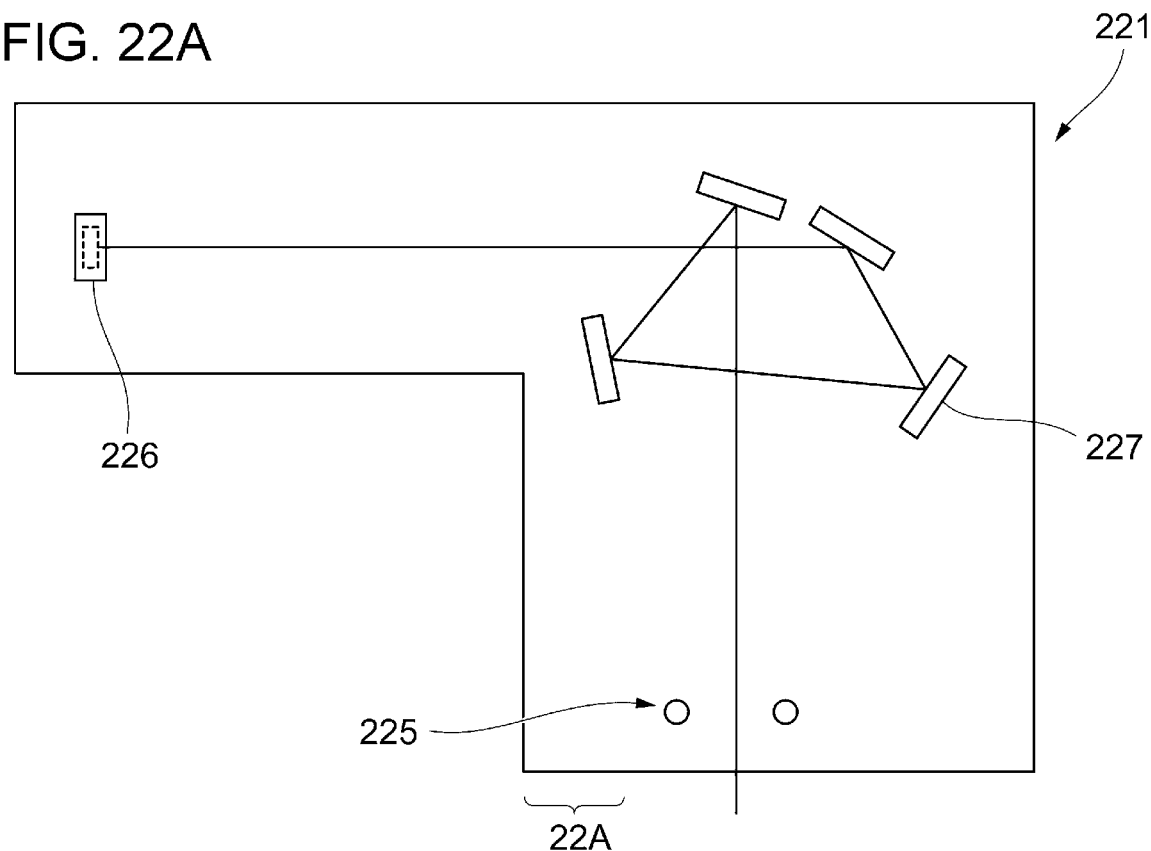
FIGS. 22A and 22B illustrate exemplary structures in which each light reflecting member reflects reflected light only once.
Figure 22B:
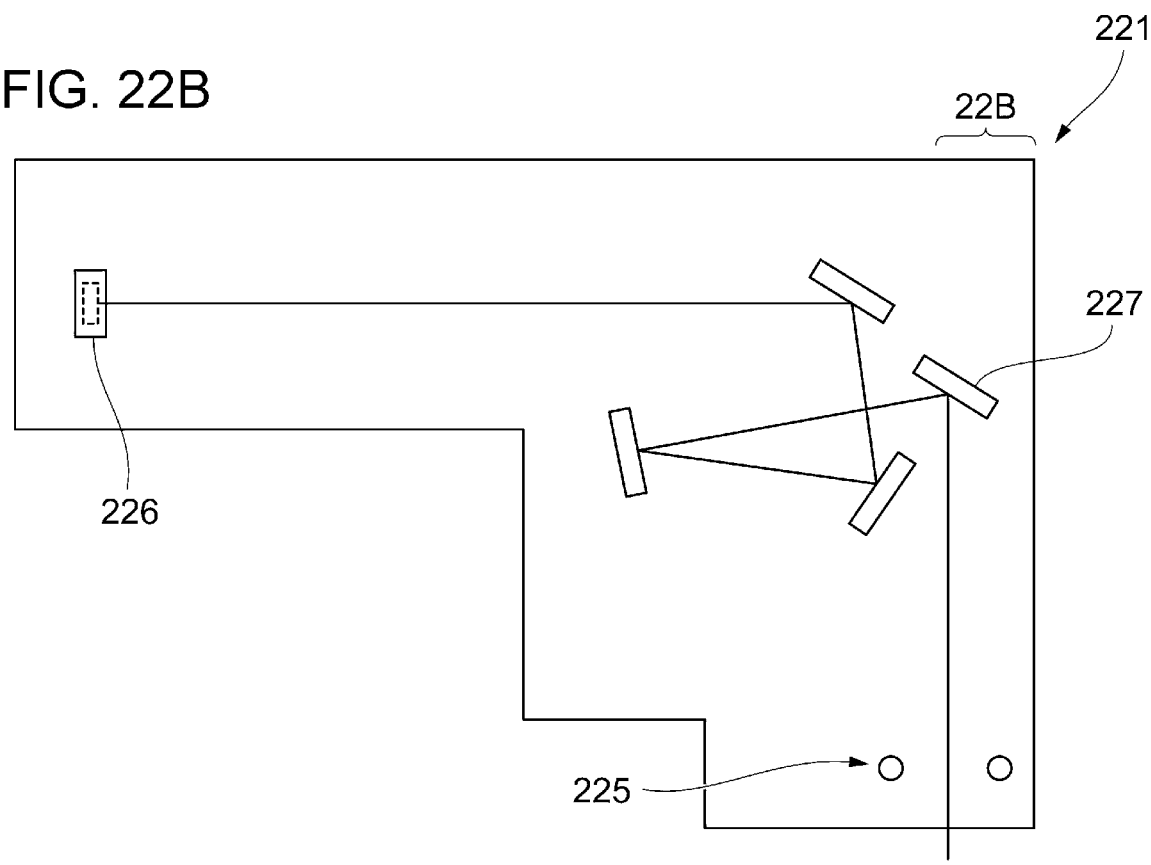

FIGS. 22A and 22B illustrate exemplary structures in which each light reflecting member 227 reflects the reflected light only once.

When each light reflecting member 227 reflects the reflected light only once as illustrated in FIGS. 22A and 22B, four light reflecting members 227 are provided. In this case, the size of the upper image reading unit 221 is increased.

More specifically, in the exemplary structure illustrated in FIG. 22A, a portion denoted by 22A protrudes from the structure of the present exemplary embodiment illustrated in FIG. 21. In the exemplary structure illustrated in FIG. 22B, a portion denoted by 22B protrudes from the structure of the present exemplary embodiment illustrated in FIG. 21. Thus, in the exemplary structures illustrated in FIGS. 22A and 22B, the size of the upper image reading unit 221 is increased.

In contrast, when one of the light reflecting members 227 reflects the reflected light plural times as in the present exemplary embodiment, as illustrated in FIG. 21, the size of the upper image reading unit 221 may be reduced compared to those in the exemplary structures illustrated in FIGS. 22A and 22B.

As described above, the light receiver 226 (see FIG. 21) includes the light receiving elements 226A arranged in one direction. More specifically, the light receiving elements 226A are arranged in a direction orthogonal to the plane of FIG. 21.

In addition, in the present exemplary embodiment, each of the light reflecting members 227 extends in the one direction. More specifically, each of the light reflecting members 227 extends in the direction orthogonal to the plane of FIG. 21.

In other words, each of the light reflecting members 227 extends in a direction orthogonal to the transporting direction in which the paper sheet P is transported in the inspection device 200 and orthogonal to the thickness direction of the paper sheet P that is transported.

The first light reflecting member 227A includes a first edge portion 78 and a second edge portion 79.

In the present exemplary embodiment, the first edge portion 78 and the second edge portion 79 are at different positions in a direction that crosses (that is orthogonal to) the thickness direction of the first light reflecting member 227A and the above-described one direction.

In other words, in the present exemplary embodiment, the first edge portion 78 and the second edge portion 79 are at different positions in the short direction of the first light reflecting member 227A.

In the present exemplary embodiment, when the reflected light is reflected by the first light reflecting member 227A the first time, the reflected light is incident on the first light reflecting member 227A from the paper sheet P (not illustrated in FIG. 21) in the sheet transport path R.

In addition, in the present exemplary embodiment, when the reflected light is reflected by the first light reflecting member 227A the second time, the reflected light is incident on the first light reflecting member 227A from the third light reflecting member 227C, which is an example of another light reflecting member.

In other words, when the reflected light is reflected by the first light reflecting member 227A the second time, the reflected light is incident on the first light reflecting member 227A from the third light reflecting member 227C that is immediately upstream of the first light reflecting member 227A in the traveling direction of the reflected light.

Assume that a normal line H1 is a line that is normal to a light reflecting surface 86 of the first light reflecting member 227A and that passes through the first reflection position 91. In the present exemplary embodiment, the light reflected by the paper sheet P is incident on the first light reflecting member 227A from the same side of the normal line H1 as the side on which the first edge portion 78 is disposed.

In addition, assume that a normal line H2 is a line that is normal to the light reflecting surface 86 and that passes through the second reflection position 92. In the present exemplary embodiment, the light reflected by the third light reflecting member 227C is incident on the first light reflecting member 227A from the same side of the normal line H2 as the side on which the first edge portion 78 is disposed.

Figure 23:
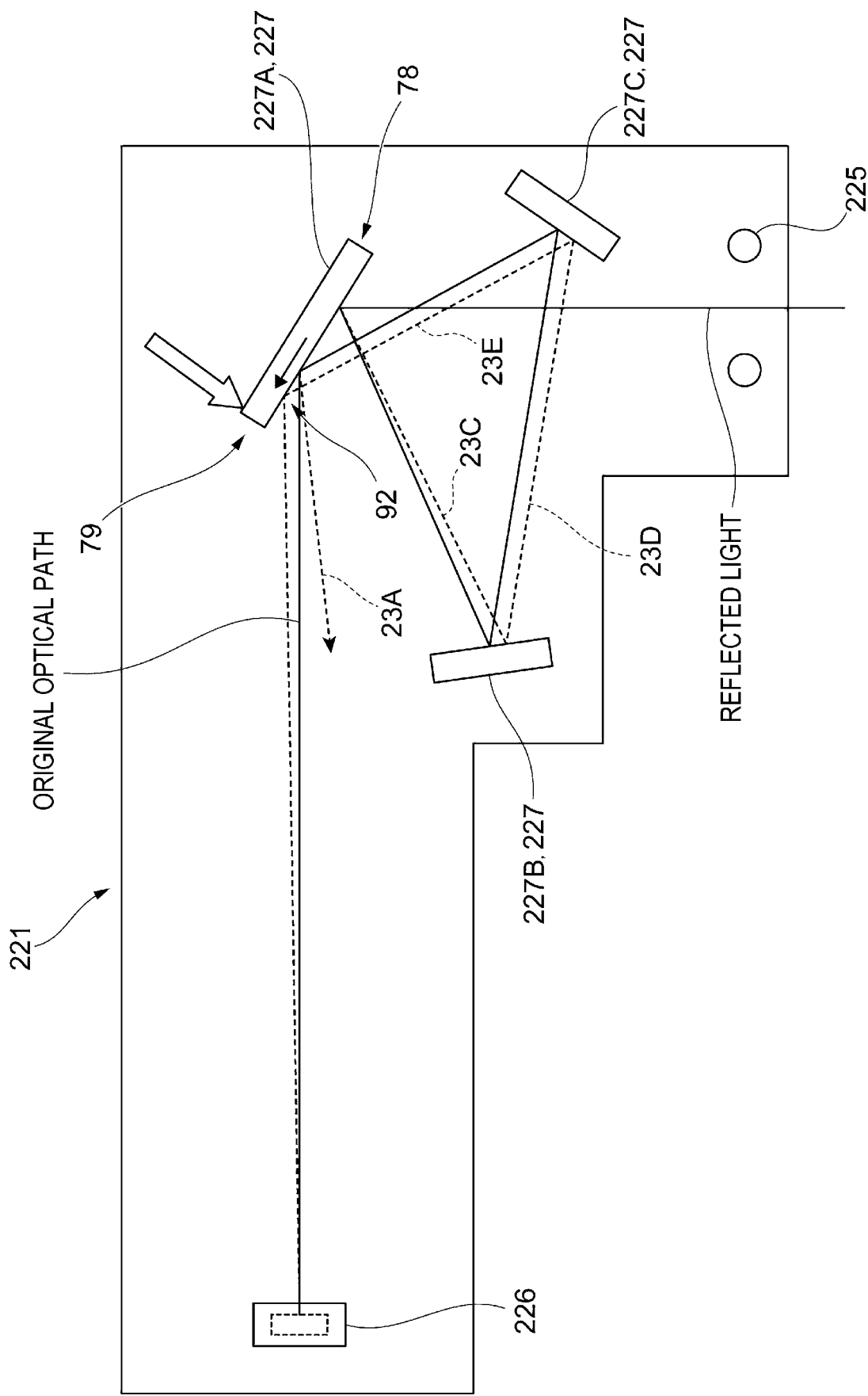
FIG. 23 illustrates a situation in which an inclination angle of a first light reflecting member is changed.

FIG. 23 illustrates a situation in which an inclination angle of the first light reflecting member 227A is changed.

Referring to FIG. 23, in the present exemplary embodiment, the light reflecting members 227 are arranged such that the position of the second reflection position 92 changes in response to a change in the inclination angle of the first light reflecting member 227A.

More specifically, as illustrated in FIG. 23, in the present exemplary embodiment, the light reflecting members 227 are arranged such that the second reflection position 92 moves toward the second edge portion 79 in response to a change in the inclination of the first light reflecting member 227A that causes the second edge portion 79 to move relative to the first edge portion 78 toward the third light reflecting member 227C.

In other words, in the present exemplary embodiment, the light reflecting members 227 are arranged such that the second reflection position 92 moves toward the second edge portion 79 in response to a change in the inclination of the first light reflecting member 227A that causes the second edge portion 79 to move relative to the first edge portion 78 toward the side from which the reflected light is incident.

Examples of a situation in which the second edge portion 79 moves relative to the first edge portion 78 toward the third light reflecting member 227C includes a situation in which only the second edge portion 79 moves toward the third light reflecting member 227C, a situation in which only the first edge portion 78 moves away from the third light reflecting member 227C, and a situation in which the second edge portion 79 moves toward the third light reflecting member 227C and in which the first edge portion 78 moves away from the third light reflecting member 227C.

Figure 24:
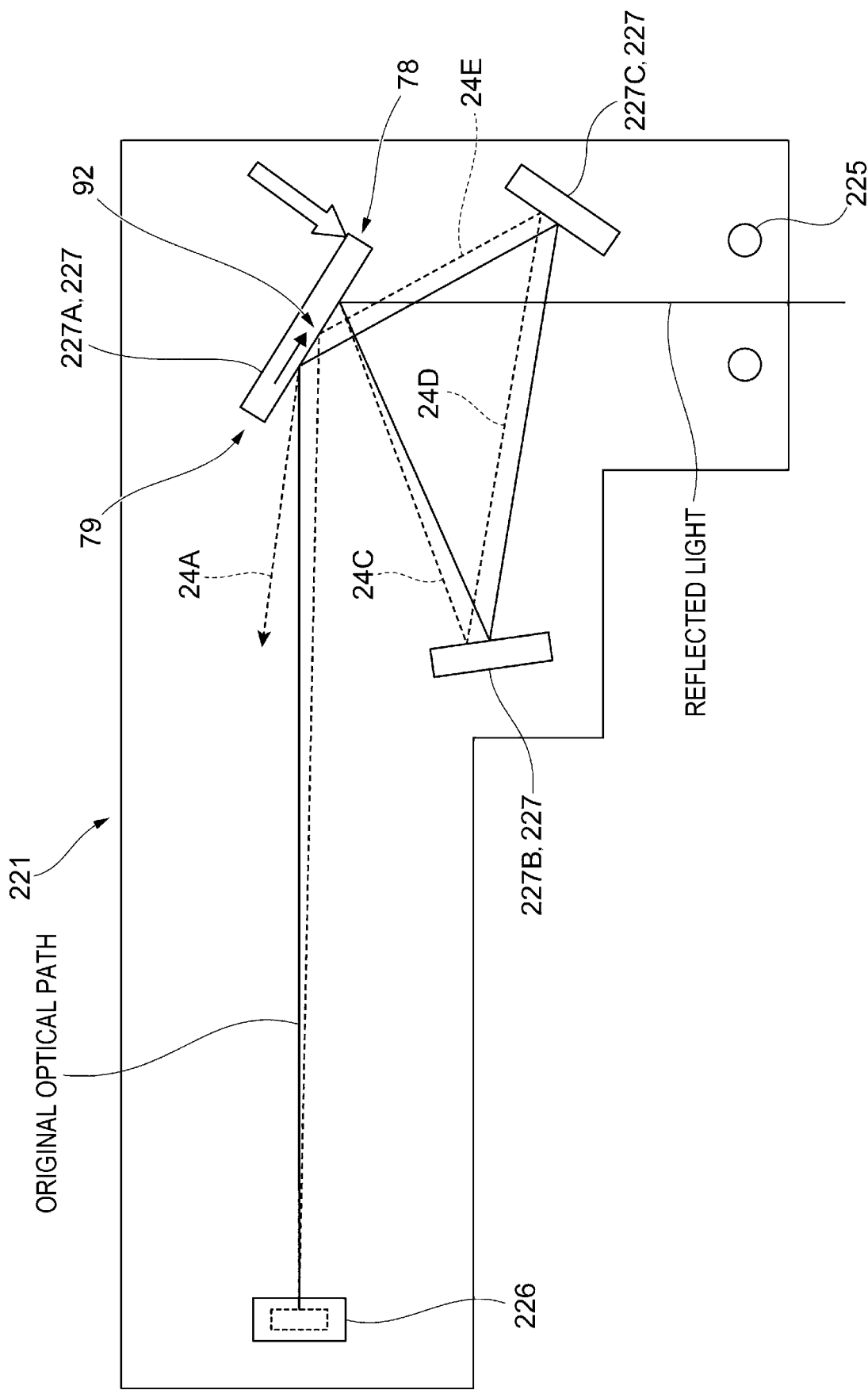
FIG. 24 illustrates another situation in which an inclination angle of the first light reflecting member is changed.

In addition, referring to FIG. 24, which illustrates another situation in which the inclination angle of the first light reflecting member 227A is changed, in the present exemplary embodiment, the light reflecting members 227 are arranged such that the second reflection position 92 moves toward the first edge portion 78 in response to a change in the inclination of the first light reflecting member 227A that causes the first edge portion 78 to move relative to the second edge portion 79 toward the third light reflecting member 227C.

In other words, in the present exemplary embodiment, the light reflecting members 227 are arranged such that the second reflection position 92 moves toward the first edge portion 78 in response to a change in the inclination of the first light reflecting member 227A that causes the first edge portion 78 to move relative to the second edge portion 79 toward the side from which the reflected light is incident.

Examples of a situation in which the first edge portion 78 moves relative to the second edge portion 79 toward the third light reflecting member 227C includes a situation in which only the first edge portion 78 moves toward the third light reflecting member 227C, a situation in which only the second edge portion 79 moves away from the third light reflecting member 227C, and a situation in which the first edge portion 78 moves toward the third light reflecting member 227C and in which the second edge portion 79 moves away from the third light reflecting member 227C.

When the light reflecting members 227 are arranged such that the second reflection position 92 moves toward the second edge portion 79 or toward the first edge portion 78 as in the present exemplary embodiment, a displacement of the reflected light with respect to the light receiver 226 is reduced compared to when the second reflection position 92 does not move. Accordingly, the image reading accuracy is increased.

Referring to FIG. 23, assume that the second reflection position 92 does not move in response to a change in the inclination of the first light reflecting member 227A that causes the second edge portion 79 to move relative to the first edge portion 78 toward the third light reflecting member 227C. In such a case, the reflected light travels in the direction shown by arrow 23A in FIG. 23.

Referring to FIG. 24, assume that the second reflection position 92 does not move in response to a change in the inclination of the first light reflecting member 227A that causes the first edge portion 78 to move relative to the second edge portion 79 toward the third light reflecting member 227C. In such a case, the reflected light travels in the direction shown by arrow 24A in FIG. 24.

In these cases, the reflected light is displaced with respect to the light receiver 226, and the image reading accuracy is reduced.

In contrast, the second reflection position 92 moves in the present exemplary embodiment. In such a case, even when the inclination of the first light reflecting member 227A is changed, a displacement of the reflected light with respect to the light receiver 226 is small, and the image reading accuracy is increased.

As illustrated in FIG. 23, in the present exemplary embodiment, in a period from a reflection of the reflected light by the first light reflecting member 227A to the next reflection of the reflected light by the first light reflecting member 227A, the reflected light is reflected by plural light reflecting members 227 other than the first light reflecting member 227A.

In other words, in the present exemplary embodiment, in the period from a reflection of the reflected light by the first light reflecting member 227A to the next reflection of the reflected light by the first light reflecting member 227A, the reflected light is reflected plural times by the light reflecting members 227 other than the first light reflecting member 227A.

More specifically, in the present exemplary embodiment, in the period from a reflection of the reflected light by the first light reflecting member 227A to the next reflection, the reflected light is reflected by an even number of other light reflecting members 227.

In other words, in the present exemplary embodiment, in the period from a reflection of the reflected light by the first light reflecting member 227A to the next reflection, the reflected light is reflected an even number of times by the other light reflecting members 227.

More specifically, in the present exemplary embodiment, in the period from a reflection of the reflected light by the first light reflecting member 227A to the next reflection, the reflected light is reflected an even number of times by an even number of other light reflecting members 227, which are the second light reflecting member 227B and the third light reflecting member 227C.

In the present exemplary embodiment, the reflected light is reflected plural times as described above. Accordingly, as described above, a displacement of the reflected light with respect to the light receiver 226 due to a change in the inclination of the first light reflecting member 227A is reduced.

More specifically, in the present exemplary embodiment, the reflected light is reflected an even number of times so that a displacement of the reflected light with respect to the light receiver 226 due to a change in the inclination of the first light reflecting member 227A is reduced.

Referring to FIG. 23, assume that the inclination of the first light reflecting member 227A is changed such that the second edge portion 79 moves relative to the first edge portion 78 toward the third light reflecting member 227C. In this case, in the present exemplary embodiment, the reflected light that is reflected by the first light reflecting member 227A the first time travels from the first light reflecting member 227A along an optical path denoted by 23C that is on the left side of the original optical path.

In the following description, "left side" means the left side of the original optical path as viewed from the upstream side in the traveling direction of the reflected light. Also, "right side" means the right side of the original optical path as viewed from the upstream side in the traveling direction of the reflected light.

After that, in the present exemplary embodiment, the reflected light is reflected by the second light reflecting member 227B so that the position of the optical path of the reflected light with respect to the original optical path is reversed. Accordingly, the reflected light travels along an optical path denoted by 23D that is on the right side of the original optical path.

Then, in the present exemplary embodiment, the reflected light is reflected by the third light reflecting member 227C so that the position of the optical path of the reflected light with respect to the original optical path is reversed again. Accordingly, the reflected light travels along an optical path denoted by 23E that is on the left side of the original optical path.

In this case, the reflected light travels toward the first light reflecting member 227A along the optical path that is on the left side of the original optical path. Accordingly, the second reflection position 92 moves toward the second edge portion 79. In this case, the reflected light that is reflected by the first light reflecting member 227A travels toward the light receiver 226, and a displacement of the reflected light with respect to the light receiver 226 is reduced.

Referring to FIG. 24, assume that the inclination of the first light reflecting member 227A is changed such that the first edge portion 78 moves relative to the second edge portion 79 toward the third light reflecting member 227C. In this case, the reflected light that is reflected by the first light reflecting member 227A the first time travels from the first light reflecting member 227A along an optical path denoted by 24C that is on the right side of the original optical path.

Then, in the present exemplary embodiment, the reflected light is reflected by the second light reflecting member 227B so that the position of the optical path of the reflected light with respect to the original optical path is reversed. Accordingly, the reflected light travels along an optical path denoted by 24D that is on the left side of the original optical path.

Then, in the present exemplary embodiment, the reflected light is reflected by the third light reflecting member 227C so that the position of the optical path of the reflected light with respect to the original optical path is reversed again. Accordingly, the reflected light travels along an optical path denoted by 24E that is on the right side of the original optical path.

In this case, the reflected light travels toward the first light reflecting member 227A along the optical path that is on the right side of the original optical path. Accordingly, the second reflection position 92 moves toward the first edge portion 78 of the first light reflecting member 227A.

In this case, the reflected light that is reflected by the first light reflecting member 227A travels toward the light receiver 226, and a displacement of the reflected light with respect to the light receiver 226 is reduced.

In the present exemplary embodiment, the upper image reading unit 221 (see FIG. 1) and the lower image reading unit 222 have similar structures, and plural units which each include the light receiver 226 and the light reflecting members 227 are provided.

In the present exemplary embodiment, the upper image reading unit 221 includes the light receiver 226 and plural light reflecting members 227 of a first unit. The light receiver 226 and the light reflecting members 227 of the first unit are provided on one side of the sheet transport path R.

The lower image reading unit 222 includes the light receiver 226 and plural light reflecting members 227 of a second unit. The light receiver 226 and the light reflecting members 227 of the second unit are provided on the other side of the sheet transport path R.

In other words, in the present exemplary embodiment, the light receiver 226 and the light reflecting members 227 of the first unit constitute the upper image reading unit 221, which is an example of a first image reader that reads an image formed on one surface of the paper sheet P.

In addition, in the present exemplary embodiment, the light receiver 226 and the light reflecting members 227 of the second unit constitute the lower image reading unit 222, which is an example of a second image reader that reads an image formed on the other surface of the paper sheet P.

In addition, in the present exemplary embodiment, the lower image reading unit 222 and the upper image reading unit 221 are arranged to be point-symmetric to each other.

More specifically, in the present exemplary embodiment, the lower image reading unit 222 and the upper image reading unit 221 are arranged to be point-symmetric to each other about a center of symmetry denoted by 1X in FIG. 1.

In other words, in the present exemplary embodiment, when, for example, the lower image reading unit 222 is rotated by 180° around the center of symmetry, the lower image reading unit 222 overlaps the upper image reading unit 221.

In other words, in the present exemplary embodiment, when, for example, the lower image reading unit 222 is rotated by 180° around the center of symmetry, the light receiver 226 and the light reflecting members 227 of the first unit respectively overlap the light receiver 226 and the light reflecting members 227 of the second unit.

Figure 25:
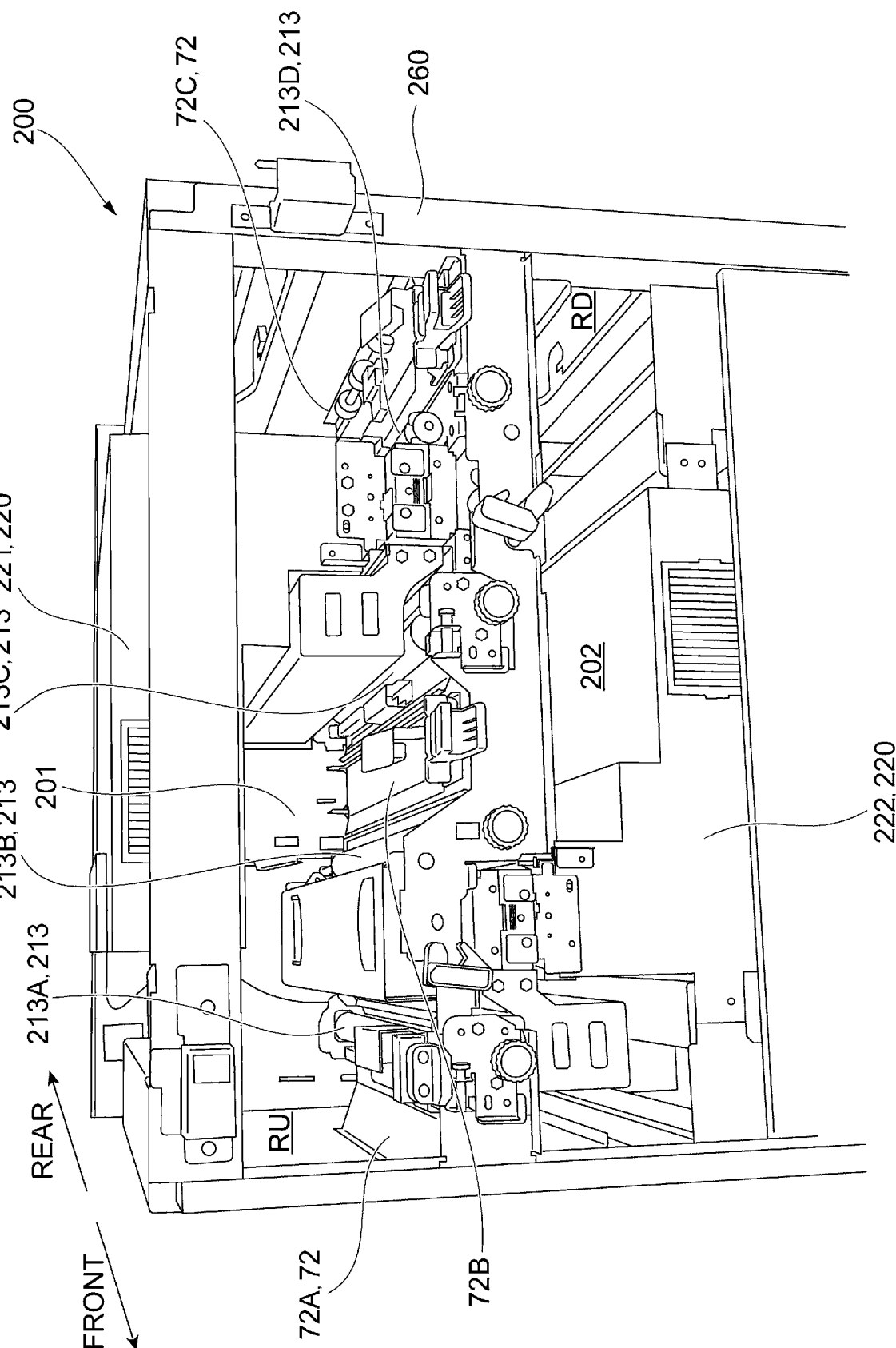
FIG. 25 illustrates the internal structure of the inspection device.

FIG. 25 illustrates the internal structure of the inspection device 200. FIG. 25 illustrates the inspection device 200 viewed from the front.

In the present exemplary embodiment, the inspection device 200 includes a single housing 260 that supports components of the inspection device 200.

In the present exemplary embodiment, the upper image reading unit 221 and the lower image reading unit 222, which serve as image readers, and the transport roller units 213, which are examples of transport units, are supported by the common housing 260.

More specifically, in the present exemplary embodiment, the lower image reading unit 222, the upper image reading unit 221, the upstream transport roller unit 213A, the first intermediate transport roller unit 213B, the second intermediate transport roller unit 213C, and the downstream transport roller unit 213D are supported by the common housing 260.

In addition, in the present exemplary embodiment, the upper rotating member 51 (see FIG. 1) and the lower rotating member 52 are also supported by the common housing 260.

In the present exemplary embodiment, as illustrated in FIG. 15, two regions face each other with the sheet transport path R provided therebetween.

More specifically, the two regions include an upper region RU positioned above the sheet transport path R and a lower region RD positioned below the sheet transport path R. In the present exemplary embodiment, the image reading unit 220 is provided in each of the upper region RU and the lower region RD.

More specifically, the upper image reading unit 221 is provided in the upper region RU, and the lower image reading unit 222 is provided in the lower region RD.

In addition, in the present exemplary embodiment, as described above, the upper gap 201 is provided between the sheet transport path R and the upper image reading unit 221, and the lower gap 202 is provided between the sheet transport path R and the lower image reading unit 222.

The sheet transport path R extends in a horizontal direction. Of the two gaps, the upper gap 201 is positioned above the sheet transport path R, and the lower gap 202 is positioned below the sheet transport path R.

In addition, in the present exemplary embodiment, the sheet transport path R is accessible by the user through the upper gap 201. The sheet transport path R is also accessible by the user through the lower gap 202.

The expression "sheet transport path R is accessible" means that the paper sheet P in the sheet transport path R may be touched by the user.

In the present exemplary embodiment, the sheet transport path R is accessible through each of the two gaps, which are the upper gap 201 and the lower gap 202. Thus, the sheet transport path R is accessible from the above-described two regions, which are the upper region RU and the lower region RD.

Alternatively, the structure may be such that the sheet transport path R is accessible only through one of the upper gap 201 and the lower gap 202 instead of both the upper gap 201 and the lower gap 202.

In other words, the structure may be such that the sheet transport path R is accessible only from one of the two regions, which are the upper region RU and the lower region RD, instead of both of the two regions.

In the present exemplary embodiment, the sheet transport path R may be accessed through the upper gap 201 at an installation location of the upper rotating member 51 and an installation location of the intermediate guide member 72B (see FIG. 25).

At the installation location of the upper rotating member 51, the upper rotating member 51 is moved upward to form a gap between the upper rotating member 51 and the sheet transport path R, and the sheet transport path R may be accessed through this gap.

At the installation location of the intermediate guide member 72B, the intermediate guide member 72B is moved upward to form a gap between the intermediate guide member 72B and the sheet transport path R, and the sheet transport path R may be accessed through this gap.

In addition, in the present exemplary embodiment, the sheet transport path R may also be accessed at installation locations of the upstream guide member 72A (see FIG. 25) and the downstream guide member 72C.

Also in this case, the upstream guide member 72A and the downstream guide member 72C are moved upward to form gaps between the sheet transport path R and these guide members 72, so that the sheet transport path R may be accessed through these gaps.

The upstream guide member 72A and the downstream guide member 72C are provided in the upper region RU. The sheet transport path R may be accessed from above the sheet transport path R at the installation locations of the upstream guide member 72A and the downstream guide member 72C.

In the present exemplary embodiment, the lower rotating member 52 is the only member that enables access to the sheet transport path R in the lower gap 202 (see FIG. 15). No guide members 72 that are retractable from the sheet transport path R are provided in the lower gap 202.

In the lower gap 202, the sheet transport path R is accessible only at the installation location of the lower rotating member 52. More specifically, in the lower gap 202, the lower rotating member 52 is retracted from the sheet transport path R to form a gap, and the sheet transport path R is accessible through this gap.

In the present exemplary embodiment, each of the two gaps, which are the upper gap 201 (see FIG. 15) and the lower gap 202, has a rotating member provided on a side of the sheet transport path R.

More specifically, in the present exemplary embodiment, as described above, the upper rotating member 51 is provided on a side of the sheet transport path R in the upper gap 201, and the lower rotating member 52 is provided on a side of the sheet transport path R in the lower gap 202.

As described above, each of the upper rotating member 51 and the lower rotating member 52 is retractable from the sheet transport path R. Thus, in the present exemplary embodiment, a gap may be formed between each of the two rotating members and the sheet transport path R at the installation location of each rotating member, and the sheet transport path R may be accessed through this gap.

In the present exemplary embodiment, as described above, the sheet transport path R is not accessible at locations other than the installation location of the lower rotating member 52 in the lower gap 202.

In contrast, in the upper gap 201, the sheet transport path R is accessible at locations other than the installation location of the upper rotating member 51.

More specifically, in the upper gap 201, as described above, the sheet transport path R may be accessed at the installation location of the intermediate guide member 72B when the intermediate guide member 72B is retracted from the sheet transport path R.

The structure may instead be such that the sheet transport path R is not accessible at locations other than the installation location of the upper rotating member 51 in the upper gap 201.

Also, a guide member 72 retractable from the sheet transport path R may be provided in the lower gap 202 so that, also in the lower gap 202, the sheet transport path R is accessible at both the installation location of the lower rotating member 52 and the installation location of the guide member 72.

According to the present exemplary embodiment, the sheet transport path R may be accessed without pulling out the housing 260 (see FIG. 25) from the body of the inspection device 200.

More specifically, in the present exemplary embodiment, as described above, the three guide members 72, the upper rotating member 51, and the lower rotating member 52 are retractable from the sheet transport path R. Therefore, the sheet transport path R may be accessed without pulling out the housing 260.

The sheet transport path R may be accessed by another method. For example, a housing that supports a transport unit for transporting the paper sheet P may be provided in addition to the housing that supports the image reading unit 220, and the housing that supports that transport unit may be pulled out to enable access to the sheet transport path R.

In this case, the position of the transport unit with respect to the image reading unit 220 easily varies, and accordingly the accuracy with which an image on the paper sheet P is read is easily reduced.

In contrast, in the present exemplary embodiment, the image reading unit 220 and the transport units are supported by a single housing 260, and the guide members 72, for example, are moved to form the above-described gaps through which the sheet transport path R may be accessed. Thus, access to the sheet transport path R may be enabled without causing variations in the positions of the transport units with respect to the image reading unit 220.

Figure 26:
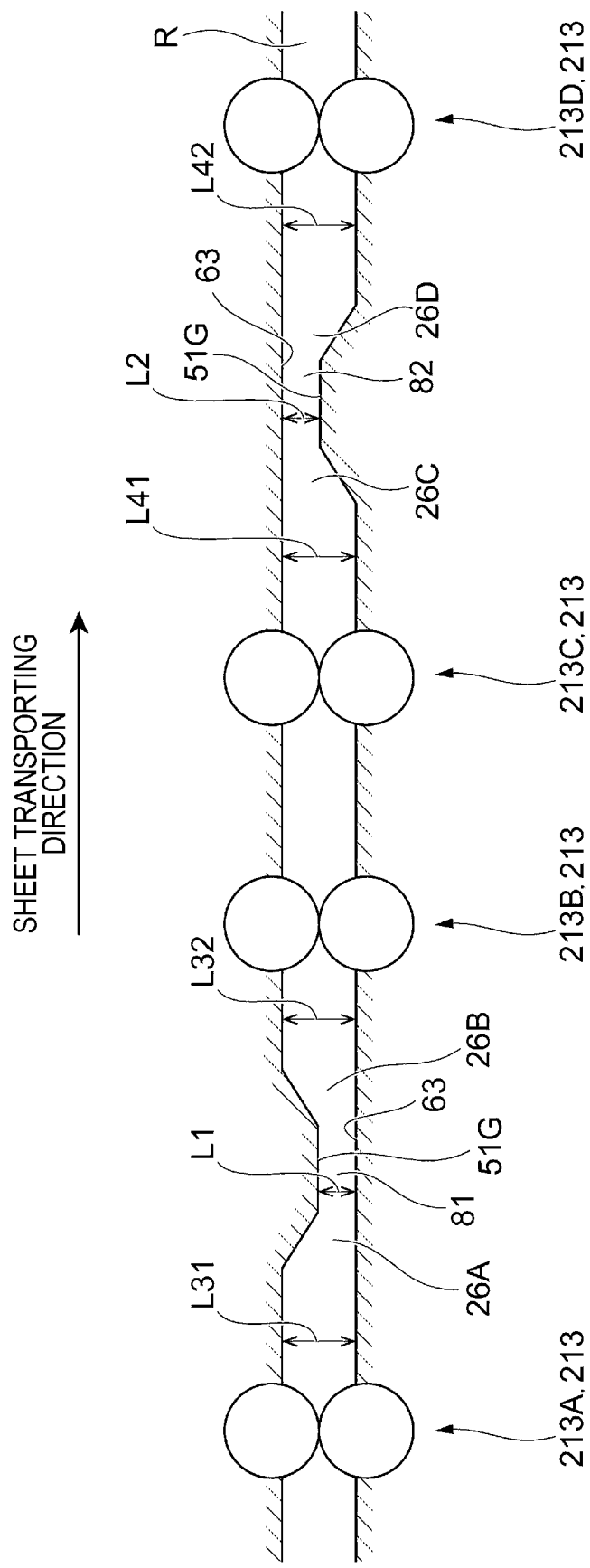
FIG. 26 illustrates a sheet transport path viewed from the front of the inspection device.

FIG. 26 illustrates the sheet transport path R viewed from the front of the inspection device 200.

More specifically, FIG. 26 illustrates the sheet transport path R in a state in which the sheet guides 51G illustrated in FIG. 3 face the respective light transmitting portions 63.

More specifically, FIG. 26 illustrates the sheet transport path R in a state in which the sheet guide 51G of the upper rotating member 51 faces the corresponding light transmitting portion 63 and in which the sheet guide 51G of the lower rotating member 52 faces the corresponding light transmitting portion 63.

In the present exemplary embodiment, a width (hereinafter referred to as a "first width L1") of the sheet transport path R in a thickness direction of the paper sheet P (not illustrated in FIG. 26) transported along the sheet transport path R at the upstream location 81, which is an example of a specific location, is less than an upstream width L31, which is a width of the sheet transport path R at a location upstream of the upstream location 81.

In the present exemplary embodiment, the first width L1 is also less than a downstream width L32, which is a width of the sheet transport path R at a location downstream of the upstream location 81.

In the present exemplary embodiment, the sheet transport path R is narrow at the upstream location 81 and wide at locations upstream and downstream of the upstream location 81.

In this specification, the term "width" means the width in the thickness direction of the paper sheet P positioned in the sheet transport path R.

In the present exemplary embodiment, the sheet guide 51G of the upper rotating member 51 (not illustrated in FIG. 26) faces the corresponding light transmitting portion 63 so that the width of the sheet transport path R is partially reduced. Accordingly, the first width L1 is less than the upstream width L31 and the downstream width L32.

Similarly, in the present exemplary embodiment, a width (hereinafter referred to as a "second width L2") of the sheet transport path R at the downstream location 82, which is another example of a specific location, is less than an upstream width L41, which is a width of the sheet transport path R at a location upstream of the downstream location 82. The second width L2 is also less than a downstream width L42, which is a width of the sheet transport path R at a location downstream of the downstream location 82.

In the present exemplary embodiment, the sheet guide 51G of the lower rotating member 52 (not illustrated in FIG. 26) faces the corresponding light transmitting portion 63 so that the width of the sheet transport path R is partially reduced. Accordingly, the second width L2 is less than the upstream width L41 and the downstream width L42.

In the present exemplary embodiment, at each of the upstream location 81 and the downstream location 82, the width of the sheet transport path R is less than the upstream width and the downstream width.

In the present exemplary embodiment, the first width L1 is equal to the second width L2.

In the present exemplary embodiment, the sheet transport path R has a portion denoted by 26A in FIG. 26 that is positioned upstream of the upstream location 81 and that has a width gradually decreasing with increasing distance in the transporting direction of the paper sheet P.

In addition, in the present exemplary embodiment, the sheet transport path R has a portion denoted by 26B that is positioned downstream of the upstream location 81 and that has a width gradually increasing with increasing distance in the transporting direction of the paper sheet P.

In the present exemplary embodiment, as illustrated in FIG. 3, the upper rotating member 51 has the upstream guide 51H and the downstream guide 51K that are inclined with respect to the transporting direction of the paper sheet P.

In the present exemplary embodiment, the upstream guide 51H is provided so that, as described above, the sheet transport path R includes the portion with a width gradually decreasing with increasing distance in the transporting direction of the paper sheet P.

In addition, in the present exemplary embodiment, the downstream guide 51K is provided so that the sheet transport path R includes the portion with a width gradually increasing with increasing distance in the transporting direction of the paper sheet P.

Similarly, at the downstream location 82, the sheet transport path R has a portion denoted by 26C that is positioned upstream of the downstream location 82 and that has a width gradually decreasing with increasing distance in the transporting direction of the paper sheet P.

In addition, the sheet transport path R has a portion denoted by 26D that is positioned downstream of the downstream location 82 and that has a width gradually increasing with increasing distance in the transporting direction of the paper sheet P.

Figure 27:
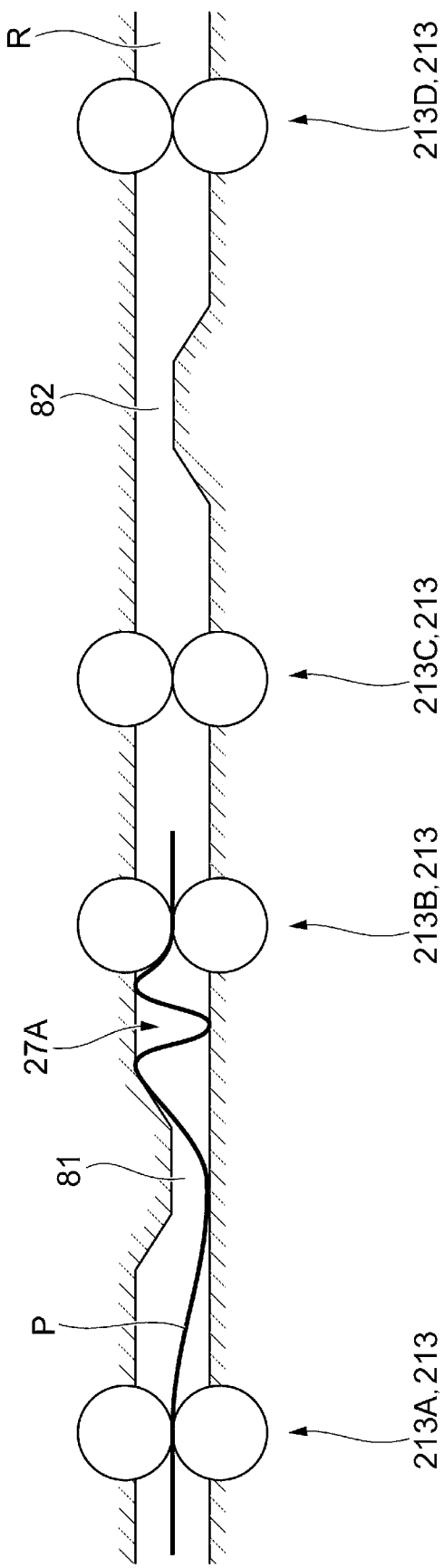
FIG. 27 illustrates a paper sheet in the sheet transport path.

FIG. 27 illustrates the paper sheet P in the sheet transport path R.

When the sheet transport path R includes a narrow portion and wide portions located upstream and downstream of the narrow portion as in the present exemplary embodiment, reduction in the image reading accuracy due to cockling of the paper sheet P may be suppressed.

When, for example, a transport speed at which the first intermediate transport roller unit 213B transports the paper sheet P is lower than a transport speed at which the upstream transport roller unit 213A transports the paper sheet P, there is a risk that cockling of the paper sheet P will occur in the region between the upstream transport roller unit 213A and the first intermediate transport roller unit 213B.

In this case, when the narrow portion and the wide portions are provided as in the present exemplary embodiment, cockling easily occurs in a wide portion, as denoted by 27A, and does not easily occur in the narrow portion.

In this case, the behavior of the paper sheet P is stable and the image reading accuracy is not easily reduced in the narrow portion. More specifically, the behavior of the paper sheet P is stable and the image reading accuracy is not easily reduced at the upstream location 81.

Although not illustrated, also at the downstream location 82, cockling easily occurs in the wide portions, and does not easily occur in the narrow portion.

In this case, similar to the above-described case, the behavior of the paper sheet P is stable and the image reading accuracy is not easily reduced in the narrow portion. More specifically, the behavior of the paper sheet P is stable and the image reading accuracy is not easily reduced at the downstream location 82.

In the present exemplary embodiment, the width of the sheet transport path R is increased both in regions downstream and upstream of the upstream location 81. However, the width of the sheet transport path R may instead be increased only in one of the regions downstream and upstream of the upstream location 81.

Similarly, the width of the sheet transport path R may be increased only in one of the regions downstream and upstream of the downstream location 82.

Alternatively, for example, the sheet transport path R may be narrow in the region between the upstream location 81 and the downstream location 82 and wide in the regions upstream of the upstream location 81 and downstream of the downstream location 82.

In the present exemplary embodiment, the paper sheet P in the sheet transport path R may be removed at locations between the plural specific locations.

More specifically, in the present exemplary embodiment, the sheet transport path R is accessible by the user in the region between the upstream location 81 (see FIG. 15) and the downstream location 82. Accordingly, the paper sheet P in the sheet transport path R may be removed in the region between the upstream location 81 and the downstream location 82.

More specifically, in the present exemplary embodiment, the intermediate guide member 72B (see FIG. 9) disposed between the upstream location 81 and the downstream location 82 is retracted from the sheet transport path R to enable access to the sheet transport path R. Accordingly, the paper sheet P in the sheet transport path R may be removed in the region between the upstream location 81 and the downstream location 82.

Figure 28:
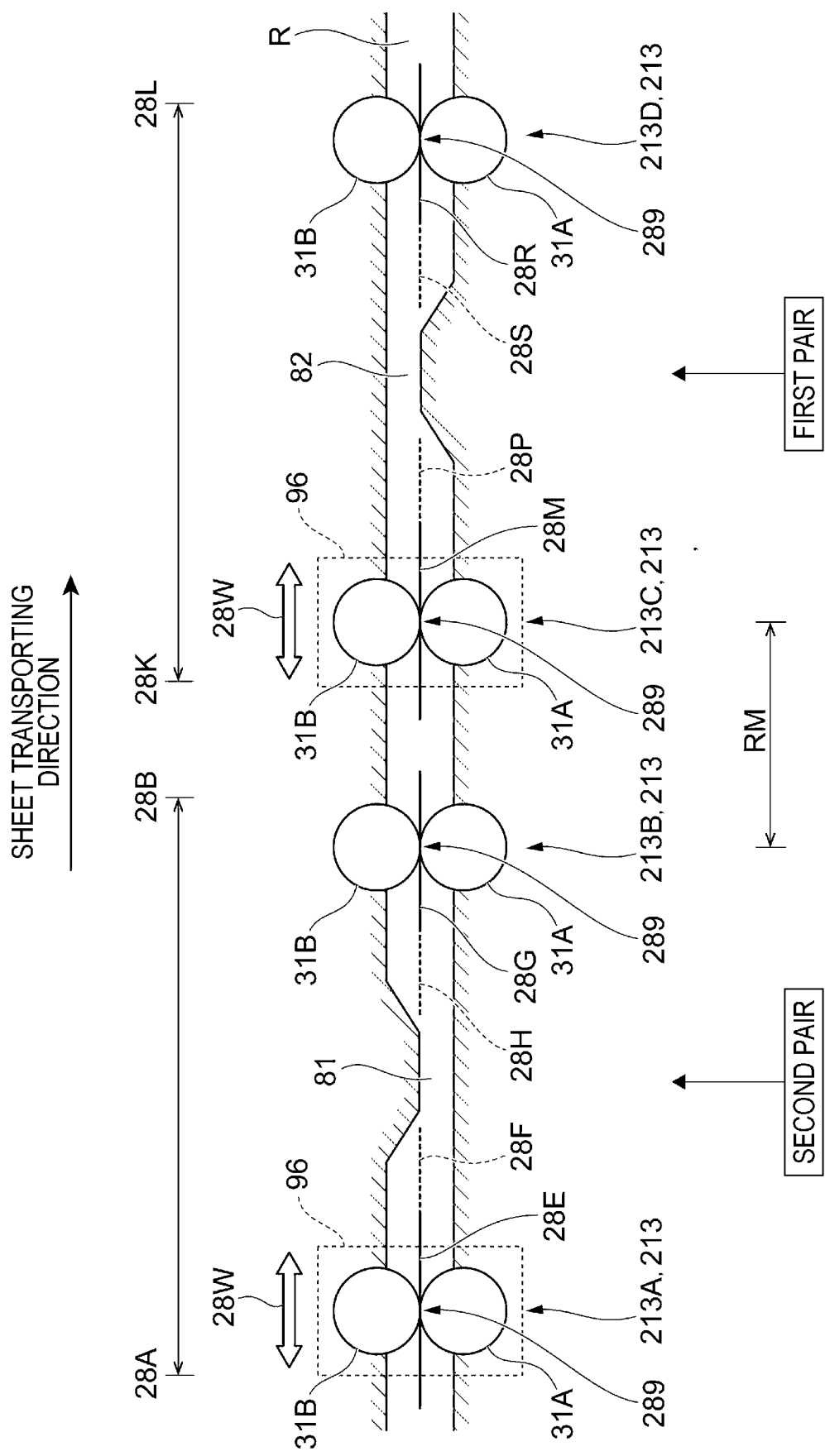
FIG. 28 illustrates the sheet transport path.

In addition, in the present exemplary embodiment, as illustrated in FIG. 28, which illustrates the sheet transport path R, the sheet transport path R extends straight over a region from a location upstream of the upstream location 81 in the transporting direction of the paper sheet P to a location downstream of the upstream location 81 in the transporting direction of the paper sheet P.

More specifically, the sheet transport path R extends straight over a region from a location upstream of the upstream location 81 in the transporting direction of the paper sheet P to a location downstream of the upstream location 81 and upstream of the downstream location 82 in the transporting direction of the paper sheet P.

More specifically, the sheet transport path R extends straight from a location denoted by 28A to a location denoted by 28B in FIG. 28.

The expression "sheet transport path R extends straight" means that an extension 28F of a tangent line 28E of the upstream transport roller unit 213A disposed at an upstream position passes through a contact portion 289 of the first intermediate transport roller unit 213B positioned immediately downstream of the upstream transport roller unit 213A, and that an extension 28H of a tangent line 28G of the first intermediate transport roller unit 213B passes through a contact portion 289 of the upstream transport roller unit 213A positioned immediately upstream of the first intermediate transport roller unit 213B.

In the present exemplary embodiment, the upstream transport roller unit 213A has the contact portion 289 at which the driving roller 31A and the driven roller 31B thereof are in contact with each other, and the first intermediate transport roller unit 213B also has the contact portion 289 at which the driving roller 31A and the driven roller 31B thereof are in contact with each other.

In the present exemplary embodiment, the contact portion 289 of the first intermediate transport roller unit 213B is positioned on the extension 28F of the tangent line 28E that passes through the contact portion 289 of the upstream transport roller unit 213A. In addition, the contact portion 289 of the upstream transport roller unit 213A is positioned on the extension 28H of the tangent line 28G that passes through the contact portion 289 of the first intermediate transport roller unit 213B.

The tangent line 28E of the upstream transport roller unit 213A is a line that is tangent to both the driving roller 31A and the driven roller 31B of the upstream transport roller unit 213A and that passes through the contact portion 289 at which the driving roller 31A and the driven roller 31B are in contact with each other.

The tangent line 28G of the first intermediate transport roller unit 213B is a line that is tangent to both the driving roller 31A and the driven roller 31B of the first intermediate transport roller unit 213B and that passes through the contact portion 289 at which the driving roller 31A and the driven roller 31B are in contact with each other.

In the present exemplary embodiment, the contact portion 289 of the first intermediate transport roller unit 213B is positioned on the extension 28F of the tangent line 28E of the upstream transport roller unit 213A, and the contact portion 289 of the upstream transport roller unit 213A is positioned on the extension 28H of the tangent line 28G of the first intermediate transport roller unit 213B. In such a case, buckling of the paper sheet P does not easily occur.

More specifically, in this case, the paper sheet P does not easily come into contact with side walls on the sides of the sheet transport path R at an angle. Accordingly, buckling of the paper sheet P does not easily occur.

Similarly, in the present exemplary embodiment, the sheet transport path R extends straight over a region from a location upstream of the downstream location 82 in the transporting direction of the paper sheet P to a location downstream of the downstream location 82 in the transporting direction of the paper sheet P.

More specifically, the sheet transport path R extends straight over a region from a location upstream of the downstream location 82 and downstream of the upstream location 81 in the transporting direction of the paper sheet P to a location downstream of the downstream location 82 in the transporting direction of the paper sheet P.

More specifically, the sheet transport path R extends straight from a location denoted by 28K to a location denoted by 28L in FIG. 28.

More specifically, similar to the above-described case, in the present exemplary embodiment, a contact portion 289 of the downstream transport roller unit 213D is positioned on an extension 28P of a tangent line 28M of the second intermediate transport roller unit 213C. In addition, a contact portion 289 of the second intermediate transport roller unit 213C is positioned on an extension 28S of a tangent line 28R of the downstream transport roller unit 213D.

Also in this case, the paper sheet P does not easily come into contact with side walls on the sides of the sheet transport path R at an angle. Accordingly, buckling of the paper sheet P does not easily occur.

In the present exemplary embodiment, each specific location has a downstream transport unit that is disposed downstream of the specific location and that transports the paper sheet P, and an upstream transport unit that is disposed upstream of the specific location and that transports the paper sheet P.

More specifically, in the present exemplary embodiment, as illustrated in FIG. 28, the upstream location 81 has the first intermediate transport roller unit 213B that is disposed downstream of the upstream location 81 and that transports the paper sheet P, and the upstream transport roller unit 213A that is disposed upstream of the upstream location 81 and that transports the paper sheet P.

In addition, in the present exemplary embodiment, the downstream location 82 has the downstream transport roller unit 213D that is disposed downstream of the downstream location 82 and that transports the paper sheet P, and the second intermediate transport roller unit 213C that is disposed upstream of the downstream location 82 and that transports the paper sheet P.

In the present exemplary embodiment, each of plural pairs of downstream and upstream transport units are each provided with an adjustment mechanism that adjusts an inclination of at least one of the downstream and upstream transport units.

In the present exemplary embodiment, the downstream transport roller unit 213D and the second intermediate transport roller unit 213C are provided as a first pair of downstream and upstream transport units.

In addition, in the present exemplary embodiment, the first intermediate transport roller unit 213B and the upstream transport roller unit 213A are provided as a second pair of downstream and upstream transport units.

In the present exemplary embodiment, each pair has an adjustment mechanism for adjusting an inclination of at least one of the transport roller units 213.

In the present exemplary embodiment, each pair is provided with an adjustment mechanism for adjusting an inclination of the upstream transport unit.

More specifically, in the present exemplary embodiment, as illustrated in FIG. 28, the downstream transport roller unit 213D and the second intermediate transport roller unit 213C, which are provided as the first pair of downstream and upstream transport units, are provided with an adjustment mechanism 96 that adjusts the inclination of the second intermediate transport roller unit 213C.

In addition, in the present exemplary embodiment, the first intermediate transport roller unit 213B and the upstream transport roller unit 213A, which are provided as the second pair of downstream and upstream transport units, are provided with an adjustment mechanism 96 that adjusts the inclination of the upstream transport roller unit 213A.

In the present exemplary embodiment, each adjustment mechanism 96 adjusts the corresponding transport roller unit 213 so that an end portion 213X (see FIG. 9) of the transport roller unit 213 at the front of the inspection device 200 moves upstream or downstream in the transporting direction of the paper sheet P, as shown by arrow 28W in FIG. 28.

More specifically, in the present exemplary embodiment, each adjustment mechanism 96 moves the end portion 213X of the driving roller 31A and the driven roller 31B of the corresponding transport roller unit 213 upstream or downstream in the transporting direction of the paper sheet P.

The user may manually operate each adjustment mechanism 96 to adjust the inclination of the corresponding transport roller unit 213 with the adjustment mechanism 96. Alternatively, each adjustment mechanism 96 may be operated by a driving force supplied from a drive source, such as a motor, so that the inclination of the corresponding transport roller unit 213 is automatically adjusted.

In the present exemplary embodiment, plural transport units for transporting the paper sheet P are provided between the specific locations.

More specifically, in the present exemplary embodiment, the first intermediate transport roller unit 213B and the second intermediate transport roller unit 213C are provided between the upstream location 81 and the downstream location 82, which are examples of specific locations. Thus, two transport roller units 213 are provided between the specific locations.

In the present exemplary embodiment, the plural pairs of downstream and upstream transport units are each provided with the adjustment mechanism 96 that adjusts the inclination of at least one of the downstream and upstream transport units. In such a case, the adjustment of the inclination of each transport unit may be facilitated.

Referring to FIG. 29, which illustrates another exemplary structure of the sheet transport path, assume that, for example, a single transport roller unit 213 is provided between the upstream location 81 and the downstream location 82 and that a total of three transport roller units 213 are provided.

In this case, the alignment of each of the three transport roller units 213 needs to be adjusted so that the three transport roller units 213 have the same alignment. In other words, the inclination of each of the three transport roller units 213 needs to be adjusted so that the three transport roller units 213 have the same inclination.

When, for example, one of the three transport roller units 213 that is denoted by 29A and positioned in the middle has an alignment different from that of the other two transport roller units 213, skewing of the paper sheet P occurs, and the image reading accuracy is reduced accordingly.

In this case, each of the three transport roller units 213 needs to be subjected to an alignment adjustment so that the three transport roller units 213 have the same inclination. Thus, a cumbersome process is required.

In contrast, in FIG. 28, the adjustment mechanism 96 is provided for each pair of the downstream and upstream transport units. In this case, one of the two transport roller units 213 belonging to the first pair and one of the two transport roller units 213 belonging to the second pair are subjected to the alignment adjustment.

In this case, two transport roller units 213 are subjected to the alignment adjustment, and the process is simplified compared to when three transport roller units 213 are each subjected to the alignment adjustment as described above.

When the alignment adjustment is performed individually for each pair as in the present exemplary embodiment, the alignment of one pair may differ from the alignment of the other pair. More specifically, in the present exemplary embodiment, the orientation of alignment of one pair may differ from the orientation of alignment of the other pair.

However, in the present exemplary embodiment, the downstream and upstream transport units of one pair have the same alignment, and the downstream and upstream transport units of the other pair have the same alignment.

In this case, skewing of the paper sheet P does not occur in each pair, so that reduction in the image reading accuracy due to skewing of the paper sheet P may be suppressed.

In other words, in this case, skewing of the paper sheet P may occur in a region RM between one and the other pairs, but does not occur in each pair. Accordingly, reduction in the image reading accuracy due to skewing of the paper sheet P may be suppressed.

More specifically, in this case, skewing of the paper sheet P may occur in the region RM between the first intermediate transport roller unit 213B and the second intermediate transport roller unit 213C, but does not occur in each pair. Accordingly, reduction in the image reading accuracy due to skewing of the paper sheet P may be suppressed.

When the downstream transport unit and the upstream transport unit are provided in each pair as in the present exemplary embodiment, two transport roller units 213 are disposed between the upstream location 81 and the downstream location 82.

More specifically, in the present exemplary embodiment, two transport roller units 213, which are the first intermediate transport roller unit 213B and the second intermediate transport roller unit 213C, are disposed between the upstream location 81 and the downstream location 82.

When two transport roller units 213 are provided between the upstream location 81 and the downstream location 82, as described above, the alignment adjustment may be performed individually for each pair. Accordingly, the process performed for the alignment adjustment may be simplified.

In the above-described structure, the adjustment mechanism 96 that adjusts the inclination of the corresponding transport roller unit 213 is provided for the upstream transport unit in each pair. However, the adjustment mechanism 96 is not limited to this, and may instead be provided to adjust the inclination of the downstream transport unit in each pair.

Alternatively, one pair may be provided with the adjustment mechanism 96 that adjusts the inclination of the upstream transport unit, and the other pair may be provided with the adjustment mechanism 96 that adjusts the inclination of the downstream transport unit.

In addition, in the above-described structure, the lower image reading unit 222, the upper image reading unit 221, the upstream transport roller unit 213A, the first intermediate transport roller unit 213B, the second intermediate transport roller unit 213C, the downstream transport roller unit 213D, the upper rotating member 51, and the lower rotating member 52 are supported by the single common housing 260 (see FIG. 25).

The structure in which the housing 260 supports various components is not limited to this.

For example, the lower image reading unit 222, the upstream transport roller unit 213A, the first intermediate transport roller unit 213B, and the upper rotating member 51 may be supported by a first housing, which is a single housing, and the upper image reading unit 221, the second intermediate transport roller unit 213C, the downstream transport roller unit 213D, and the lower rotating member 52 may be supported by a second single housing, which is another single housing.

In this case, similar to the above-described case, the transport units are not displaced with respect to the reader in each housing, and reduction in the image reading accuracy is suppressed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A recording-material-transporting apparatus comprising:
    a transport unit configured to transport a recording material and cause the recording material to pass through a first location and a second location that is downstream of the of the first location in a recording-material-transporting direction;
    a first reader including a first light receiver configured to receive light reflected by the recording material, the first reader being configured to read an image on a portion of the recording material at the first location and on one surface of the recording material; and
    a second reader including a second light receiver configured to receive light reflected by the recording material, the second reader being configured to read an image on a portion of the recording material at the second location and on another surface of the recording material,
    wherein the first light receiver is downstream of the first location in the recording-material-transporting direction, and/or the second light receiver is upstream of the second location in the recording-material-transporting direction, further comprising:
    a plurality of guide members at different positions in the recording-material-transporting direction and configured to guide the recording material that is transported, the plurality of guide members being retractable, by rotating, from a transport path along which the recording material is transported,
    wherein the plurality of guide members are in one of two regions that face each other with the transport path disposed therebetween, and no guide member retractable from the transport path is in another of the two regions.

2. The recording-material-transporting apparatus according to claim 1, wherein each of the first reader and the second reader includes a reduction optical system.

3. The recording-material-transporting apparatus according to claim 1, wherein the first light receiver is downstream of the first location in the recording-material-transporting direction, and the second light receiver of the second reader is upstream of the second location in the recording-material-transporting direction.

4. The recording-material-transporting apparatus according to claim 3, wherein
    the first light receiver is downstream of the second light receiver in the recording-material-transporting direction, and
    the second light receiver is upstream of the first light receiver in the recording-material-transporting direction.

5. The recording-material-transporting apparatus according to claim 1, wherein
    an end portion of the first reader that is most downstream in the recording-material-transporting direction is downstream of the second location in the recording-material-transporting direction, and
    an end portion of the second reader that is most upstream in the recording-material-transporting direction is upstream of the first location in the recording-material-transporting direction.

6. The recording-material-transporting apparatus according to claim 1, further comprising:
    a rotating member at the first location and opposite the first reader with a transport path therebetween, the rotating member being configured to transport the recording material along the transport path,
    wherein the rotating member is in a gap between the first reader and the second reader.

7. The recording-material-transporting apparatus according to claim 1, further comprising:
    a rotating member at the second location and opposite the second reader with a transport path therebetween, the rotating member being configured to transport the recording material along the transport path,
    wherein the rotating member is in a gap between the first reader and the second reader.

8. The recording-material-transporting apparatus according to claim 1, wherein
    the transport path extends in a horizontal direction, and
    the plurality of guide members are in an upper one of the two regions, and are retractable upward and away from the transport path.

9. The recording-material-transporting apparatus according to claim 1, wherein
    the transport unit that transports the recording material along a transport path; and
    the first reader and the second reader overlap when the first reader and the second reader are projected onto a plane extending along the transport path.

10. The recording-material-transporting apparatus according to claim 9, wherein an area of a region in which the first reader and the second reader overlap is greater than or equal to 50% of an area of the first reader projected onto the plane, and is greater than or equal to 50% of an area of the second reader projected onto the plane.

11. The recording-material-transporting apparatus according to claim 9, wherein an area of a region in which the first reader and the second reader overlap is greater than or equal to 80% of an area of the first reader projected onto the plane, and is greater than or equal to 80% of an area of the second reader projected onto the plane.

12. An image forming system comprising:
an image forming section that forms an image on the recording material; and
the recording-material-transporting apparatus according to claim 1.

13. An image forming system comprising:
an image forming section that forms an image on the recording material; and
the recording-material-transporting apparatus according to claim 2.

14. An image forming system comprising:
an image forming section that forms an image on the recording material; and
the recording-material-transporting apparatus according to claim 3.

15. An image forming system comprising:
an image forming section that forms an image on the recording material; and
the recording-material-transporting apparatus according to claim 4.

16. An image forming system comprising:
an image forming section that forms an image on the recording material; and
the recording-material-transporting apparatus according to claim 5.

17. An image forming system comprising:
an image forming section that forms an image on the recording material; and
the recording-material-transporting apparatus according to claim 6.

18. An image forming system comprising:
an image forming section that forms an image on the recording material; and
the recording-material-transporting apparatus according to claim 7.

* * * * *